US010986678B2

(12) United States Patent
Li et al.

(10) Patent No.: US 10,986,678 B2
(45) Date of Patent: Apr. 20, 2021

(54) METHODS AND APPARATUS FOR DEVICE TO DEVICE SYNCHRONIZATION PRIORITY

(71) Applicant: Samsung Electronics Co., Ltd., Suwon-si (KR)

(72) Inventors: Ying Li, Richardson, TX (US); Thomas David Novlan, Dallas, TX (US); Boon Loong Ng, Plano, TX (US); Gerardus Johannes Petrus van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/045,968

(22) Filed: Jul. 26, 2018

(65) Prior Publication Data
US 2018/0332647 A1 Nov. 15, 2018

Related U.S. Application Data

(63) Continuation of application No. 14/640,846, filed on Mar. 6, 2015.
(Continued)

(51) Int. Cl.
*H04W 76/14* (2018.01)
*H04W 56/00* (2009.01)
(Continued)

(52) U.S. Cl.
CPC ......... *H04W 76/14* (2018.02); *H04W 56/001* (2013.01); *H04W 72/048* (2013.01);
(Continued)

(58) Field of Classification Search
CPC . H04W 76/14; H04W 56/001; H04W 72/048; H04W 72/02; H04W 72/042; H04W 76/19; H04W 76/18; H04W 76/38
See application file for complete search history.

(56) References Cited

U.S. PATENT DOCUMENTS

2015/0271841 A1* 9/2015 Yamada ................ H04W 72/02
370/329
2016/0338012 A1* 11/2016 Liu ........................ H04W 76/27
(Continued)

FOREIGN PATENT DOCUMENTS

CN 102244873 A 11/2011
JP 2012-129981 A 7/2012

OTHER PUBLICATIONS

Japan Patent Office, "Notification of Reason for Rejection," Application No. JP2016-558372, Dec. 3, 2018, 3 pages.
(Continued)

*Primary Examiner* — Marcus Hammonds

(57) ABSTRACT

A Device to Device (D2D) user equipment (UE) is configured to support synchronization in a D2D network. The D2D UE includes an antenna configured to communicate via a D2D communication. The D2D UE also includes processing circuitry configured to enter a communication Mode 2 when certain conditions are met. The certain conditions include: when a first timer (T310) for detecting radio link failure is running, a second timer (T311) for initiating the connection reestablishment is running, or a third timer (T301) for requesting connection reestablishment is running. In communication Mode 2, the D2D UE, on its own, selects resources from resource pool(s) to transmit D2D data and D2D control information. The processing circuitry further configured to exit the communication Mode 2 and enter a communication Mode 1 when the certain condition is no longer met. In communication Mode 1, the D2D UE uses resources configured by another station.

19 Claims, 23 Drawing Sheets

Related U.S. Application Data

(60) Provisional application No. 61/968,860, filed on Mar. 21, 2014, provisional application No. 61/982,674, filed on Apr. 22, 2014, provisional application No. 62/003,398, filed on May 27, 2014.

(51) Int. Cl.
  *H04W 72/04* (2009.01)
  *H04W 72/02* (2009.01)
  *H04W 76/19* (2018.01)

(52) U.S. Cl.
  CPC .......... *H04W 72/02* (2013.01); *H04W 72/042* (2013.01); *H04W 76/19* (2018.02)

(56) References Cited

U.S. PATENT DOCUMENTS

2017/0013595 A1* 1/2017 Jung .................... H04W 72/02
2017/0142741 A1* 5/2017 Kaur .................... H04W 72/02

OTHER PUBLICATIONS

China National Intellectual Property Administration, "The First Office Action," Application No. CN201580015437.5, dated Feb. 2, 2019, 28 pages.

U.S. Department of Commerce, "Public safety perspective on resource allocation for D2D group communications," R1-140427, 3GPP TSG-RAN WG1 #76, Prague, Czech Republic, Feb. 10-14, 2014, 3 pages.

Japan Patent Office, "Notification of Reason for Rejection," Application No. JP2016-558372, dated Apr. 15, 2019, 15 pages.

Ericsson, "On Procedures for In/Our of NW coverage detection for D2D," R1-140780, 3GPP TSG RAN WG1 Meeting #76, Prague, Czech Republic, Feb. 10-14, 2013, 5 pages.

Ericsson, Synchronization Procedures for D2D, R1-143371, 3GPP TSG-RAN WG1 Meeting #78, Dresden, Germany, Aug. 18-22, 2014, 8 pages.

LG Electronics Inc, "D2D Resource Restriction in NW coverage," R2-140785, 3GPP TSG-RAN WG2 #85, Prague, Czech Republic, Feb. 10-14, 2014, 2 pages.

Notification of Reason for Rejection in connection with Japanese Appeal No. 2019-16633 (Application No. 2016-558372) dated Aug. 11, 2020, 10 pages.

3GPP TS 36.331 V12.0.0 (Dec. 2013), Technical Specification, 3rd Generation Partnership Project; Technical Specification Group Radio Access Network; Evolved Universal Terrestrial Radio Access (E-UTRA); Radio Resource Control (RRC); Protocol specification (Release 12), Dec. 2013, 4 pages.

Ericsson, "of resource pools for various coverage scenario," Tdoc R2-140622, 3GPP TSG-RAN WG2 #85 Prague, Czech Republic, Feb. 10-14, 2014, 4 pages.

* cited by examiner

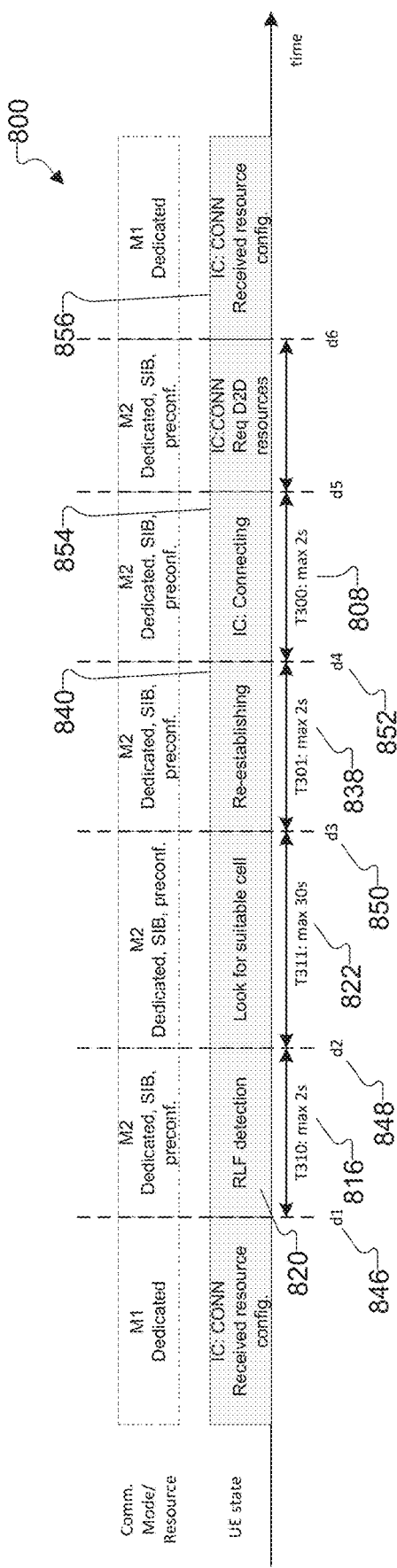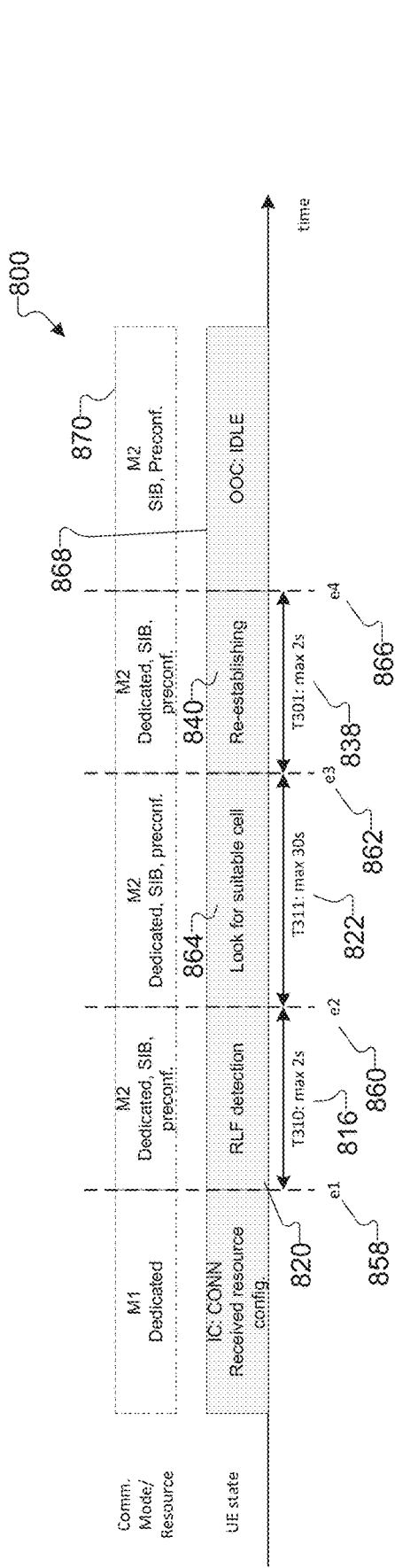

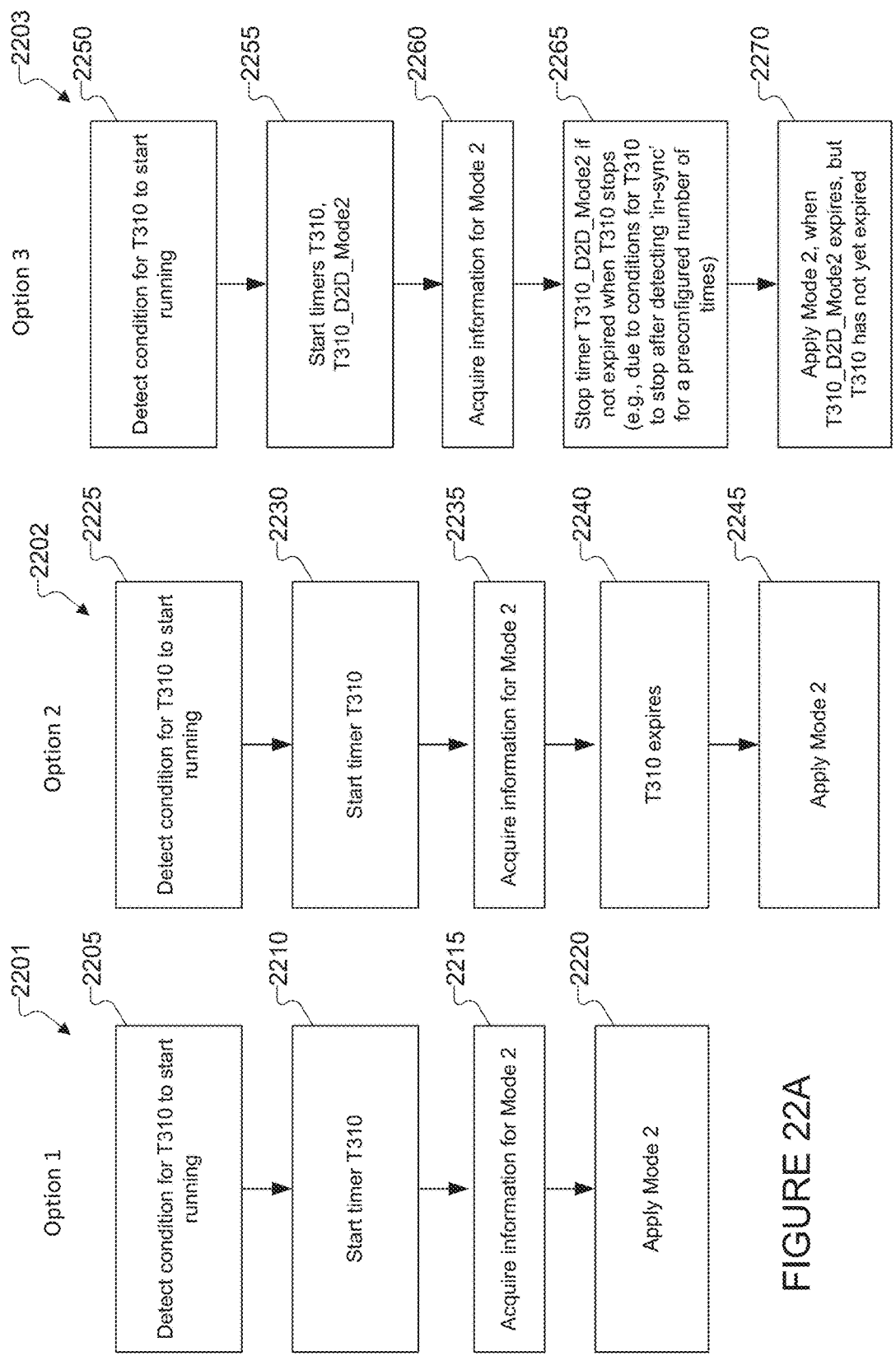

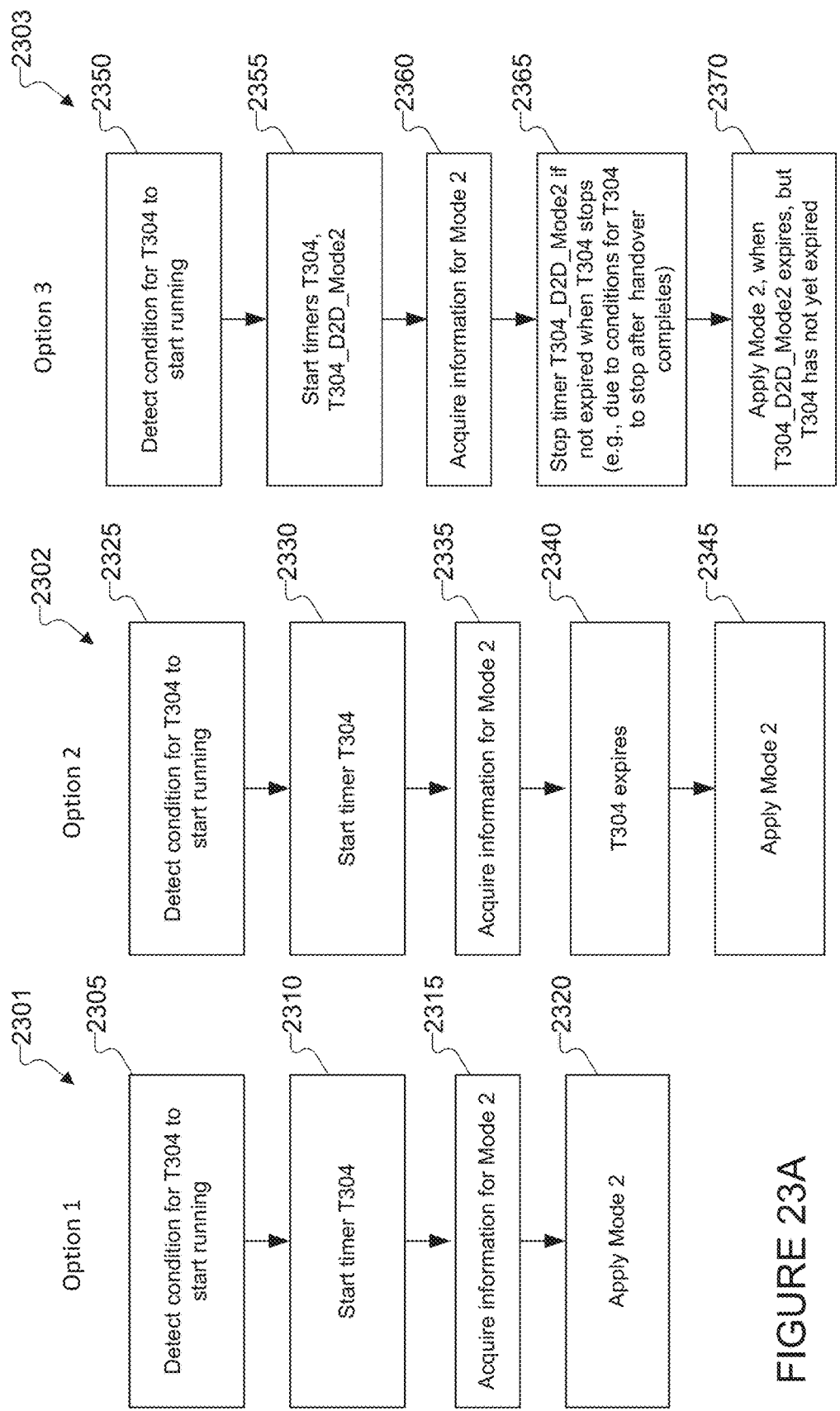

METHODS AND APPARATUS FOR DEVICE TO DEVICE SYNCHRONIZATION PRIORITY

CROSS-REFERENCE TO RELATED APPLICATION(S) AND CLAIM OF PRIORITY

The present application is a continuation of U.S. patent application Ser. No. 14/640,846, filed Mar. 6, 2015, entitled "METHODS AND APPARATUS FOR DEVICE TO DEVICE SYNCHRONIZATION PRIORITY", which claims priority to U.S. Provisional Patent Application No. 61/968,860 filed Mar. 21, 2014, entitled "METHODS AND APPARATUS FOR DEVICE-TO-DEVICE COMMUNICATIONS", U.S. Provisional Patent Application No. 61/982,674, filed Apr. 22, 2014, entitled "METHODS AND APPARATUS FOR DEVICE-TO-DEVICE COMMUNICATIONS", and U.S. Provisional Patent Application No. 62/003,398 filed May 27, 2014, entitled "METHODS AND APPARATUS FOR DEVICE-TO-DEVICE COMMUNICATIONS." The content of the above-identified patent document is incorporated herein by reference.

TECHNICAL FIELD

The present application relates generally to wireless communication systems and, more specifically, to the device-to-device (D2D) communications.

BACKGROUND

Traditionally, cellular networks have been designed to establish wireless communications links between mobile devices, or User Equipments (UEs), and a fixed communication infrastructure (for example, base stations, access points, or enhanced NodeBs (eNBs)) that serves users in a wide or local geographic range. A wireless network, however, can also be implemented by utilizing D2D communication links with the assistance of infrastructure or without the need for deployed access points. A communication network can support devices which can connect both to access points (infrastructure mode) and other D2D-enabled devices. A D2D-enabled device is referred to as a D2D UE.

SUMMARY

In a first embodiment, a portable terminal is provided. The portable terminal includes an antenna configured to communicate via a device to device (D2D) communication. The portable terminal also includes processing circuitry configured to communicate with another portable terminal via the D2D communication. The processing circuitry is further configured to: enter a communication Mode 2 when certain conditions are met, wherein the certain conditions include at least of: when a first timer (T310) for detecting radio link failure is running, a second timer (T311) for initiating the connection reestablishment is running, or a third timer (T301) for requesting connection reestablishment is running. In communication Mode 2, the processing circuitry is configured to, on its own, select resources from resource pool(s) to transmit D2D data and D2D control information. The processing circuitry further configured to exit the communication Mode 2 and enter a communication Mode 1 when the certain condition is no longer met. In communication Mode 1, the processing circuitry is configured to use resources configured by another station.

In a second embodiment, a non-transitory computer readable medium comprising a plurality of instructions is provided. The plurality of instructions is configured to, when executed by a processor, cause the processor to: communicate with at least one portable terminal via a device to device (D2D) communication; enter a communication Mode 2 when certain conditions are met, wherein the certain conditions include at least of: when a first timer (T310) for detecting radio link failure is running, a second timer (T311) for initiating the connection reestablishment is running, or a third timer (T301) for requesting connection reestablishment is running, and exit the communication Mode 2 and enter a communication Mode 1 when the certain condition is no longer met. In the communication Mode 2, the instructions cause the processor to, on its own, select resources from resource pool(s) to transmit D2D data and D2D control information. In communication Mode 1, the instructions cause the processor to use resources configured by another station.

In a third embodiment, an apparatus for use in a wireless communications device is provided. The apparatus includes one or more processors configured to conduct a D2D communication via at least one antenna. The one or more processors is further configured to: enter a communication Mode 2 when certain conditions are met, wherein the certain conditions include at least of: when a first timer (T310) for detecting radio link failure is running, a second timer (T311) for initiating the connection reestablishment is running, or a third timer (T301) for requesting connection reestablishment is running, and exit the communication Mode 2 and enter a communication Mode 1 when the certain condition is no longer met. In the communication Mode 2, the one or more processors are configured to, on its own, select resources from resource pool(s) to transmit D2D data and D2D control information. In communication Mode 1, the one or more processors are configured to use resources configured by another station.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A, 8B, 8C, 8D, 8E and 8F illustrate states of operation for a mobile device according to embodiments of the present disclosure

FIGS. 22A, 22B and 22C illustrate exemplary operations for a D2D UE to use Mode 2, according to different conditions or criteria according to embodiments of the present disclosure;

FIGS. 23A, 23B and 23C illustrates exemplary operations for a D2D UE to use Mode 2, according to different conditions or criteria according to embodiments of the present disclosure;

DETAILED DESCRIPTION

FIGS. 1 through 25, discussed below, and the various embodiments used to describe the principles of the present invention in this patent document are by way of illustration only and should not be construed in any way to limit the scope of the disclosure. Those skilled in the art will understand that the principles of this disclosure may be implemented in any suitably arranged device or system.

D2D communication may be used to implement many kinds of services that are complementary to the primary communication network or provide new services based on the flexibility of the network topology. LTE D2D multicast communication such as broadcasting or groupcasting has been identified as a potential means for D2D communication where UEs are able to transmit messages to all in-range D2D-enabled UEs or a subset of UEs which are members of particular group. Future public safety networks are expected to require devices to operate in near simultaneous fashion when switching between cellular and D2D communication modes. Accordingly, embodiments of the present disclosure illustrate protocols that can manage D2D communication in these deployment scenarios.

Figure 1:
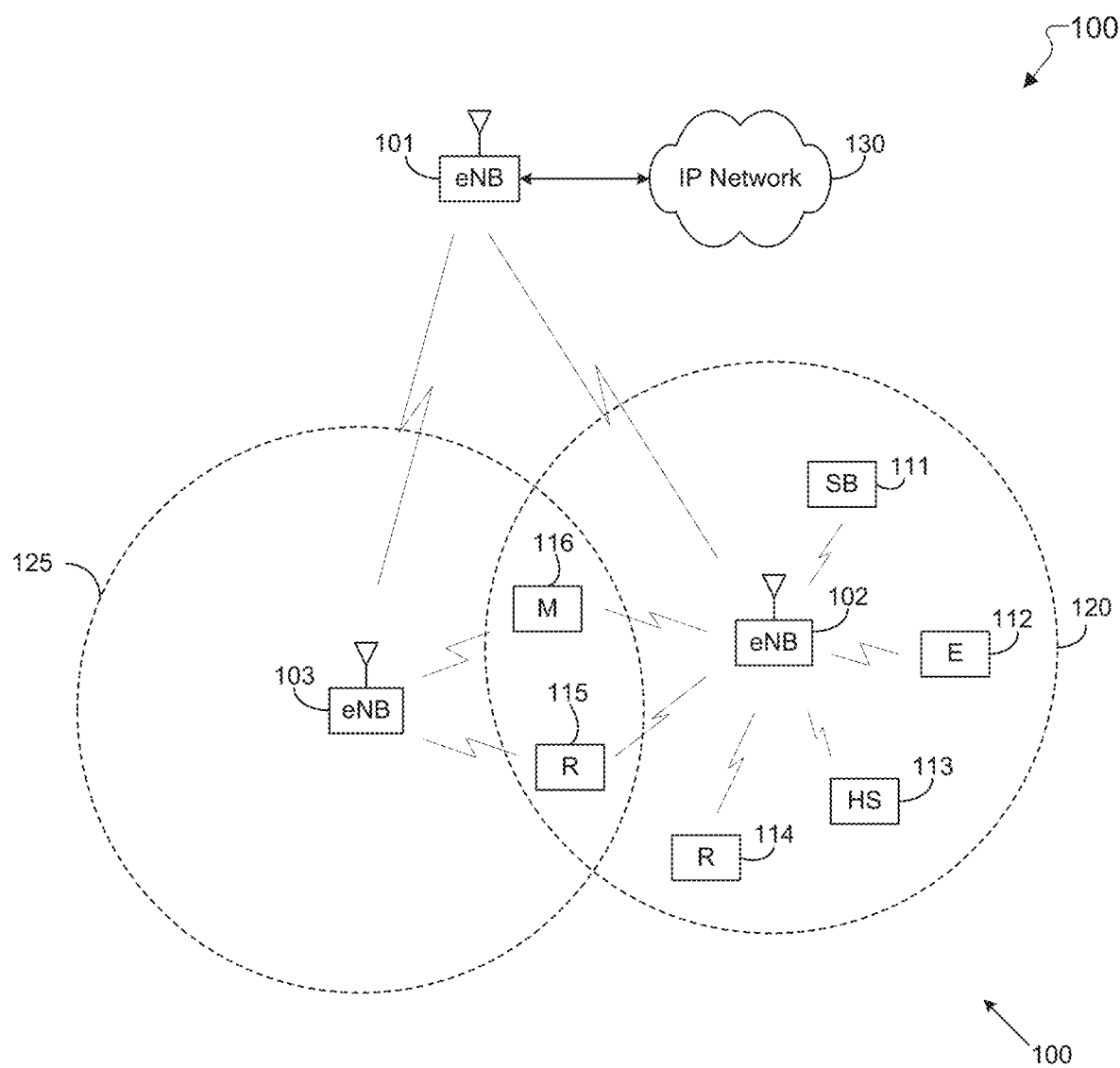
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. One or more of the UEs are configured as a device to device (D2D) UE. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of eNBs 101-103 and one or more of the UEs 111-116 include a mechanism for supporting synchronization (sync) of D2D UE. In addition, one or more of eNBs 101-103 are configured to inform a D2D UE, such as one or more UEs 111-116, of information that the D2D UE can utilize to determine the prioritization of the network nodes to which it can synchronize. Finally, one or more of eNBs 101-103 are configured to ensure a fast re-establishment of synchronization when there is change of the topology or locations of the D2D UEs.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
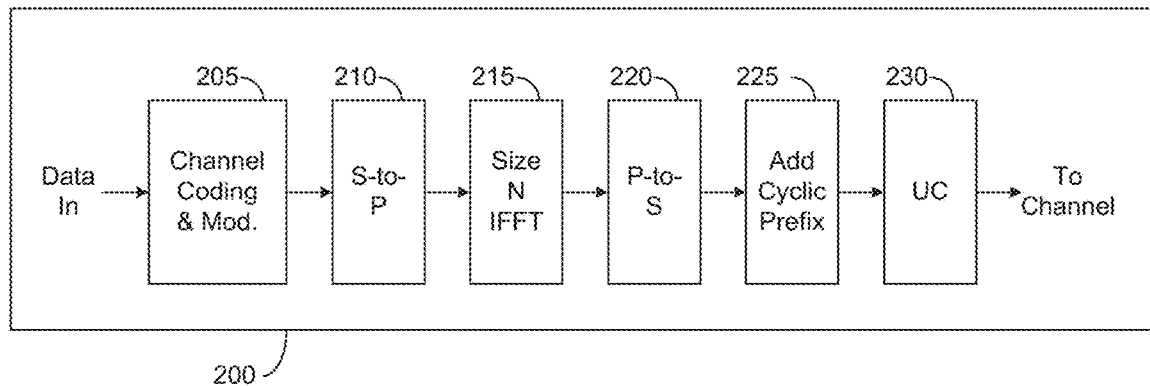
FIGS. 2A and 2B illustrate example wireless transmit and receive paths according to this disclosure.
Figure 2B:
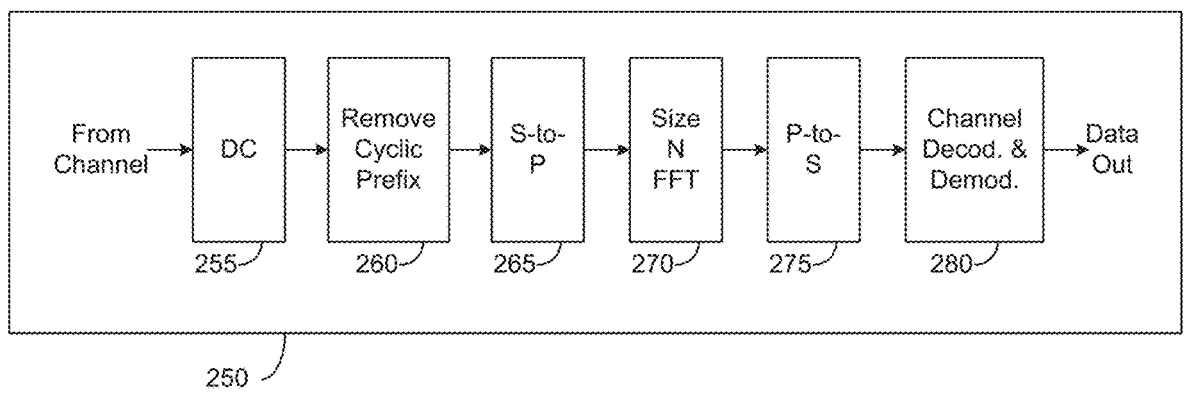

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are configured to support synchronization of a D2D UE; configured to inform a D2D UE of information that the D2D UE can utilize to determine the prioritization of the network nodes to which it can synchronize; and configured to ensure a fast re-establishment of synchronization when there is change of the topology or locations of the D2D UEs.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architecture could be used to support wireless communications in a wireless network.

Figure 3:
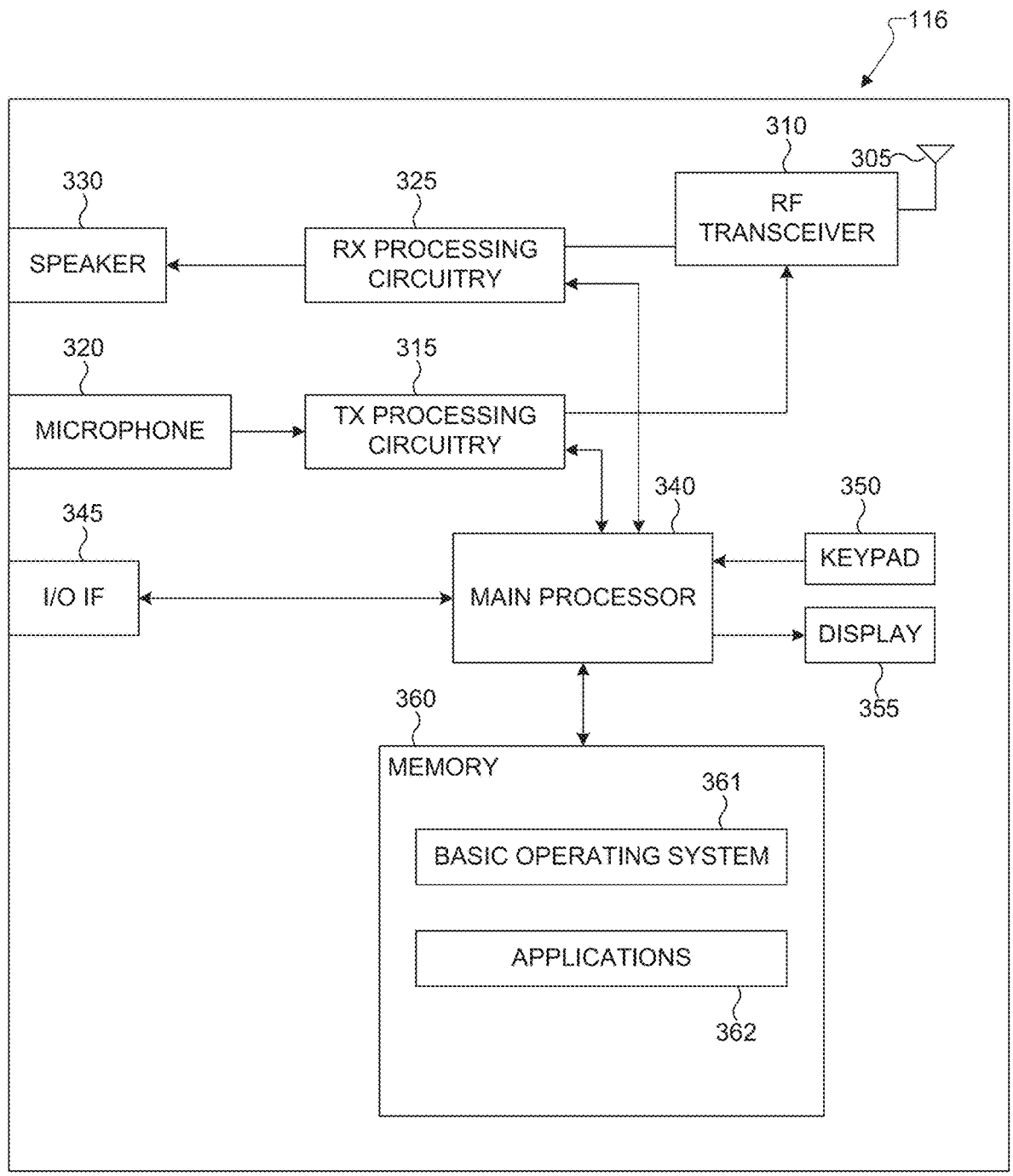
FIG. 3 illustrates an example user equipment according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

The UE 116 includes an antenna 305, a radio frequency (RF) transceiver 310, transmit (TX) processing circuitry 315, a microphone 320, and receive (RX) processing circuitry 325. Although the example shown in FIG. 3 illustrates a single antenna 305 coupled to a single RF transceiver 310, embodiments including multiple antennas coupled to respective multiple RF transceivers could be used without departing from the scope of the present disclosure. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for supporting synchronization of D2D UE; receiving and utilizing information to determine the prioritization of the network nodes to which synchronization can be performed; and operations for a fast re-establishment of synchronization when there is change of the topology or locations of the UEs. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
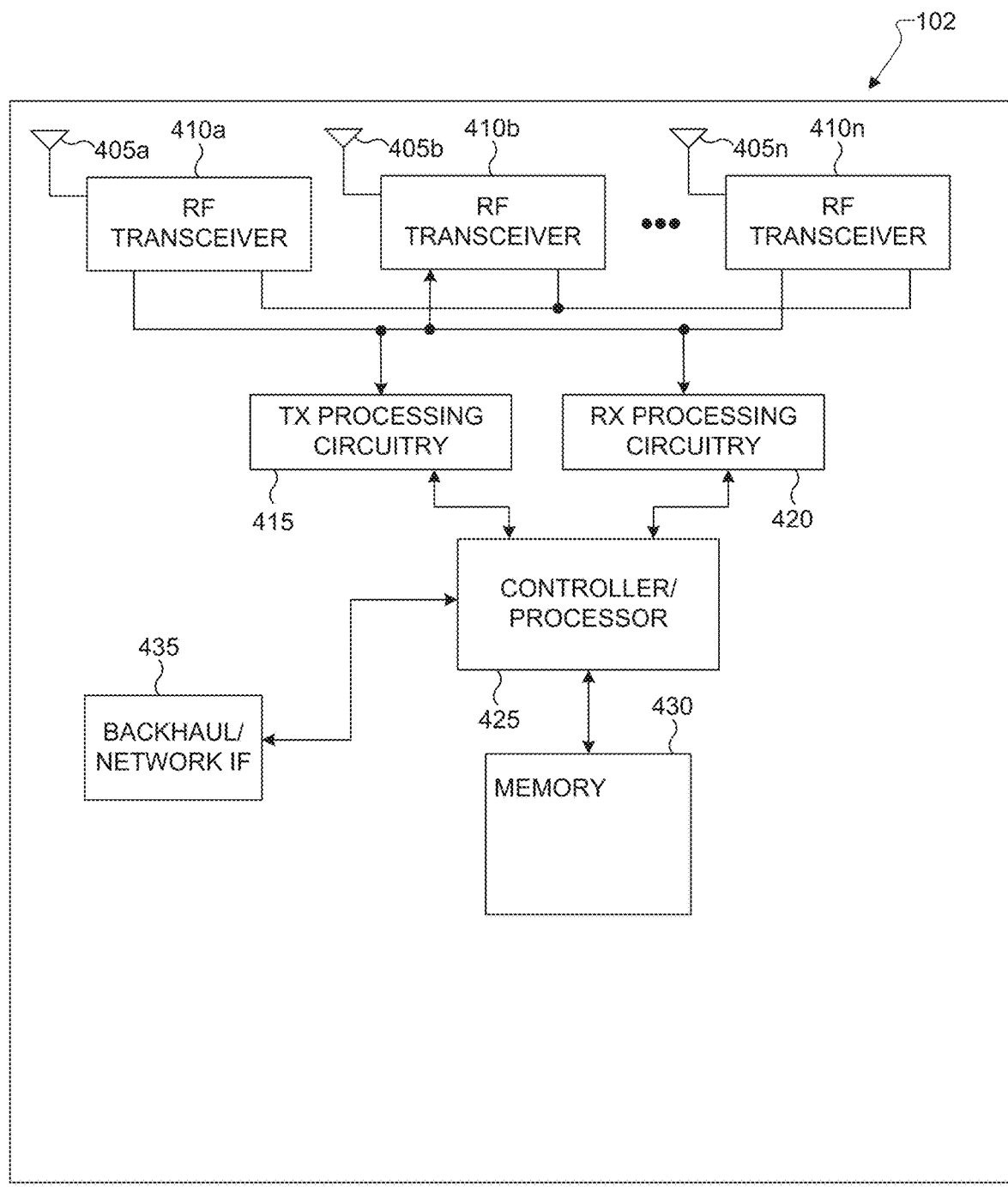
FIG. 4 illustrates an example enhanced NodeB according to this disclosure.

FIG. 4 illustrates an example eNB 102 according to this disclosure. The embodiment of the eNB 102 shown in FIG. 4 is for illustration only, and other eNBs of FIG. 1 could have the same or similar configuration. However, eNBs come in a wide variety of configurations, and FIG. 4 does not limit the scope of this disclosure to any particular implementation of an eNB.

The eNB 102 includes multiple antennas 405a-405n, multiple RF transceivers 410a-410n, transmit (TX) processing circuitry 415, and receive (RX) processing circuitry 420. The eNB 102 also includes a controller/processor 425, a memory 430, and a backhaul or network interface 435.

The RF transceivers 410a-410n receive, from the antennas 405a-405n, incoming RF signals, such as signals transmitted by UEs or other eNBs. The RF transceivers 410a-410n down-convert the incoming RF signals to generate IF or baseband signals. The IF or baseband signals are sent to the RX processing circuitry 420, which generates processed baseband signals by filtering, decoding, and/or digitizing the baseband or IF signals. The RX processing circuitry 420 transmits the processed baseband signals to the controller/processor 425 for further processing.

The TX processing circuitry 415 receives analog or digital data (such as voice data, web data, e-mail, or interactive video game data) from the controller/processor 425. The TX processing circuitry 415 encodes, multiplexes, and/or digitizes the outgoing baseband data to generate processed baseband or IF signals. The RF transceivers 410a-410n receive the outgoing processed baseband or IF signals from the TX processing circuitry 415 and up-converts the baseband or IF signals to RF signals that are transmitted via the antennas 405a-405n.

The controller/processor 425 can include one or more processors or other processing devices that control the overall operation of the eNB 102. For example, the controller/processor 425 could control the reception of forward channel signals and the transmission of reverse channel signals by the RF transceivers 410a-410n, the RX processing circuitry 420, and the TX processing circuitry 415 in accordance with well-known principles. The controller/processor 425 could support additional functions as well, such as more advanced wireless communication functions. For instance, the controller/processor 425 could support beam forming or directional routing operations in which outgoing signals from multiple antennas 405a-405n are weighted differently to effectively steer the outgoing signals in a desired direction. Any of a wide variety of other functions could be supported in the eNB 102 by the controller/processor 425. In some embodiments, the controller/processor 425 includes at least one microprocessor or microcontroller.

The controller/processor 425 is also capable of executing programs and other processes resident in the memory 430, such as a basic OS. The controller/processor 425 can move data into or out of the memory 430 as required by an executing process.

The controller/processor 425 is also coupled to the backhaul or network interface 435. The backhaul or network interface 435 allows the eNB 102 to communicate with other devices or systems over a backhaul connection or over a network. The interface 435 could support communications over any suitable wired or wireless connection(s). For example, when the eNB 102 is implemented as part of a cellular communication system (such as one supporting 5G, LTE, or LTE-A), the interface 435 could allow the eNB 102 to communicate with other eNBs over a wired or wireless backhaul connection. When the eNB 102 is implemented as an access point, the interface 435 could allow the eNB 102 to communicate over a wired or wireless local area network or over a wired or wireless connection to a larger network (such as the Internet). The interface 435 includes any suitable structure supporting communications over a wired or wireless connection, such as an Ethernet or RF transceiver.

The memory 430 is coupled to the controller/processor 425. Part of the memory 430 could include a RAM, and another part of the memory 430 could include a Flash memory or other ROM.

As described in more detail below, the transmit and receive paths of the eNB 102 (implemented using the RF transceivers 410a-410n, TX processing circuitry 415, and/or RX processing circuitry 420) support synchronization of D2D UE are configured to inform a D2D UE of information that the D2D UE can utilize to determine the prioritization of the network nodes to which it can synchronize; and are configured to ensure a fast re-establishment of synchronization when there is change of the topology or locations of the D2D UEs.

Although FIG. 4 illustrates one example of an eNB 102, various changes may be made to FIG. 4. For example, the eNB 102 could include any number of each component shown in FIG. 4. As a particular example, an access point could include a number of interfaces 435, and the controller/processor 425 could support routing functions to route data between different network addresses. As another particular example, while shown as including a single instance of TX processing circuitry 415 and a single instance of RX processing circuitry 420, the eNB 102 could include multiple instances of each (such as one per RF transceiver).

Figure 5:
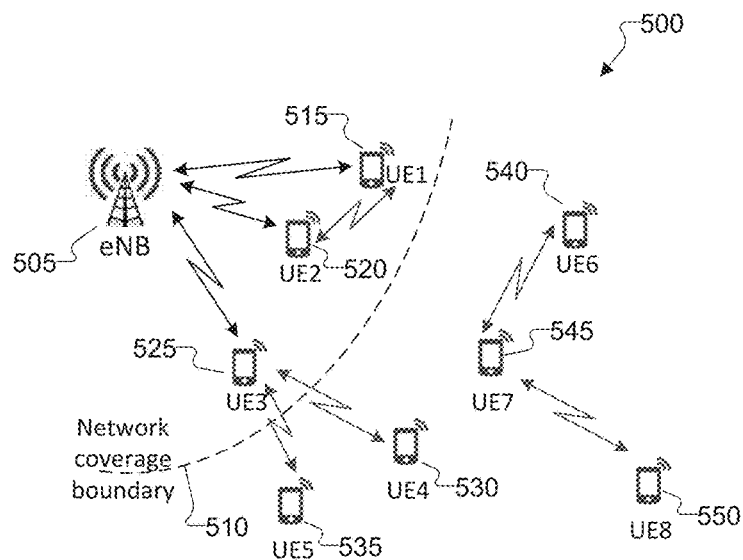
FIG. 5 illustrates an exemplary topology of D2D communication networks according to this disclosure.

FIG. 5 illustrates an exemplary topology of D2D communication networks according to this disclosure. The embodiment of the D2D communication network 500 shown in FIG. 5 is for illustration only. Other embodiments could be used without departing from the scope of the present disclosure.

The D2D communication network 500 includes an eNB 505 that is able to communicate with a number of UEs within network coverage boundary 510. The eNB 505 communicates with UE1 515, UE2 520, UE3 525 within the network coverage boundary 510. The remaining UEs in the example shown in FIG. 5 are outside of the network coverage boundary 510. In the example shown in FIG. 5, UE1 515 and UE2 520 engage in D2D communication with each other; UE3 525 has a D2D communication with UE4 520 and UE5 535; UE6 540 has a D2D communication with UE7 545; and UE7 545 has a D2D communication with UE8 550.

Control elements and data communication in D2D communication networks are essential components to enable D2D communications. When D2D UEs are within network coverage boundary 510, eNB 505 can control the resources for D2D communications and can provide resources for Scheduling Assignment (SA). The SA can be transmitted from a first D2D UE, such as UE1 515, to a second D2D UE, UE2 520, to schedule the D2D data communication, such as by providing the resources for D2D data transmission from UE1 515. A pool of resources for SA or data for out-of-coverage (OOC) D2D UEs can be indicated to the D2D UEs, so that a D2D UE can perform contention to transmit SA. The D2D UE can be transitioning among in-coverage (IC) coverage, edge-network (EN) coverage, out-of-coverage (OOC) coverage. The D2D UE can use different transmission method or parameters for different coverages. Therefore, reconfiguration may be required. However, a mechanism for supporting control elements and data communication in D2D communication networks, including how to provide reliable SA, how to contend SA or data, how to reconfigure the D2D communications when D2D UEs transition among in-coverage coverage, edge-network coverage, out-of-coverage coverage, is not clear in existing systems or literature.

To overcome the aforementioned deficiencies shown in FIG. 5, embodiments of the present disclosure provide a mechanism for supporting reliable SA. Certain embodiments of the present disclosure also provide a system and method for contention of SA or data. Certain embodiments of the present disclosure also provide a system and method to ensure a fast and smooth reconfiguration of D2D communications when D2D UEs transition among in-coverage coverage, edge-network coverage, out-of-coverage coverage.

For D2D communication, in a first mode (Mode 1), an eNB or a relay node schedules resources used by a D2D UE to transmit D2D data and D2D control information. The resources may or may not be restricted. For example, the resources may or may not be restricted to be within resource pool(s). The eNB or the relay node indicates to the D2D UE certain resources for scheduling assignment (SA) transmission. In response, the D2D UE transmits SA to other D2D UEs in the indicated resources. The SA indicates resources for D2D data. The eNB or the relay node indicates to the D2D UE certain resources to transmit D2D data together with control information, where a separate SA used to indicate resources for D2D data may not be necessary.

In a second mode (Mode 2), a UE, on its own, selects resources from resource pool(s) to transmit D2D data and D2D control information. The resource pool(s) are predefined, preconfigured, or fixed. For example, the resource pool(s) can be indicated by a physical D2D synchronization channel (PD2DSCH) that is transmitted by a D2D UE and received by one or more other D2D UEs. The resource pool(s) can also be indicated in system information block from an eNB or a relay node. The resource pool(s) for D2D data and D2D control can be the same or different. The D2D UE selects resources to transmit SA to one or more other D2D UEs, and the SA indicates resources for D2D data. The D2D UE selects resources to transmit D2D data together with control information, where a separate SA used to indicate resources for D2D data may not be necessary.

Throughout the present disclosure, Mode 1 and Mode 2 are used to refer to as D2D communication Mode 1 and D2D communication Mode 2, respectively. Mode 1 and Mode 2 are also used to refer to as resource allocation Mode 1 and resource allocation Mode 2, respectively. Mode 1 and Mode 2 are also used to refer to as transmission Mode 1 and transmission Mode 2, respectively. All these notations related to Mode 1 are interchangeable, and all these notations related to Mode 2 are interchangeable. For example, a signal transmitted in Mode 1 is equivalent to signal transmitted on the resources allocated by Mode 1.

When a D2D UE is in network coverage (in-coverage, IC), the D2D UE can at least support Mode 1. The D2D UE can support Mode 2 for at least the cases that the D2D UE is in edge-of-coverage and/or out-of-coverage. In certain embodiments, an IC UE also is instructed by the eNB to use Mode 2, or IC UE uses Mode 2 in certain exceptional cases, such as when an RRC connection reconfiguration starts.

Figure 6:
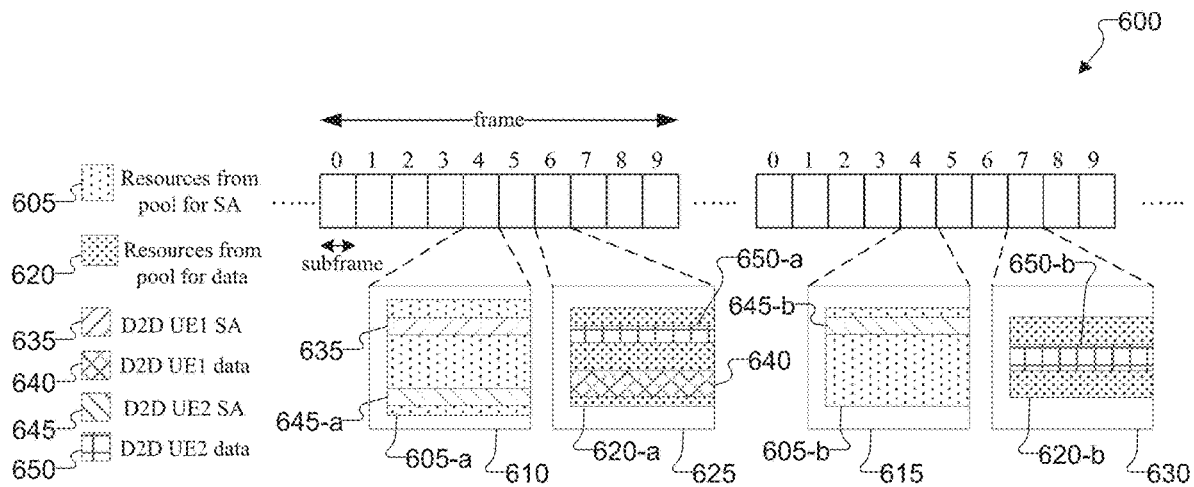
FIG. 6 illustrates a frame structure for D2D data and control according to embodiments of the present disclosure.

FIG. 6 illustrates a frame structure for D2D data and control according to embodiments of the present disclosure. The embodiment of the frame structure 600 for D2D data and control shown in FIG. 6 is for illustration only. Other embodiments could be used without departing from the scope of the present disclosure.

In the example shown in FIG. 6, one or more sub-frames include resources 605 from pool for SA or control information, wherein data can be together with the SA or control. For example, a sub-frame 610 includes a first resource 605-*a* from pool for SA or control information and a second sub-frame 615 includes a second resource 605-*b* 212 and 214 from pool for SA or control information. One or more other sub-frames also include resources 620 from pool for data. For example, sub-frame 625 include resources 620-*a* from pool for data and sub-frame 630 includes resources 620-*b* from pool for data. In the example shown in FIG. 6, D2D UE1 and D2D UE2 are out-of-coverage or in edge-of-coverage, and Mode 2 communication applies. D2D UE1 selects resources for SA 635 and transmits SA 635, where the SA 635 indicates data resources 640. D2D UE2 selects resources for SA 645 to indicate D2D UE2 data 650. D2D UE2 transmits SA 645-*a*, where the SA 645-*a* indicates data resources 650-*a*. Later, D2D UE2 selects resources for SA 645-*b* and transmits SA 645-*b*, where the SA indicates data resources 650-*b*. The remaining resources in sub-frames 605, 615, 625, and 630 can be used for other purposes, such as cellular communication, for D2D communication in Mode 1, or D2D communication physical channels, such as for synchronization, and so forth. Although the example in FIG. 6 shows resources for SA and resources for data are in different sub-frames, embodiments in which a sub-frame includes resources from pool for SA and also includes resources from pool for data could be used. That is, in certain embodiments, a sub-frame includes resources from pool for SA and also includes resources from pool for data.

In certain embodiments, a D2D UE transmits D2D control information and D2D data, which enables other D2D UEs that are in-coverage, at an edge-of-coverage, or out-of-coverage to receive the information transmitted by the D2D UE. A D2D UE receives and decodes the D2D control information and D2D data transmitted from other D2D UEs that are in-coverage, at an edge-of-coverage, or out-of-coverage.

For example, a D2D UE can transmit in Mode 1 and in Mode 2, to enable other D2D UEs, which can be in-coverage or edge-of-coverage or out-of-coverage, to receive the information transmitted by the D2D UE. The transmitting D2D UE can be in-coverage, at an edge-of-coverage or out-of-coverage. In certain embodiments, the transmitting D2D UE transmits in Mode 1 when the transmitting D2D UE is in-coverage, transmits in Mode 2 when the transmitting D2D UE is out-of-coverage, and transmits in both Mode 1 and Mode 2 when the transmitting D2D UE is in edge-of-coverage. A D2D UE can receive information transmitted by other D2D UEs in Mode 1 and in Mode 2. The receiving D2D UE can be in-coverage, at an edge-of-coverage or out-of-coverage. In certain embodiments, the receiving D2D UE receives information transmitted in Mode 1 when the receiving D2D UE is out-of-coverage, it can receive; receives information transmitted in Mode 2 when the receiving D2D UE is out-of-coverage, it can receive information transmitted in Mode 2; and receives information transmitted in Mode 1 or Mode 2 when the receiving D2D UE is in edge-of-coverage.

FIGS. 7A-D illustrates transmission and reception in either Mode 1 or Mode 2, or both, according to embodiments of the present disclosure. The embodiment of the D2D communication network 700 shown in FIG. 7 is for illustration only. Other embodiments could be used without departing from the scope of the present disclosure.

The D2D communication network 700 includes a first eNB, eNB1 705, that is able to communicate with a number of UEs within a network in-coverage boundary 710 and within a network edge-of-coverage boundary 715. The eNB1 705 communicates with UE1 720, UE2 725 and UE3 730 within the network in-coverage boundary 710. The eNB1 705 also communicates with UE4 735 within the network edge-of-coverage boundary 715. The eNB1 705 can be configured the same as, or similar to, eNB 102. One or more of the UE1 720*a-d*, UE2 725*a-d*, UE3 730*a-d*, UE4 735*a-d* and UE5 740*a-d* shown in FIGS. 7A-D can be configured the same as, or similar to, UE 116.

Scenarios can be different depending on a D2D UE is in-coverage, edge-of-coverage, or out-of-coverage. An eNB 302 transmits signals. A D2D UE, such as UE1 720*a-d*, UE2 725*a-d* and UE3 730*a-d*, is in-coverage 745 if the D2D UE is within network in-coverage boundary 710. A D2D UE, such as UE4 735*a-d* is edge-of-coverage 750 if the D2D UE is within a range in-between the network in-coverage boundary 710 and the network edge-of-coverage boundary 715. A D2D UE, such as UE5 740*a-d* is out-of-coverage 755 if the D2D UE is outside of the network edge-of-coverage boundary 715.

Figure 7A:
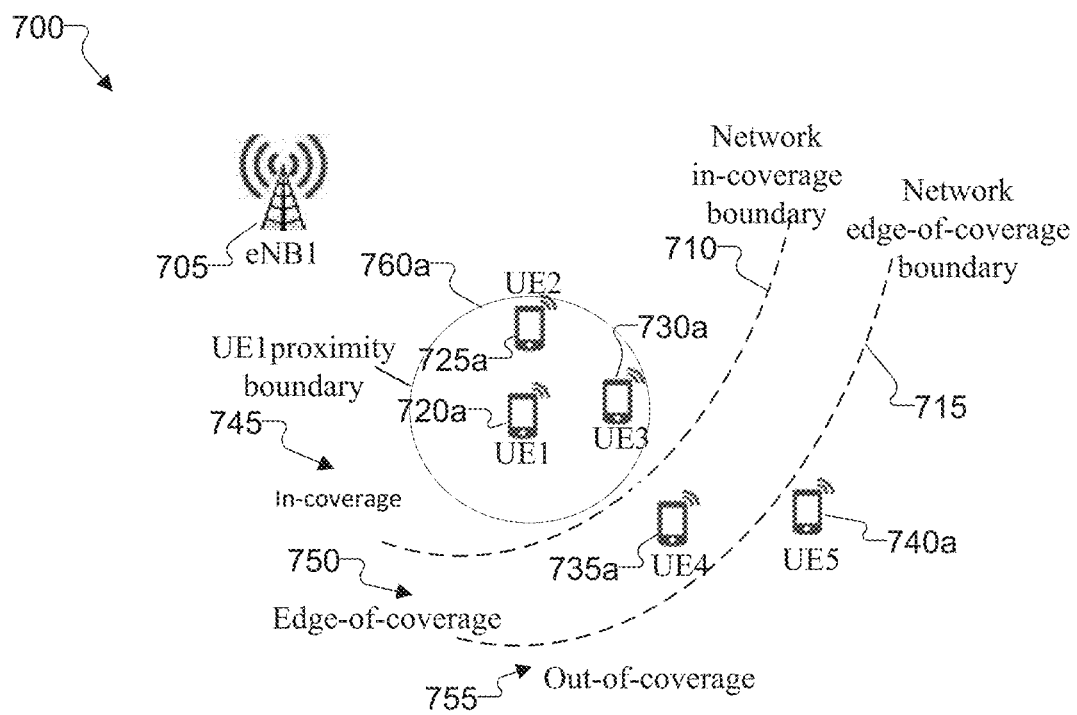
FIGS. 7A, 7B, 7C and 7D illustrate transmission and reception in either Mode 1 or Mode 2, or both, according to embodiments of the present disclosure.

In the example shown in FIG. 7A, UE1 720*a* transmits information within a broadcast boundary 760*a*. UE2 725*a* and UE3 730*a* are within the can broadcast boundary 760*a*. UE4 735*a* and UE5 740*a* are outside of the broadcast boundary 760*a*. UE2 725*a* and UE3 730*a* can receive the information transmitted by UE1 720*a*. In contrast, UE4 735*a* and UE5 740*a* are unable to receive the information transmitted by UE1 720*a*.

Figure 7B:
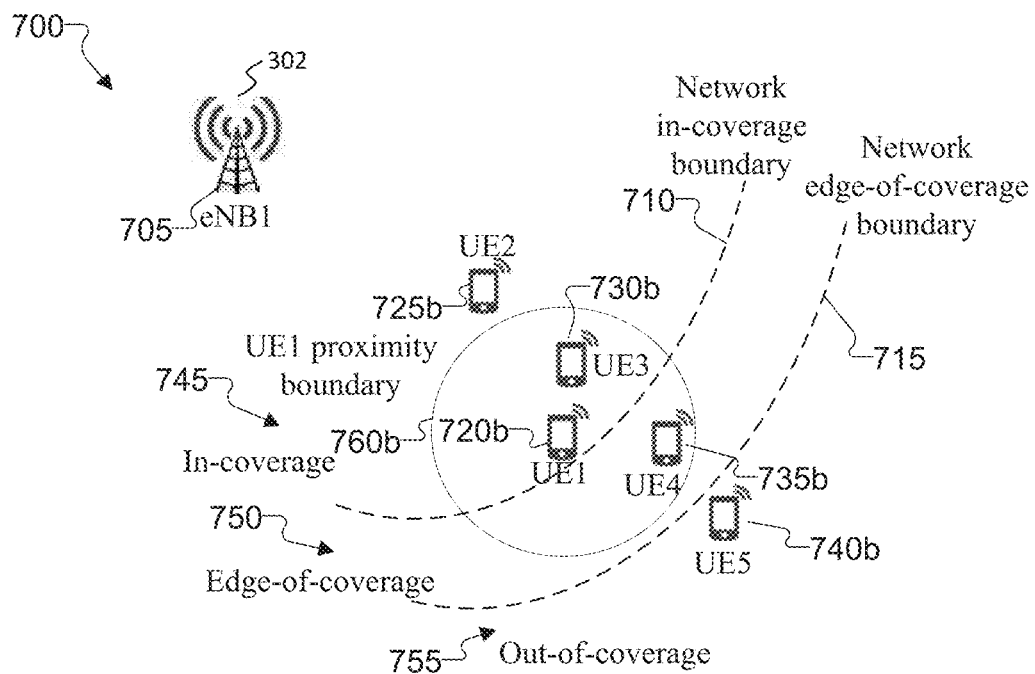

In the example shown in FIG. 7B, UE1 720*b*, UE2 725*b* and UE3 730*b* are in-coverage 745. UE4 735*b* is edge-of-coverage 750. UE5 740 is out-of-coverage 755. UE3 730*b* and UE4 735*b* are within the can broadcast boundary 760*b*. UE2 725*b* and UE5 740*b* are outside of the broadcast boundary 760*b*. UE3 730*b* and UE4 735*b* can receive the information transmitted by UE1 720*b*. In contrast, UE2 725*b* and UE5 740*b* are unable to receive the information transmitted by UE1 720*b*.

Figure 7C:
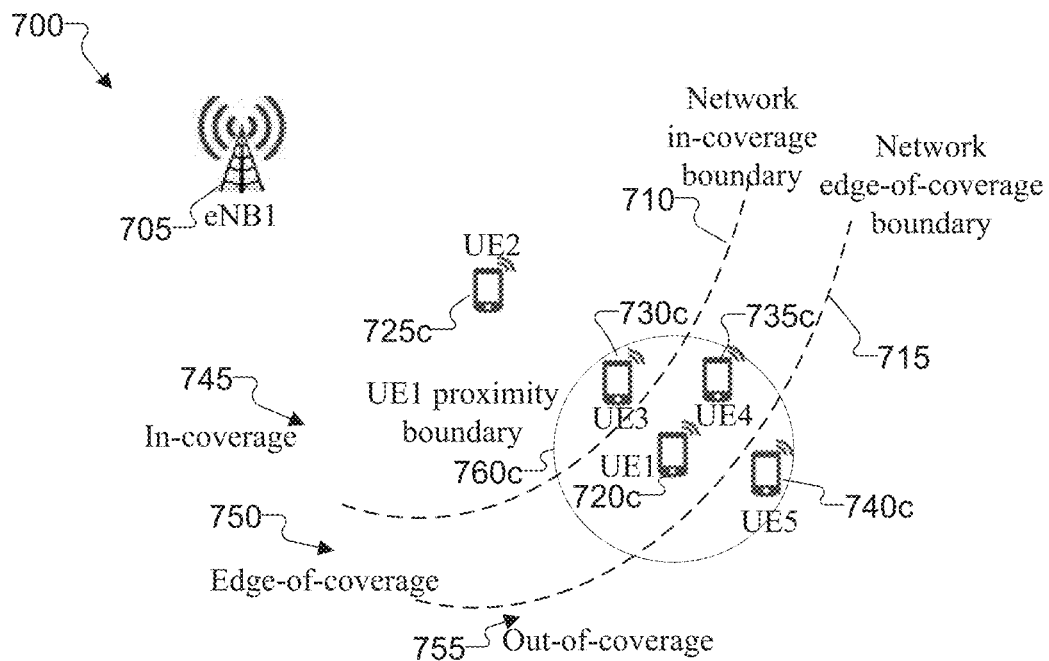

In the example shown in FIG. 7C, UE2 725*c* and UE3 730*c* are in-coverage 745. UE1 720*c* and UE4 735*c* are edge-of-coverage 750. UE5 740*c* is out-of-coverage 755. UE3 730*c*, UE4 735*c*, UE5 740*c* are within the can broadcast boundary 760*c*. UE2 725*c* is outside of the broadcast boundary 760*c*. UE3 730*c*, UE4 735*c*, UE5 740*c* can receive the information transmitted by UE1 720*c*. In contrast, UE2 725*c* is unable to receive the information transmitted by UE1 720*c*.

Figure 7D:
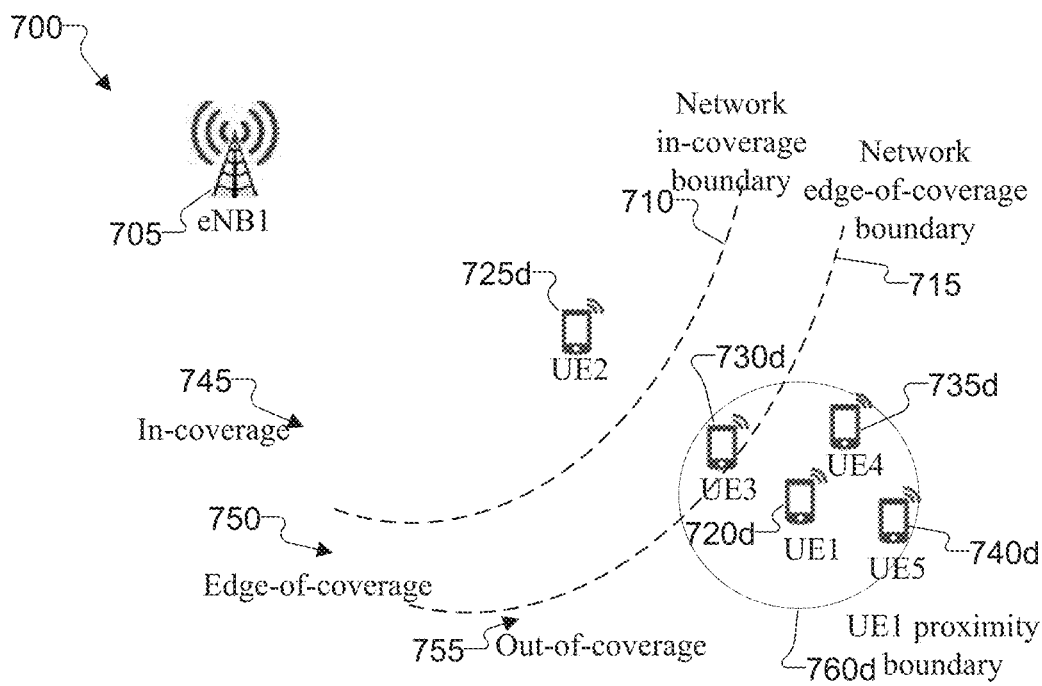

In the example shown in FIG. 7D, UE2 725*d* is in-coverage 745. UE3 730*d* is edge-of-coverage 750. UE1 720*d*, UE4 735*d* and UE5 740*d* are out-of-coverage 755. UE3 730*d*, UE4 735*d*, UE5 740*d* are within the can broadcast boundary 760*d*. UE2 725*d* is outside of the broadcast boundary 760*d*. UE3 730*d*, UE4 735*d*, UE5 740*d* can receive the information transmitted by UE1 720*d*. In contrast, UE2 725*d* is unable to receive the information transmitted by UE1 720*d*.

In the examples shown in FIGS. 7A through 7D, the topology can be reversed for receiving. For example, UE1 720*a-d* can receive information transmitted by UE3 730*a-d*, UE4 735*a-d*, UE5 740*a-d*. In addition, conditions or criteria can be defined for a D2D UE to be in-coverage 745, edge-of-coverage 750, or out-of-coverage 755.

When in-coverage 745, a UE has both downlink (DL) and uplink (UL) coverage. In-coverage 745 also can refer to when a UE has a connection with an infrastructure node when the UE is in connected state, or when a UE can successfully decode DL signal when the UE is in idle state and when the UE can have successful UL link when the UE needs to transmit. The UE can be considered in-coverage when the UE has a serving cell when the UE is in connected state, or when the UE is camping on a cell when the UE is in idle state. A network infrastructure node can be an eNB, a cell, a Remote Radio Head (RRH), a Transmission Point (TP), or relay node.

Out-of-coverage 755 refers to when DL coverage and UL coverage are lost. Out-of-coverage 755 can also refer to when DL coverage is lost, but, the UL is limited, as it typically implies UL coverage is lost when DL coverage is lost.

Prior to entering, or becoming, out-of-coverage 755, a UE can attempt a radio link failure process in which the UE tries to recover the link. When performing the radio link failure process, prior to a radio link failure detection, the UE is considered as in-coverage 745 but trying to recover link. The link that the UE is attempting to recover can be either UL or DL. Alternatively, in certain embodiments, in-coverage 745 strictly excludes the radio link failure process or state before the radio link failure detection. Rather, when performing the radio link failure process, prior to a radio link failure detection, the UE is considered as edge-of-coverage 750.

When evaluating UL coverage, layer-2 and higher layer conditions are considered since an infrastructure node may not allow a UE to access, even if the radio link can be successful from physical layer perspective. For D2D communication, when an infrastructure node is barred for D2D UE to access, or when the infrastructure node does not allow the D2D UE to access, such as, when the infrastructure node does not support D2D communication, or when the infrastructure node does not support Mode 1 D2D resource allocation but an in-coverage D2D UE would only use Mode 1 resource allocation, then UL random access for in-coverage D2D UE is regarded as failure. When the infrastructure node does not support D2D communication, or when the infrastructure node does not support Mode 2 D2D resource allocation but edge-of-coverage D2D UE would only use Mode 2 resource allocation, then UL random access for in-coverage D2D UE is regarded as failure.

Edge-of-coverage 750 refers to any remaining state besides in-coverage and out-of-coverage. Edge-of-coverage 750 can be referred to as a state in which a D2D UE transitions in-between in-coverage 745 and out-of-coverage 755. Edge-of-coverage 750 can have other names, such as radio link failure process, radio link failure state, edge-of-cell coverage, and so forth. For example, the conditions for in-coverage 745 to transition to radio link failure can be the conditions for in-coverage 745 to transition to edge-of-coverage 750. The conditions for radio link failure to transition to out-of-coverage 755 can be the conditions for edge-of-coverage 750 to transition to out-of-coverage 755. Alternatively, edge-of-coverage 750 includes radio link failure, or includes something more than a radio link failure. In certain embodiments, Edge-of-coverage 750 is implicitly defined. Edge-of-coverage 750 can be referred to as exceptional cases in which the D2D UE is in-coverage 745 but the D2D UE temporarily has difficulty to be within coverage. The exceptional cases include, for example, when the D2D UE is trying to establish an RRC connection. The exceptional cases include, for example, when the D2D UE is in-coverage 745, and is not able to establish an RRC connection during longer period in time. The exceptional cases include, for example, when the D2D UE is in-coverage 745 and experiences bad radio, such as when a timer, referred to as timer T310, is running for radio link failure process, where the timer T310 starts when a preconfigured number of 'out-of-sync' detections from lower layers, before the detection of radio link failure, in which the detection of radio link failure can be that the link cannot be recovered before T310 expires. The exceptional cases also include, for example, when a D2D UE needs to have RRC re-establishment, where a timer, referred to as timer T311, is running after RRC connection reestablishment is initiated or a timer, referred to as timer 301, is running after the D2D UE transmits RRC connection re-establishment request. The exceptional cases further include, for example, when there is reconfiguration requested by an infrastructure node for the D2D UE. In another example, edge-of-coverage 750 also is defined, for example, implicitly by instructing a D2D UE to use Mode 2 communication, by an infrastructure node, based on a UE's reported measurement and based on the network condition, such as accessibility for D2D Mode 1 of an infrastructure node, network load, and so forth.

The definition for in-coverage, edge-of-coverage, or out-of-coverage, can be determined based on a respective set of conditions, explicitly or implicitly. A set of conditions can include one or multiple metrics. For example, a signal measurement metric and respective threshold can be used to define such conditions, where the signal measurement metric can be signal strength with respect to an eNB, or eNBs, or network infrastructure relay nodes, such as reference signal received power (RSRP), reference signal received quality (RSRQ), and so forth. For example, if a D2D UE measures that RSRP of at least one of the network infrastructure nodes is no lower than a first threshold (Th1), the D2D UE is in-coverage. When RSRP of each of the network infrastructure nodes that the UE can measure is lower than the first threshold, that is Th1>RSRP, but at least one of the network infrastructure nodes has a RSRP that is greater than, or equal to, a second threshold (Th2), that is, Th2≤RSRP, where Th2<Th1, the D2D UE is in edge-of-coverage. When RSRP of each of the network infrastructure nodes that the D2D UE can measure of is lower than threshold, that is, Th2>RSRP, the D2D UE is out-of-coverage. A network infrastructure node can be an eNB, a cell, an RRH, a TP, or relay node.

Table 1 provides exemplary conditions for a D2D UE to be in-coverage, edge-of-coverage, out-of-coverage. The conditions in Table 1 can be viewed as in-coverage, edge-of-coverage, out-of-coverage with respect to a cell, or an infrastructure node.

For multiple infrastructure nodes, or multiple cells, a D2D UE is in-coverage when there is at least one of the infrastructure nodes with respect to which the D2D UE can be in-coverage. The D2D UE is out-of-coverage when each of the infrastructure nodes that the D2D UE can measure of is an out-of-coverage node to the D2D UE. For all the remaining situations, a D2D UE is in edge-of-coverage, that is, each of the infrastructure nodes that the D2D UE can measure of is not in-coverage, and the D2D UE is edge-of-coverage with at least one of the infrastructure nodes. A Same or similar interpretation applies throughput the embodiments of the present disclosure and the same, or similar, interpretation applies for other tables in the disclosure.

TABLE 1

Conditions for being in-coverage, edge-of-coverage, out-of-coverage

| | Conditions |
|---|---|
| In-coverage | Signal measurement metric ≥ Th1 |
| Edge-of-coverage | Th1 > Signal measurement metric ≥ Th2 |
| Out-of-coverage | Th2 > Signal measurement metric |

Table 2 provides another set of exemplary conditions for a D2D UE to be in-coverage, edge-of-coverage, out-of-coverage. Table 2 jointly uses signal measurement metric such as RSRP or RSRQ, and path loss. In Table 2, Th3 is also a threshold that can be predefined or configured. Basically, signal measurement metric such as RSRP or RSRQ is used to separate edge-of-coverage and out-of-coverage, and path loss is used to separate in-coverage and edge-of-coverage.

TABLE 2

Conditions for being in-coverage, edge-of-coverage, out-of-coverage

| | Conditions |
|---|---|
| In-coverage | Path loss ≤ Th3 |
| Edge-of-coverage | Th3 < Path loss, and Signal measurement metric ≥ Th2 |
| Out-of-coverage | Th2 > Signal measurement metric |

Table 3A provides another set of exemplary conditions for a D2D UE to be in-coverage, edge-of-coverage, out-of-coverage. In Table 3, the metric becomes whether a D2D UE can detect and decode DL (downlink) signal from network infrastructure node(s), and whether the UE can perform UL (uplink) random access over random access channel (RACH) successfully. When a UE can decode certain DL signaling, such as synchronization signal, physical broadcast channel, physical downlink control channel (PDCCH) of a certain network infrastructure node, the UE can be in DL coverage. When a D2D UE performs RACH successfully to a certain network infrastructure node, the UE can be in UL coverage. When the UE fails to perform RACH successfully, the UE can be out of UL coverage. When a D2D UE has DL coverage but no UL coverage, the UE can be in edge-of-coverage. When the UE does not have DL coverage, typically the UL RACH will also fail, so the UE can be out-of-coverage. When an UL measurement can be performed at eNB or other infrastructure node, that UL coverage also can be determined by the UL measurement results, instead of a determination of whether UL RACH fails or not.

TABLE 3A

Conditions for being in-coverage, edge-of-coverage, out-of-coverage

| | Conditions |
|---|---|
| In-coverage | DL signal decoding successful. UL RACH successful. |
| Edge-of-coverage | DL signal decoding successful. UL RACH fails. |
| Out-of-coverage | DL signal decoding fails. |

If an infrastructure node is barred for UE to access, or the node does not let D2D UE to access, for example, when the node does not support D2D communication, or when the node does not support Mode 1 D2D resource allocation but in-coverage UE would only use Mode 1 resource allocation, then UL random access for in-coverage D2D UE should be regarded as failure. When the node does not support D2D communication, or the node does not support Mode 2 D2D resource allocation but edge-of-coverage UE would only use Mode 2 resource allocation, then UL random access for in-coverage D2D UE should be regarded as failure. For the DL signal decoding success or failure, it can be for DL signals such as synchronization signal, physical broadcast channel, PDCCH, or physical shared channel.

Table 3B provides another example of the conditions, using general concept of with or without DL coverage, with or without UL coverage. An alternative, shown in Table 3C, is to have out-of-coverage defined as without DL coverage, without UL coverage, and edge-of-coverage can be defined as with DL coverage but without UL coverage, or with UL coverage but without DL coverage. The definition of within DL coverage can be, for example, DL signal decoding successful, or DL signal strength greater than a threshold, or the combinations, and the definition of without DL coverage can be the reverse. The definition of within UL coverage can be, for example, UL random access successful, or path loss lower than a threshold, or the combinations.

TABLE 3B

Conditions for being in-coverage, edge-of-coverage, out-of-coverage

| | Conditions |
|---|---|
| In-coverage | With DL coverage, with UL coverage |
| Edge-of-coverage | With DL coverage, without UL coverage |
| Out-of-coverage | Without DL coverage |

TABLE 3C

Conditions for being in-coverage, edge-of-coverage, out-of-coverage

| | Conditions |
|---|---|
| In-coverage | With DL coverage, with UL coverage |
| Edge-of-coverage | With DL coverage, without UL coverage, or with UL coverage, without DL coverage |
| Out-of-coverage | Without DL coverage, without UL coverage |

In certain embodiments, one or more of the conditions mentioned above are combined.

When certain conditions are satisfied, for example, as mentioned above, a D2D UE can be in respective state of in-coverage, edge-coverage, or out-of-coverage. When a D2D UE enters one of the state, and it will transition to another state from current state, the current state should last at least for a duration before it can be transitioned to another state, where the duration can be defined, for example, by certain timer. Different timers or different timer values can be defined for different current states. The durations can be configured, preconfigured, or fixed. Such durations can be useful to avoid ping-pong effects among states, that is, not to transit back and forth very quickly among the states.

Different approaches can be used for D2D communications with respect to transmission and reception, in terms of transmission Mode 1 and Mode 2, reception of information transmitted by Mode 1 and Mode 2, depending on whether the transmitter or the receiver is in-coverage, edge-coverage, or out-of-coverage.

FIGS. 8A through 8F illustrate states of operation for a mobile device according to embodiments of the present disclosure. The embodiments of the states 800 shown in FIGS. 8A through 8F are for illustration only. Other embodiments could be used without departing from the scope of the present disclosure.

In the examples shown in FIGS. 8A through 8F figures, M2 means Mode 2, M1 means Mode 1, Preconf. means preconfigured resources, Dedicated means resources configured by dedicated signaling, SIB means resources configured by SIB, Cached means resources configured based on cached information, or previously configured resources, and CONN means CONNECTED. A UE can use resources based on a cached configuration, a preconfigured configuration, the configuration based on SIB signaling, and configuration based on dedicated signaling. The priority of use by the UC can be, for example, preconfigured configuration<the configuration based on SIB signaling<configuration based on dedicated signaling, and for another example, preconfigured configuration<the configuration based on SIB signaling<cached configuration.

Figure 8A:
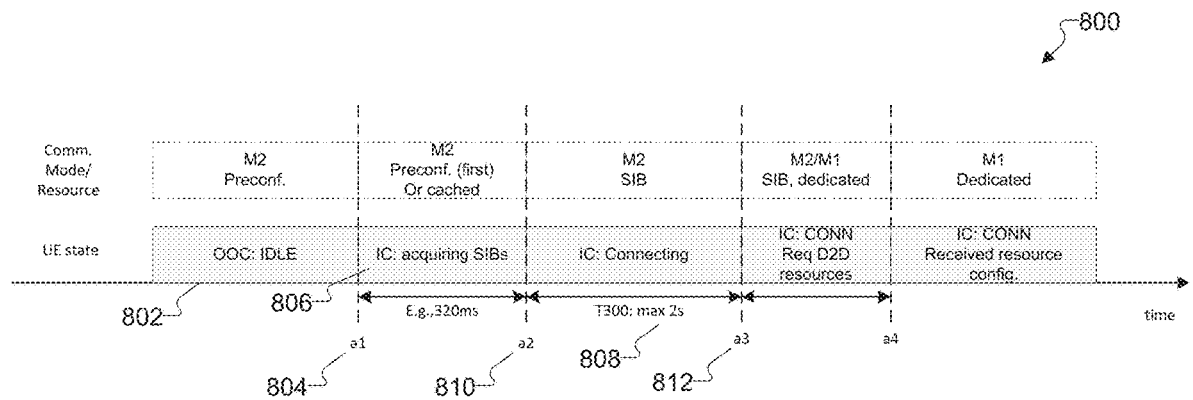

FIG. 8A illustrates example of UE connecting to cell according to embodiments of the present disclosure. Initially, the UE is in an idle state, such as OOC idle state 802.

At time a1 804, the UE enters IC and starts acquiring SIBs 806. A timer, T300 808, starts at time a2 810 when the UE is connecting. T300 808 stops at time a3 812 when the UE connects successfully. The UE can treat T300 808 running as one of the exceptional cases. Once the UE is connected, the UE uses use M1.

Figure 8B:
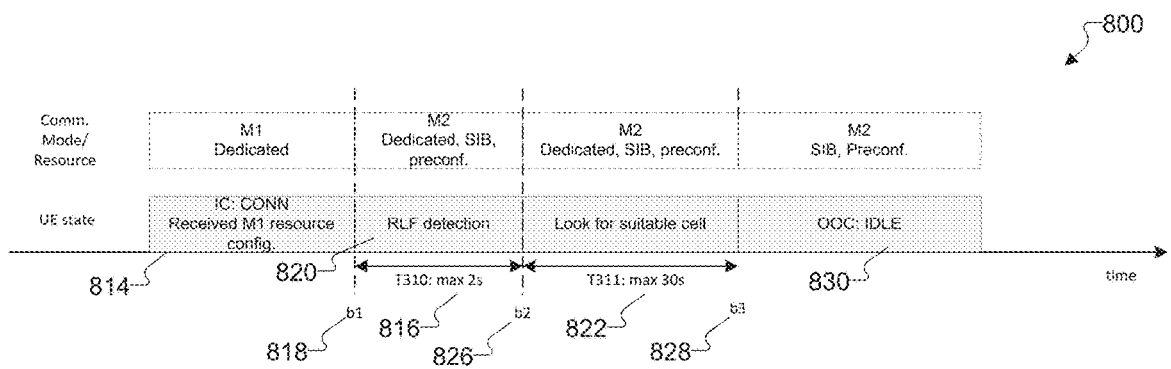

FIG. 8B illustrates example of radio link failure (RLF) according to embodiments of the present disclosure. Initially, the UE is in a connected (IC) state 814. Another timer, T310 816, starts running at time b1 818 when the UE detects a number (N–310) of times consecutive that the UE is out-of-sync. T310 816 stops if N–311 times consecutive in-sync is detected. When T310 816 expires, RLF 820 has been detected, and a timer, T311 822, starts at time b2 826 running. When T311 822 is running, the UE searches for suitable cell. If the UE does not find a suitable cell, but T311 822 expires at time b3 828, the UE goes to IDLE 830. The UE may treat T310 816, or T311 822, running as one of the exceptional cases.

Figure 8C:
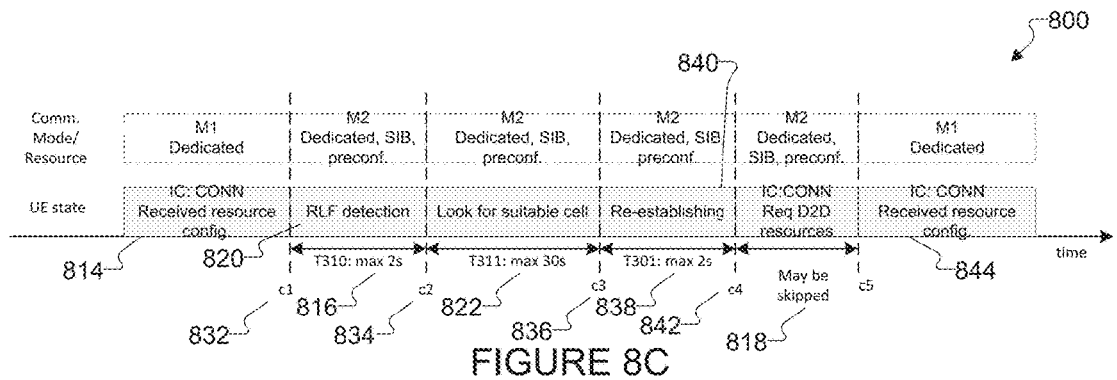

FIG. 8C illustrates example of RLF, re-establishing, and re-establishment successful according to embodiments of the present disclosure. Timing c1 832 and c2 834 can be the similar as b1 818, b2 826 respectively. When T311 822 is running, the UE searches for suitable cell. If the UE finds a suitable cell, T311 822 stops at time c3 836, and T301 838 starts at time c3 836. The UE performs RRC connection re-establishment 840. If re-establishment 840 is successful, T301 838 stops at time c4 842, and the UE becomes connected 844. The UE may treat T310 816, T311 822, or T301 838, running as one of the exceptional cases.

FIG. 8D illustrates an example of RLF, re-establishing, and connecting according to embodiments of the present disclosure. Timing d1 846, d2 848, d3 850 can be similar to c1 832, c2 834, c3 836, respectively. If the UE finds a suitable cell, T311 822 stops, and T301 838 starts. The UE performs RRC connection re-establishment 840. If re-establishment 840 is not successful, yet T301 838 stops, the UE starts T300 808 at time d4 852, and try to connect 854 to a new cell. If connection 854 to a new cell is successful, T300 808 stops, and UE is connected 856. The UE may treat T310 816, T311 822, T301 838, or T300 808 running as one of the exceptional cases.

FIG. 8E illustrates an example of RLF and re-establishing, and re-establishment failure according to embodiments of the present disclosure. Timing e1 858, e2 860, e3 862 can be the similar as d1 846, d2 848, d3 850, respectively. When T311 822 is running, the UE searches 864 for suitable cell. If the UE finds a suitable cell, T311 811 stops, and T301 838 starts. The UE performs RRC connection re-establishment 840. If T301 838 expires and re-establishment 840 is not successful at time e4 866, the UE becomes IDLE 868. In this case, for communication, Mode 2 870 can be used after RLF detection 820 all the way down to after re-establishment failure.

Figure 8F:
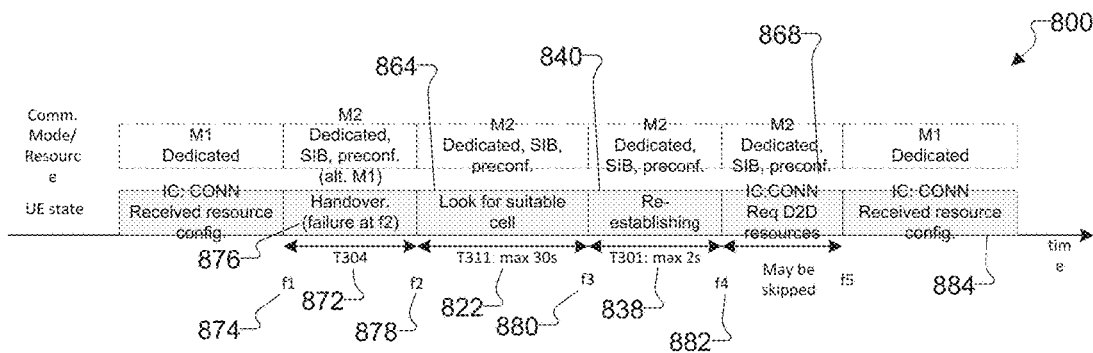

FIG. 8F illustrates an example of handover failure and re-establishment according to embodiments of the present disclosure. T304 872 starts running at time f1 874 when the UE is in handover operation 876. At expiration of T304 872, handover failure is detected at time f2 878. T311 822 starts running. When T311 822 is running, the UE searches 864 for suitable cell. If the UE finds a suitable cell, T311 822 stops at time f3 880, and T301 838 starts. The UE perform RRC connection re-establishment 840. If re-establishment 840 is successful, T301 838 stops at time f4 882, the UE become connected 884. The UE may treat T310 808, T311 822, or T301 838, running as one of the exceptional cases.

In one approach, when a D2D UE is in edge-of-coverage, it transmits control or data in Mode 2. For a D2D UE that is in-coverage, the D2D also tries to receive and decode SA or data in the SA or data resource pool for edge-of-coverage or out-of-coverage. When a first set of condition is satisfied, a D2D UE receives only in the resources scheduled by eNB for SA, for example, it can monitor a PDCCH which can convey the resources for SA. When a second set of condition is satisfied, a D2D UE receives and tries to decode SA in both the scheduled SA and the SA that is transmitted on resources selected from a resource pool. The first set condition can be, for example, that the D2D UE receiver is very far away from the network in-coverage boundary, so that the receiver does not receive information transmitted by D2D UEs edge-of-coverage or out-of-coverage. The first set of condition can be, the signal strength from eNB, such as RSRP, RSRQ, and so forth, can be larger than a predefined or (pre)-configured or fixed threshold, or the path loss from eNB can be below a predefined or (pre)-configured or fixed threshold. The second set of condition can be, the signal strength from eNB, such as RSRP, RSRQ, and so forth, can be in a respective predefined or (pre)-configured or fixed range, or the path loss from eNB can be below a respective predefined or (pre)-configured or fixed range. The second condition can be or may not be for the condition for a D2D UE to be in edge-of-coverage. Table 4 provides scenarios to receive information transmitted in Mode 1 or Mode 2, depending upon in-coverage, edge-of-coverage, out-of-coverage. The first and second condition mentioned above is to differentiate the case 'n.a.' and the case 'RX Mode 2' when RX is in-coverage and TX is edge-of-coverage or out-of-coverage, where the first set of condition is for 'n.a.' in first row in the table, and the second set of condition is for 'RX Mode 2' in the first row in the table. The first set of condition can be a RX at a UE1 720 location in FIG. 7A, and the second set of condition can be a RX at a UE1 720 location in FIG. 7B. When TX is in-coverage and it transmits in TX Mode 1, an RX that is out-of-coverage can be either not trying to receive and decode signal transmitted by TX Mode 1, for example, when the RX is far away from the coverage boundary, or the RX can receive and decode signal transmitted by TX Mode 1. This is reflected in Table 4, last row, with 'n.a. or RX Mode 1', respectively.

It is noted that in Table 4, 'TX in-coverage' means the D2D transmitter is within in-coverage 745 region, 'RX in-coverage' means the D2D receiver is within in-coverage 745 region. Similar interpretation can be for TX or RX edge-of-coverage, TX or RX out-of-coverage. 'TX Mode1' means transmitter uses Mode 1 to transmit. 'RX Mode 1' means receiver trying to receive and decode signal transmitted by Mode 1. Similar interpretation can be for TX Mode 2, or RX Mode 2. In Table 4, 'n.a.' means D2D receiver does not need to try to receive or decode the respective signal from TX in respective region. Similar interpretation holds for other tables in the disclosure.

TABLE 4

Scenarios to receive information transmitted in Mode 1 or Mode 2, depending on in-coverage, edge-of-coverage, out-of-coverage

|  | TX in-coverage, TX Mode 1 | TX edge-of-coverage TX Mode 2 | TX out-of-coverage, TX Mode 2 |
|---|---|---|---|
| RX in-coverage | RX Mode 1 | n.a., or RX Mode 2 | n.a., or RX Mode 2 |

TABLE 4-continued

Scenarios to receive information transmitted in Mode 1 or Mode 2, depending on in-coverage, edge-of-coverage, out-of-coverage

|  | TX in-coverage, TX Mode 1 | TX edge-of-coverage TX Mode 2 | TX out-of-coverage, TX Mode 2 |
|---|---|---|---|
| RX edge-of-coverage | RX Mode 1 | RX Mode 2 | RX Mode 2 |
| RX out-of-coverage | n.a. or RX Mode 1 | RX Mode 2 | RX Mode 2 |

Accordingly, different sets of conditions apply for a receiver to decide whether to receive and decode signal transmitted in Mode 1 only, in Mode 2 only, or a signal transmitted in either Mode 1 or Mode 2. Table 5 illustrates conditions for RX to receive information transmitted in Mode 1 or Mode 2. Table 5 is an adjustment of Table 1, further dividing the condition for in-coverage to two categories, and also further dividing the condition for out-of-coverage to two categories. Similarly, Table 2 can also be adjusted accordingly to have conditions for RX to receive information transmitted in Mode 1 or Mode 2, and the adjustment is shown in Table 6. Any combination of Table 5, Table 6, Table 3 can also apply.

TABLE 5

Conditions for RX to receive information transmitted in Mode 1 or Mode 2

|  |  | Conditions |
|---|---|---|
| RX In-coverage | RX Mode 1 | Signal measurement metric ≥ T1_RX_Mode1 |
|  | RX Mode 1 & 2 | Th1_RX_Mode1 > Signal measurement metric ≥ Th1 |
| RX Edge-of-coverage | RX Mode 1 & 2 | Th1 > Signal measurement metric ≥ Th2 |
| RX Out-of-coverage | RX Mode 1 & 2 | Th2 > Signal measurement metric ≥ Th2_RX_Mode2 |
|  | RX Mode 2 | Th2_RX_Mode2 > Signal measurement metric |

TABLE 6

Conditions for RX to receive information transmitted in Mode 1 or Mode 2

|  |  | Conditions |
|---|---|---|
| RX In-coverage | RX Mode 1 | Path loss ≤ Th3_RX_Mode1 |
|  | RX Mode 1 & 2 | Th3_RX_Mode1 < Path loss ≤ Th3 |
| RX Edge-of-coverage | RX Mode 1 & 2 | Th3 < Path loss, and Signal measurement metric ≥ Th2 |
| RX Out-of-coverage | RX Mode 1 & 2 | Th2 > Signal measurement metric ≥ Th2_RX_Mode2 |
|  | RX Mode 2 | Th2_RX_Mode2 > Signal measurement metric |

When out-of-coverage definition or conditions and in-coverage definition or conditions are set such, or imply such, that a D2D RX in-coverage cannot receive, the D2D UE does not try to receive or decode signal transmitted by a TX out-of-coverage, and vice versa, a D2D RX out-of-coverage cannot also does not try to receive or decode signal transmitted by a TX in-coverage, Table 4 can become Table 7 as follows. Accordingly, Table 5 and Table 6 become Table 8 and Table 9, respectively.

TABLE 7

Scenarios to receive information transmitted in Mode 1
or Mode 2, depending on in-coverage,
edge-of-coverage, out-of-coverage

|  | TX in-coverage, TX Mode 1 | TX edge-of-coverage TX Mode 2 | TX out-of-coverage, TX Mode 2 |
|---|---|---|---|
| RX in-coverage | RX Mode 1 | n.a., or RX Mode 2 | n.a. |
| RX edge-of-coverage | RX Mode 1 | RX Mode 2 | RX Mode 2 |
| RX out-of-coverage | n.a. | RX Mode 2 | RX Mode 2 |

TABLE 8

Conditions for RX to receive information
transmitted in Mode 1 or Mode 2

|  |  | Conditions |
|---|---|---|
| RX In-coverage | RX Mode 1 | Signal measurement metric ≥ Th1_RX_Mode1 |
|  | RX Mode 1 & 2 | Th1_RX_Mode1 > Signal measurement metric ≥ Th1 |
| RX Edge-of-coverage | RX Mode 1 & 2 | Th1 > Signal measurement metric ≥ Th2 |
| RX Out-of-coverage | RX Mode 2 | Th2 > Signal measurement metric |

TABLE 9

Conditions for RX to receive information transmitted in Mode 1 or Mode 2

|  |  | Conditions |
|---|---|---|
| RX In-coverage | RX Mode 1 | Path loss ≤ Th3_RX_Mode1 |
|  | RX Mode 1 & 2 | Th3_RX_Mode1 < Path loss ≤ Th3 |
| RX Edge-of-coverage | RX Mode 1 & 2 | Th3 < Path loss, and Signal measurement metric ≥ Th2 |
| RX Out-of-coverage | RX Mode 2 | Th2 > Signal measurement metric |

In another approach, when a D2D UE is in edge-of-coverage, the D2D UE transmits control or data in Mode 1, and the D2D UE also transmits control or data in Mode 2. A D2D UE that is in-coverage receives information transmitted in Mode 1. A D2D UE that is in edge-of-coverage, or out-of-coverage, receives information transmitted in Mode 2. Table 10 illustrates scenarios to receive information transmitted in Mode 1 or Mode 2, depending upon in-coverage, edge-of-coverage, out-of-coverage.

TABLE 10

Scenarios to receive information transmitted in Mode
1 or Mode 2, depending on in-coverage,
edge-of-coverage, out-of-coverage

|  | TX in-coverage, TX Mode 1 | TX edge-of-coverage TX Mode 1, TX Mode 2 | TX out-of-coverage, TX Mode 2 |
|---|---|---|---|
| RX in-coverage | RX Mode 1 | RX Mode 1 | n.a., or RX Mode 2 |
| RX edge-of-coverage | RX Mode 1 | RX Mode 1, RX Mode 2 | RX Mode 2 |
| RX out-of-coverage | n.a., or RX Mode 1 | RX Mode 2 | RX Mode 2 |

If out-of-coverage definition and in-coverage definition are, or imply, such that a D2D RX in-coverage cannot receive so the D2D RX does not try to receive or decode a signal transmitted by a TX out-of-coverage, and vice versa, a D2D RX out-of-coverage cannot receive so the D2D RX does not try to receive or decode signal transmitted by a TX in-coverage, Table 10 can become Table 11 as follows. Further, Table 12 illustrates conditions for RX to receive information transmitted in Mode 1 or Mode 2, regarding Table 11. It can be seen that Table 12 is simpler than any of Tables 5, 6, 8, 9. Therefore, allowing TX in edge-of-coverage to have both Mode 1 and Mode 2 has an advantage of simplifying D2D receiver algorithm.

TABLE 11

Scenarios to receive information transmitted in
Mode 1 or Mode 2, depending on in-coverage,
edge-of-coverage, out-of-coverage

|  | TX in-coverage, TX Mode 1 | TX edge-of-coverage, TX Mode 1, TX Mode 2 | TX out-of-coverage, TX Mode 2 |
|---|---|---|---|
| RX in-coverage | RX Mode 1 | RX Mode 1 | n.a. |
| RX edge-of-coverage | RX Mode 1 | RX Mode 1, RX Mode 2 | RX Mode 2 |
| RX out-of-coverage | n.a. | RX Mode 2 | RX Mode 2 |

TABLE 12

Conditions for RX to receive information transmitted in Mode 1
or Mode 2, regarding Table 11

| RX In-coverage | RX Mode 1 |
|---|---|
| RX Edge-of-coverage | RX Mode 1 & 2 |
| RX Out-of-coverage | RX Mode 2 |

When there is an inner coverage, which can be within in-coverage, where a D2D RX in inner-coverage cannot receive so D2D RX does not try to receive or decode signal transmitted by a TX out-of-coverage or edge-of-coverage, the D2D RX can have two categories, RX Mode 1, and RX Mode 1 & 2. When the D2D RX is in inner-coverage, the D2D RX uses RX Mode 1, otherwise, the D2D RX uses RX Mode 1 & 2. The inner coverage can be, for example, when a D2D RX is very close by an infrastructure node. A D2D UE can report its measurement to network, and the D2D UE can be configured to be in inner coverage by the network, for example, by an infrastructure node. The network can configure the D2D UE to be in inner coverage based on the measurement and other conditions, for example, whether the network supports an inner-coverage operation.

TABLE 12A

Conditions for RX to receive information transmitted in
Mode 1 or Mode 2

| RX in Inner-coverage | RX Mode 1 |
|---|---|
| Otherwise | RX Mode 1 & 2 |

When a D2D UE is in-coverage, where the D2D UE can be either a D2D transmitter, or a D2D receiver, or both, an alternative for the UE to use the conditions as illustrated in the Tables above to decide the RX or TX mode, the network infrastructure node, for example, the serving cell of the UE, can instruct the UE to use a respective RX or TX mode, for example, RX Mode 1, or RX Mode 2, or RX Mode 1 & 2, TX Mode 1, or TX Mode 2, or TX Mode 1 & 2. The conditions that the network infrastructure node would use to determine respective mode can be based on the UE's measurement report, and network conditions such as network load, and so forth. The conditions may not need to be known by the UE, rather, they may be up to the network implementation. The UE can be configured by the network on the triggers for measurement report for the TX mode transition, for example, transition from Mode 1 to Mode 2, or vice versa; or entering or leaving Mode 2, or the triggers for measurement report for the RX mode transition, for example, transition from RX Mode1 to RX Mode 1&2, or vice versa.

For D2D communication, to assist that a D2D UE can receive and decode signal or information transmitted by other D2D UEs in Mode 1 and signal or information transmitted by other D2D UEs in Mode 2, a D2D UE may need to know the resources allocated for transmission in Mode 1 and Mode 2. The resources allocated for transmission in Mode 1 can be orthogonal to the resources allocated for transmission in Mode 2. For example, Frequency division multiplexing (FDM), or time division multiplexing (TDM), or code division multiplexing (CDM), or combinations, can apply.

Figure 9:
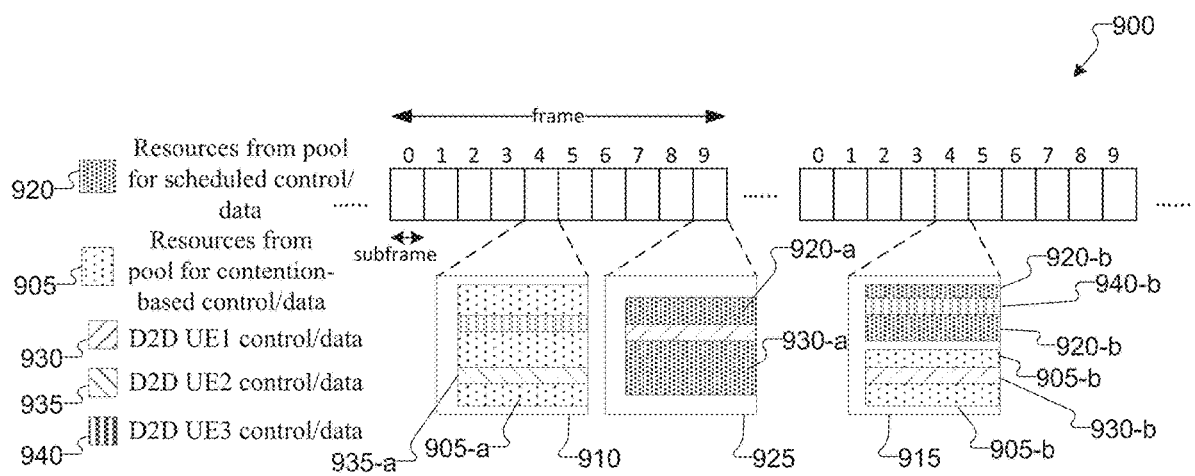
FIG. 9 illustrates an exemplary frame structure for D2D data and control with separate resources for transmission in Mode 1 or Mode 2, according to embodiments of the present disclosure.

FIG. 9 illustrates an exemplary frame structure for D2D data and control with separate resources for transmission in Mode 1 or Mode 2, according to embodiments of the present disclosure. The embodiment of the frame structure 900 shown in FIG. 9 is for illustration only. Other embodiments could be used without departing from the scope of the present disclosure.

In the example shown in FIG. 9, one or more sub-frames include resources 905 from a pool for contention-based control and data. For example, a first sub-frame 910 includes resources 905-a from pool for contention-based control and data and a second sub-frame 915 include resources 905-b from pool for contention-based control and data. One or more sub-frames also include resources 920 from pool for scheduled, contention-free, control and data. For example, a third sub-frame 925 includes resources 920-a from pool for scheduled, contention-free control and data and the second sub-frame 915 also includes resources 920-b from pool for scheduled, contention-free control and data. The contention-based and contention-free control and data can be in a same sub-frame, or some sub-frames can have contention-based control and data while other sub-frames can have resources for contention-free control and data. D2D UE1 is scheduled to transmit control and data 930 in one or more sub-frames. D2D UE2 is scheduled to transmit control and data 935 in one or more sub-frames. D2D UE3 is scheduled to transmit control and data 940 in one or more sub-frames. For example, the D2D UE1 can transmit control and data 930-a using resources 920-a in the third sub-frame 925. D2D UE2 chooses, by contention, resources 905-a from pool in the first sub-frame 910 to transmit control and data 935. D2D UE3 chooses, by contention, resources from pool 905-a in the first sub-frame 910 to transmit control and data 940-a. UE1 chooses (by contention) resources from pool 905-b in the second sub-frame 915 to transmit control and data 930-b. UE3 is scheduled to transmit control and data 940-b using resources 920-b in pool in the second sub-frame 915. The control information can be, for example, SA.

Figure 10:
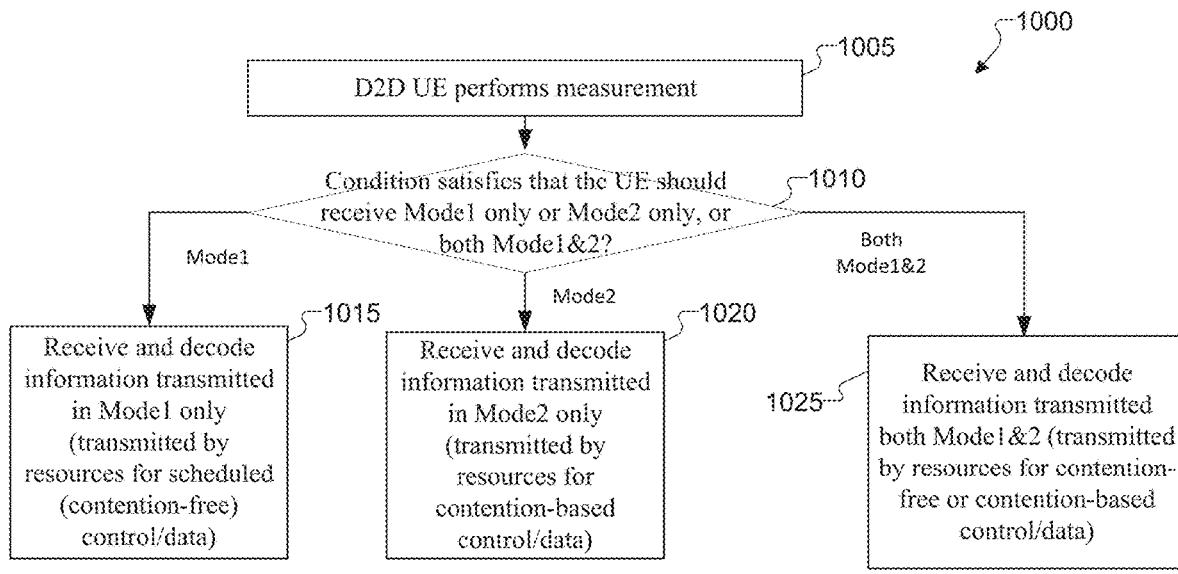
FIG. 10 illustrates process for a D2D UE to receive and decode D2D control/data information transmitted by other UEs in Mode 1 or Mode 2 according to embodiments of the present disclosure.

FIG. 10 illustrates process 1000 for a D2D UE to receive and decode D2D control/data information transmitted by other UEs in Mode 1 or Mode 2 according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

In block 1005, a D2D UE performs signal measurement. In block 1010, the D2D UE determines which set of conditions that are satisfy, such as, the conditions in Table 5, 6, 8, 9, 12, or jointly considered with Table 1, 2, 3. If the condition satisfies that the UE should receive and decode signal or information transmitted by Mode 1 only, the D2D UE receives and decodes information transmitted in Mode 1 only in block 1015. In block 1015, the D2D UE determines the resources for scheduled or contention-free control and data, and receives or decodes signal transmitted from the determined resources. If the condition satisfies that the UE should receive and decode signal or information transmitted by Mode 2 only, the D2D UE receives and decodes information transmitted in Mode 2 only in block 1020. In block 1020, the D2D UE determines the resources for contention-based control and data, and receives or decodes signal transmitted from the determined resources. If the condition satisfies that the UE should receive and decode signal or information transmitted by Mode 1 and Mode 2, the D2D UE receives and decodes information transmitted in Mode 1 and Mode 2 in block 1025. In block 1025, the D2D UE determines the resources for contention-based and contention-free control and data, and receives or decodes signal transmitted from the determined resources. The control information can be, for example, SA.

When a D2D UE is in-coverage, The D2D UE can be a D2D transmitter, a D2D receiver, or both. An alternative for the UE to use the conditions, such as those in the aforementioned tables, the network infrastructure node, such as the serving cell of the UE, can instruct the UE to use a respective RX Mode 1, or RX Mode 1 & 2. The conditions that the network infrastructure node uses to determine respective mode can be based on the UE's measurement report, and network conditions such as network load, and so forth. A UE in coverage, such as, the D2D UE, like UE1 715 in FIG. 7A, that is around the eNB center and away from out-of-coverage UEs, can use SA resource pool for monitoring such as, SA resource pool for Mode1, which can be configured by eNB. A UE in coverage, such as when the D2D UE is around the eNB edge, like as UE1 715 in FIG. 7B, can have a chance to receive out-of-coverage UEs and can use SA resource pool, such as an SA resource pool for Mode1 and Mode2, which can be configured by eNB. A D2D UE can autonomously decide when to use RX Mode 2, based on certain conditions such as the respective conditions in aforementioned tables for example, if the D2D UE does not detect any DL signal from any infrastructure node.

Figure 11:
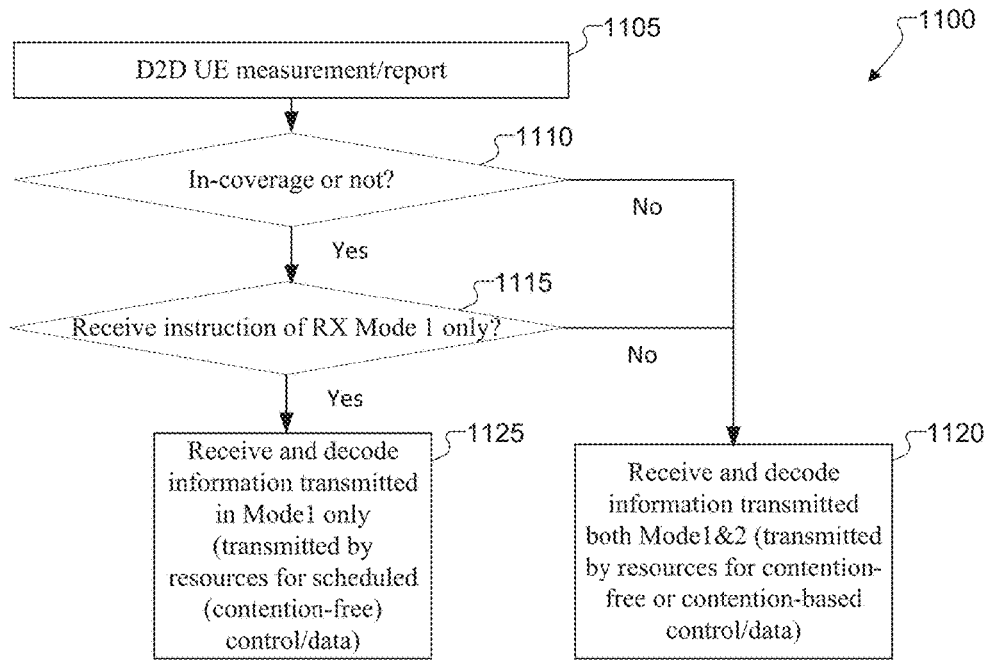
FIG. 11 illustrates a process for a D2D UE to receive and decode D2D control and data information transmitted by other UEs in Mode 1 or Mode 2, according to different conditions according to embodiments of the present disclosure.

The measurement report can be triggered by a specific event, for example, when a serving cell signal is worse than a preconfigured threshold, where the threshold is related to D2D Mode2. For example, if measurement+Hys<threshold, the D2D UE enters RX Mode 1&2, or the D2D UE reports the measurement for the eNB to decide that the D2D UE should enter RX Mode 1&2, and if measurement−Hys>threshold, the D2D UE leaves RX Mode 1&2, and to use RX Mode 1, or the D2D UE reports the measurement for the eNB to decide that the D2D UE should leave RX Mode 1&2 to use RX Mode 1. The threshold is the threshold related to the event of using RX Mode 1&2, Hys is the hysteresis parameter for this event. The thresholds can be preconfigured or informed to the UE by system information FIG. 11 illustrates a process 1100 for a D2D UE to receive and decode D2D control/data information transmitted by other UEs in Mode 1 or Mode 2, according to different conditions according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

In block 1105, a D2D UE performs measurement. The D2D UE can report the measurement when certain conditions are met or when instructed by a network infrastructure node. The D2D UE determines whether its D2D RX is in coverage or not in block 1110, and whether the D2D UE receives instruction of RX mode 1 only in block 1115. When the D2D UE is not in coverage or when the D2D UE is in coverage but the D2D UE does not receive any instruction of RX Mode 1 from infrastructure node, in block 1120, the D2D UE receives and decodes information transmitted in both Mode 1 & Mode 2. The information can be received from one or multiple cells. The reception pool may be broadcasted by SIB from network infrastructure node or PD2DSCH from another UE, or preconfigured. I, block 1120, the D2D UE also can receive and decode information transmitted by Mode 2 only, such as when the reception pool preconfigured is for RX Mode 2 only. If the D2D UE is in coverage and the D2D UE receives instruction of RX Mode 1 only, the D2D UE receives and decodes information transmitted in Mode 1 only in block 1125. The reception pool can be indicated by network infrastructure node, for example, the transmit pool for Mode 1, which can be broadcasted by SIB, or a reception pool for only RX Mode 1 signaled to the UE.

Figure 12:
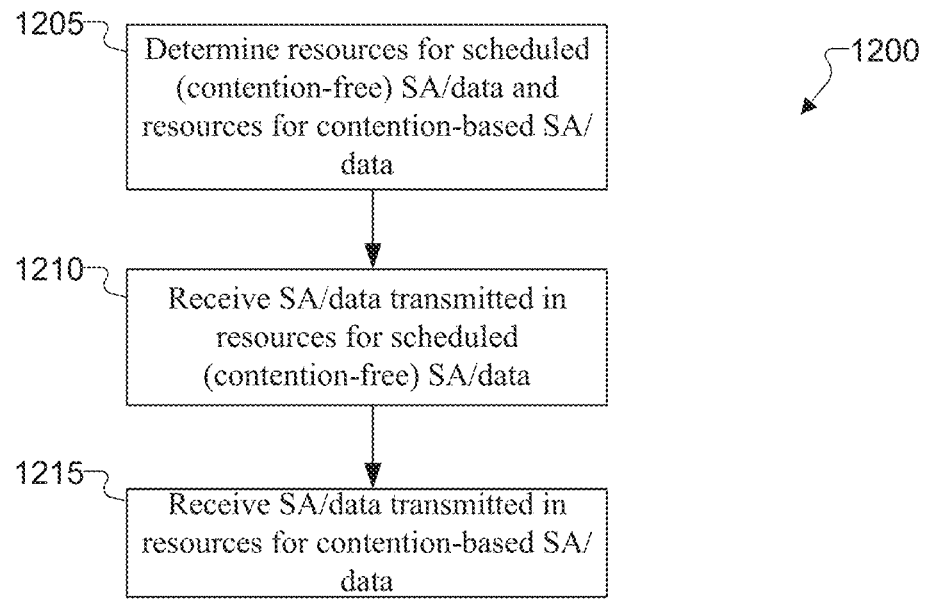
FIG. 12 illustrates a process for a D2D UE to receive and decode D2D control and data information transmitted by other UEs in Mode 1 or Mode 2 according to embodiments of the present disclosure.

FIG. 12 illustrates a process 1200 for a D2D UE to receive and decode D2D control and data information transmitted by other UEs in Mode 1 or Mode 2 according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

In block 1205, a D2D UE determines resources for scheduled, contention-free SA/data and resources for contention-based SA/data. The D2D UE receives and decodes SA/data transmitted in resources for scheduled, contention-free, SA/data in block 1210. In block 1215, the D2D UE receives and decodes SA/data transmitted in resources for contention-based SA/data 630. Block 1210 and Block 1215 can be processed in parallel, or one sequentially, such as block 1210 followed by block 1215 or block 1215 followed by block 1210.

To facilitate that a D2D UE can receive and decode a signal or information transmitted by other D2D UEs in Mode 1 and a signal or information transmitted by other D2D UEs in Mode 2, the D2D UE needs to know the resources allocated for transmission in Mode 1 and Mode 2. The PD2DSCH transmitted by the D2D UE and system information block (SIB) or PDCCH or RRC message or higher layer message transmitted by an infrastructure node can carry the information for contention-based resource pool. For example, a PDCCH with a predefined or reserved D2D-Radio Network Temporary Identifier (RNTI) that is common to all D2D UEs can carry such information, and a D2D UE can try to decode the PDCCH using the reserved RNTI for D2D. The PD2DSCH transmitted by D2D UE and SIB or PDCCH can also carry the resource pool for scheduled, contention-free, control and data, that is, the resource pool for Mode 1 transmission. For example, a PDCCH with a predefined or reserved D2D-RNTI that is common to all D2D UEs can carry such information. The D2D UE can try to decode the PDCCH using the reserved RNTI for D2D. The D2D UE that is out-of-coverage does not need to include in PD2DSCH the information on resource pool for Mode 1 transmission. The D2D UE that is in-coverage or edge-of-coverage includes in PD2DSCH the information on resource pool for Mode 1 transmission. If a D2D UE in out-of-coverage is not expected to receive information transmitted from a D2D UE in-coverage, such as via applying definitions or conditions for being out-of-coverage and in-coverage, information on resource pool for Mode 1 transmission may not be needed to be included in PD2DSCH, rather the D2D UE can be sufficient to have it in SIB or PDCCH transmitted by a network infrastructure node, as long as D2D UEs in edge-of-coverage can receive such. Alternatively, to facilitate that a D2D UE can receive and decode signal or information transmitted by other D2D UEs in Mode 1 and signal or information transmitted by other D2D UEs in Mode 2, a D2D UE may need to know resource pool (time and frequency) in which the D2D UE attempts to receive scheduling assignments, where the resource pool for reception can take into account the resources allocated for transmission in Mode 1 and Mode 2, from one or multiple nodes (such as neighboring nodes). Table 13 illustrates exemplary information field in PD2DSCH. In Table 13, each configuration index of resource pool indicates a certain configuration, where the configuration can include the information on the resources in time or frequency domain. The configuration also can be differently configured for TDD or FDD system.

TABLE 13

Information fields on resource pool

| | Size (bits) | Information |
|---|---|---|
| . . . | . . . | . . . |
| Configuration index of resource pool for Mode 1 transmission | 3 | 000: Configuration 1<br>001: Configuration 2<br>010: Configuration 3<br>011: Configuration 4<br>100: Configuration 5<br>101,110, 111: reserved |
| Configuration index of resource pool for Mode 2 transmission | 3 | 000: Configuration 1<br>001: Configuration 2<br>010: Configuration 3<br>011: Configuration 4<br>100: Configuration 5<br>101,110, 111: reserved |
| . . . | . . . | . . . |
| Configuration index of resource pool for reception | 3 | 000: Configuration 1<br>001: Configuration 2 |

TABLE 13-continued

Information fields on resource pool

| | Size (bits) | Information |
|---|---|---|
| (SA/data) by Mode 1 and Mode 2 | | 010: Configuration 3<br>011: Configuration 4<br>100: Configuration 5<br>101, 110, 111: reserved |
| ... | ... | ... |

Assume in-coverage D2D uses resource allocation Mode 1, edge-of-coverage or out-of-coverage D2D uses resource allocation Mode 2.

If conditions for in-coverage and out-of-coverage can be set to such that the conditions imply a D2D RX out-of-coverage cannot receive signal transmitted by a D2D TX in-coverage, such that the D2D RX does not try to decode signal transmitted by a TX out-of-coverage, then the D2D RX out-of-coverage only needs to support to receive and decode signal transmitted with resource allocation Mode 2. This means that the reception pool for a D2D RX out-of-coverage only needs to take into account the TX resource allocation by Mode 2. It further means that there can be no need to indicate reception pool taking into account the TX resource allocation by Mode 1, in any of the signals transmitted by a D2D UE, because only a D2D UE in-coverage or edge-of-coverage would be interested in such information and the information can be obtained via DL from infrastructure node(s).

Otherwise, if a D2D RX out-of-coverage can receive signal transmitted by a D2D TX in-coverage, there can be a need to indicate reception pool taking into account the D2D TX resource allocation by Mode 1 and the D2D TX resource allocation by Mode 1, in some signals (such as PD2DSCH) transmitted by a D2D UE. This implies that the D2D TX resource allocation by Mode 1 may need to be within a certain pool that does not change dynamically in time, to allow the reception pool taking into account the D2D TX resource allocation by Mode 1 not to change dynamically in time.

In certain embodiments, D2D communications have robustness support for D2D services. D2D services maintain continuity when D2D UEs are changing status such as due to mobility, channel state change, and so forth. Prior to network topology and association changes, a D2D UE is provided with information related to the change, so when the change is effective, D2D service can be maintained smooth. Prior to a change of state from D2D TX in-coverage to D2D TX edge-of-coverage, the parameters to be used related to D2D TX edge-of-coverage can be provided to the UE beforehand, to ensure smooth switch and service continuity.

During the transition time of a state change among in-coverage, edge-of-coverage, or out-of-coverage, prior to a new resource allocation mode (Mode 1 or Mode 2) is ready, a D2D UE can keep on using the previously used resource allocation mode. After a new resource allocation mode is ready, the D2D UE can use the previously used resource allocation mode as well as the new resource allocation mode, for a certain period of time, to ensure robust communication during transition.

An eNB can configure a D2D UE to report measurement. The eNB can take into account the measurement report, and other factors, such as network load, UE's capability, and so forth, to configure the UE to use Mode 2 or switch from Mode 1 to Mode 2. The Measurement or measurement report triggers related to this operation can be needed for the eNB to configure the UE. For example, measurement report can be triggered by an event of serving cell is worse than a preconfigured threshold, where the threshold is related to D2D Mode2. For example, if measurement+Hys<threshold, the UE enters Mode 2, or the UE reports the measurement for the eNB to decide that the UE should enter Mode 2, and if measurement−Hys>threshold, the UE leaves Mode 2, and uses Mode 1, or the UE reports the measurement for the eNB to decide that the UE should leave Mode 2 to use Mode 1. The threshold is the threshold related to the event of using Mode 2, Hys is the hysteresis parameter for this event. The thresholds can be preconfigured or informed to the UE by system information.

Figure 13:
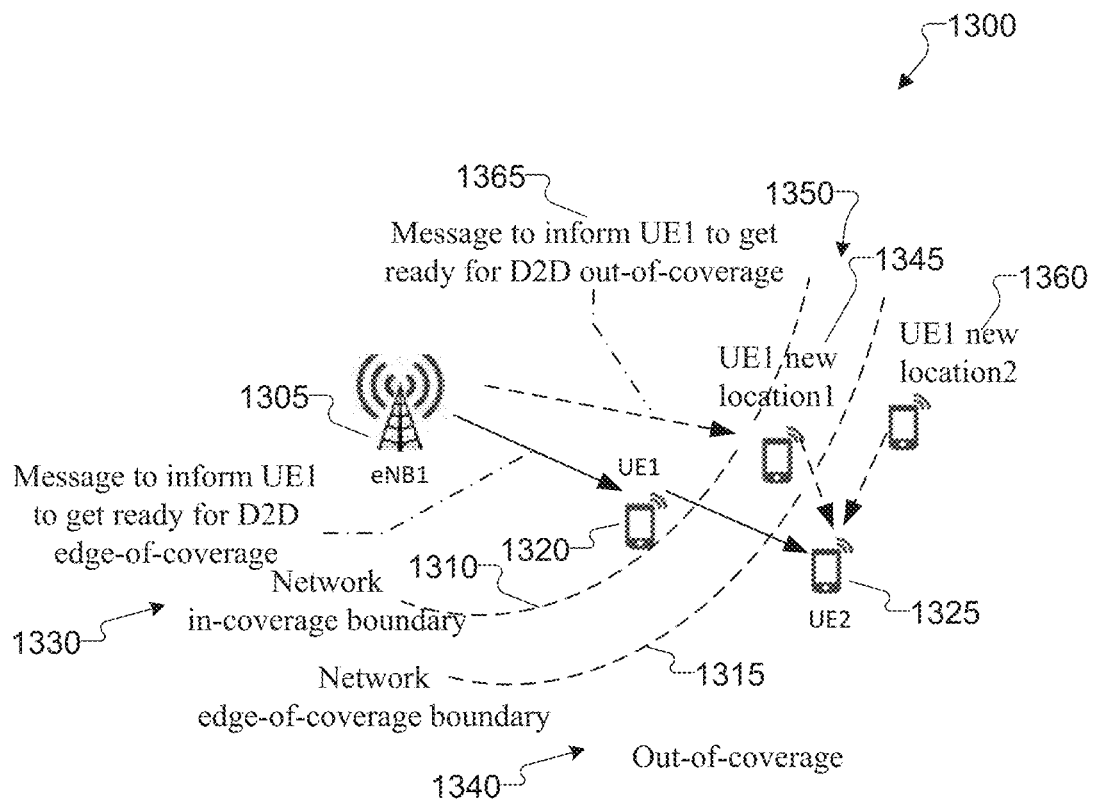
FIG. 13 illustrates scenarios for D2D communication reconfigurations due to mobility according to embodiments of the present disclosure.

FIG. 13 illustrates scenarios for D2D communication reconfigurations due to mobility according to embodiments of the present disclosure. The embodiment of the D2D communication network 1300 shown in FIG. 13 is for illustration only. Other embodiments could be used without departing from the scope of the present disclosure.

The D2D communication network 1300 includes a first eNB, eNB1 1305, that is able to communicate with a number of UEs within a network in-coverage boundary 1310 and within a network edge-of-coverage boundary 1315. The eNB1 1305 communicates with UE1 1320 within the network coverage boundary 1310. The eNB1 1305 can be configured the same as, or similar to, eNB 102. One or more of the UE1 1320 and UE2 1325 shown in FIG. 13 can be configured the same as, or similar to, UE 116.

In the example shown in FIG. 13, eNB1 1305 initially can communicate with UE1 1320. UE1 1320 is in-coverage 1330 as UE1 1320 is within network in-coverage boundary 1310. UE2 1325 is out-of-coverage 1340. UE1 1320 uses Mode 1 to transmit D2D control and data. UE1 1320 moves to new location-1 1345, which is in edge-of-coverage 1350 as location-1 1345 is within edge-of-coverage boundary 1315 but beyond in-coverage boundary 1310. Prior to UE1 1320 applying D2D transmission in edge-of-coverage 1350, UE1 1320 reports measurement and eNB1 1305 reconfigures D2D communication for UE1 1320 by sending a message 1355 to UE1 1320 to inform UE1 1320 to get ready for D2D edge-of-coverage 1350. UE1 1320 can then use the new configuration for D2D communication. UE1 1320 further moves to new location-2 1360, which is out-of-coverage 1340. Prior to UE1 1320 applying D2D transmission out-of-coverage, UE1 1320 may still be able to receive information 1365 from eNB1 1305 for reconfiguration, but UE1 1320 may not be able to feedback information to eNB1 1305. That is, in certain situations, UE1 1320 is able to receive information 1365 but eNB1 1305 does not receive feedback from UE1 1320. An alternative is that information 1365 can be omitted, while information 1355 include all the necessary information for reconfiguration of D2D communication, and UE1 1320 in edge-of-coverage 1350 and out-of-coverage 1340 uses a same configuration for D2D communication.

Figure 14:
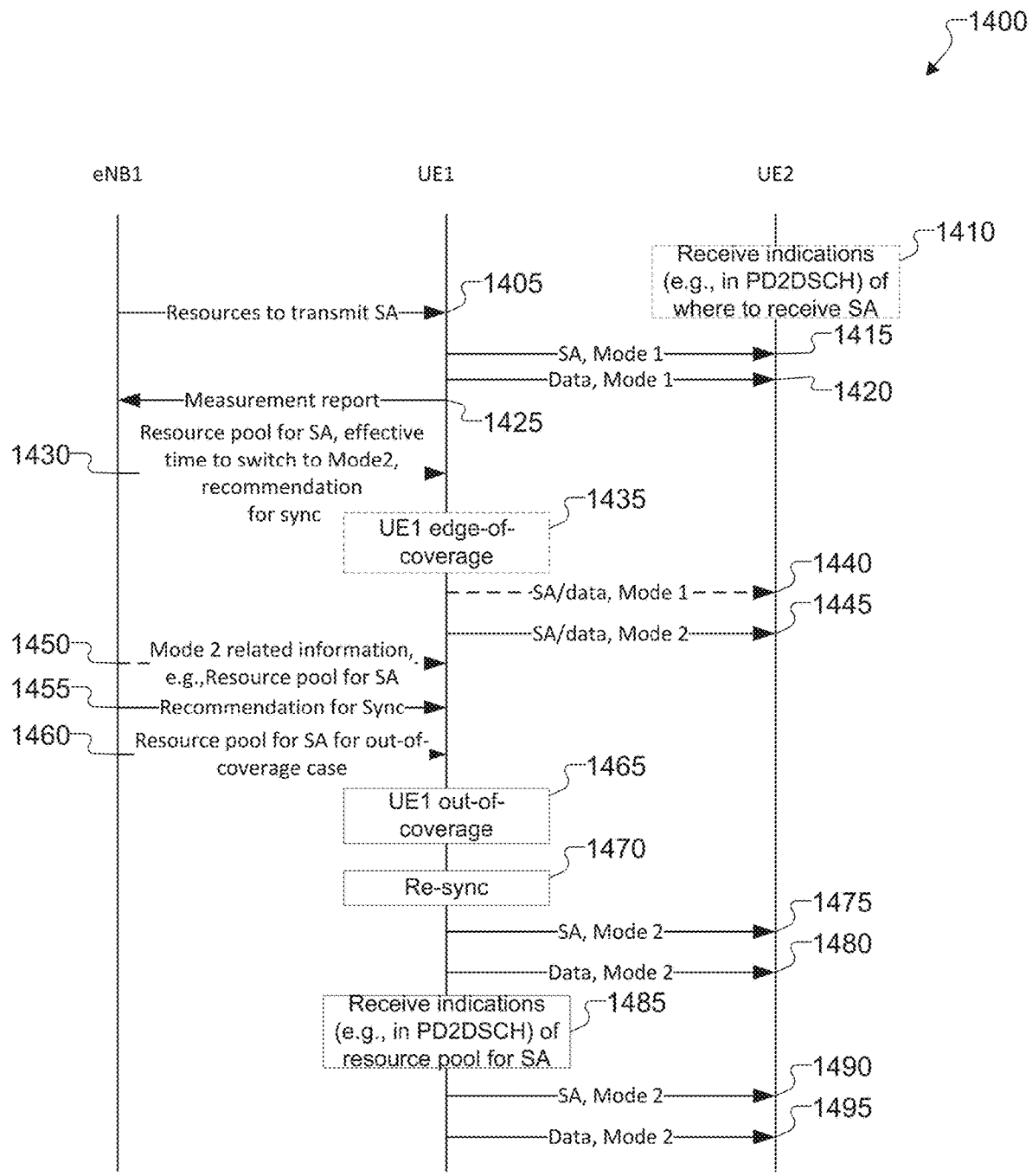
FIG. 14 illustrates operations for D2D communication reconfigurations due to mobility according to embodiments of the present disclosure.

FIG. 14 illustrates operations 1400 for D2D communication reconfigurations due to mobility according to embodiments of the present disclosure. While the signal diagram depicts a series of sequential signals, unless explicitly stated, no inference should be drawn from that sequence regarding specific order of performance, performance of signals or portions thereof serially rather than concurrently or in an overlapping manner, or performance of the signals depicted exclusively without the occurrence of intervening or intermediate signals. The operations 1400 depicted in the example depicted is implemented by transmitter and receiver chains in, for example, a mobile station and a transmitter and receiver chains in, for example, a base station.

The eNB1 schedules resources for UE1 to transmit SA for D2D communication 1405. A UE2 in proximity of UE1 can receive indication of where to receive SA or the resources for scheduled SA in block 1410. The indication can be from the PD2DSCH transmitted by the other D2D UE, or from SIB or PDCCH if UE2 is in-coverage or edge-of-coverage. Alternatively, UE2 can have preconfigured reception pool for SA. UE1 transmits control, such as SA 1415, in Mode 1. UE1 transmits D2D data 1420 in Mode 1. Alternatively, D2D data 1420 may also be together with control 1420. UE1 performs measurement and report the measurement 1425.

reliability, even though at this point UE1 may not be able to feedback. For example, eNB1 can send resource pool for SA 1450, and recommendation for synchronization 1455, and resource pool for SA for out-of-coverage 1460 if such pool is different from the pool for UE in edge-of-coverage. The signaling can be dedicated to UE1. UE1 becomes out-of-coverage in block 1465. UE1 performs re-synchronization 1470. UE1 transmits SA 1475 and data 1480. UE1 also can receive information on resource pool for SA/data from other D2D UEs 1485. If the information on the pool is different from preciously received information on the resource pool, UE1 uses updated pool, and transmits SA 1490 and data 1495.

Table 13A illustrates an example of the information carried or included by signal or message from eNB to UE, where the information is related to Mode 2 transmission.

TABLE 13A

Example of information fields for Mode 2 related information

| Fields | Information |
|---|---|
| . . . | . . . |
| Configuration index of resource pool for Mode 2 transmission | 000: Configuration 1<br>001: Configuration 2<br>010: Configuration 3<br>011: Configuration 4<br>100: Configuration 5<br>101, 110, 111: reserved |
| Resource selection related information for Mode 2 | Information related to resource selection for Mode 2 transmission, such as resource selection priority index, or contention window size, and so on |
| D2D TX power control (D2D TPC) information | Information related to D2D TX power control, such as the parameters used for D2D TX power control (such as P0, alpha), maximum TX power for D2D, and so on |
| Effective time for Mode 2 | Indication of the time that Mode 2 will be effective |
| . . . | . . . |

The eNB1 determines that the UE1 may be close to the edge-of-coverage, or eNB1 determines that the UE1 needs to switch from Mode 1 to Mode 2, based on measurement report and possibly other conditions such as network load, and so forth, so the eNB1 in advance sends UE1 a signal 1430 about the resource pool to be used for SA when the UE is in edge-of-coverage. The signal 1430 can also include all the other information related to reconfiguration of D2D communication due to UE1 entering to be edge-of-coverage, for example, the recommended nodes for the UE to get synchronization from, effective time of changing from Mode 1 transmission to Mode 2 transmission, contention related parameters for Mode 2, D2D power control related information and so on. Some of the Mode 2 related information may be included in SIB or other common signal, or in UE dedicated signal such as RRC signal or higher layer signal. After reception of the signal 1430, UE1 send an acknowledgement. UE1 becomes in edge-of-coverage in block 1435, or UE1 can have an implicit edge-of-coverage. UE1 can determine edge-of-coverage autonomously, or alternatively, eNB1 can instruct UE1 to be in edge-of-coverage. UE1 can still use Mode 1 transmission if Mode 2 transmission is not yet effective according to the effective time indicated in signal 1430, or UE1 can transmit in Mode 2 as instructed by eNB1. Alternatively, UE1 can transmit SA/data using transmission Mode 1 in 1440, and UE1 can also transmit SA/data using transmission Mode 2 1445, to enhance reliability during the transition. In other words, during the transition of the transmission mode, both Mode 1 and Mode 2 can be used to transmit. The eNB1 continues to send related information on reconfiguration of D2D communication, to enhance A field, such as a 1-bit field, also can be used to indicate whether the resource pool for Mode 2 transmission is for UE to use not in exceptional cases that the UE can autonomously enter, such as, the cases related to using Mode 2 when timer T301 or T311 is running. Alternatively, the resource pool is for the UE to use when the UE is in exceptional cases that the UE can autonomously enter. The UE use the respective resource pool to transmit in Mode 2 when the UE autonomously enters Mode 2 under exceptional cases or not. Alternatively, such field can be implicit by having 'effective time for Mode 2' field or not. If the effective time for Mode 2 field presents, it means the information for Mode 2 is for the case of none exceptional case. If the effective time field does not present, it means the information for Mode 2 is for the exceptional case. Alternatively, such field, such as the 1-bit field, may not be used, but the UE will always use the resource pool for TX transmission indicated by most recently received message or signal. If UE has resource pool for TX transmission indicated by SIB or by dedicated signal, the UE can use the resource pool for TX transmission indicated by dedicated signal.

The above description for resource pool for Mode 2 transmission can apply to other information related to Mode 2. If some of the fields do not change from a previously transmitted message, the information can be omitted from transmission of the message.

Figure 15:
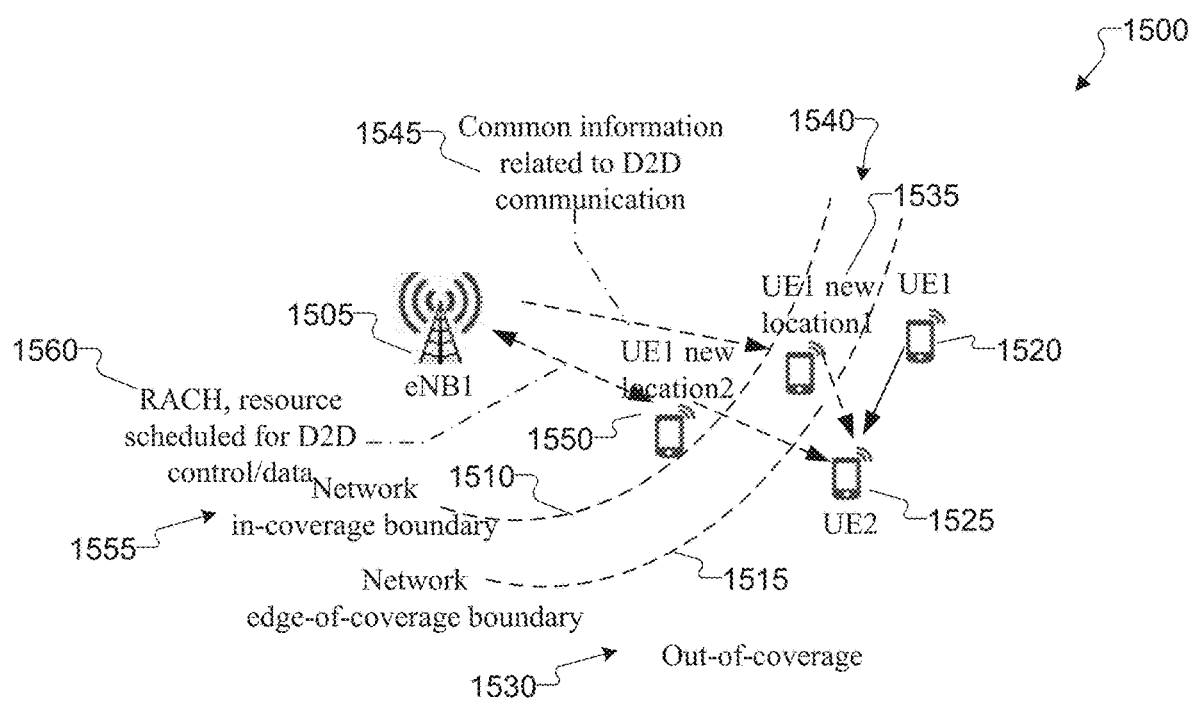
FIG. 15 illustrates scenarios for D2D communication reconfigurations due to mobility according to embodiments of the present disclosure.

FIG. 15 illustrates scenarios for D2D communication reconfigurations due to mobility according to embodiments of the present disclosure. The embodiment of the D2D network 1500 shown in FIG. 15 is for illustration only. Other embodiments could be used without departing from the scope of the present disclosure.

The D2D communication network 1500 includes a first eNB, eNB1 1505, that is able to communicate with a number of UEs within a network in-coverage boundary 1510 and within a network edge-of-coverage boundary 1515. The eNB1 1505 can be configured the same as, or similar to, eNB 102. One or more of the UE1 1520 and UE2 1525 shown in FIG. 15 can be configured the same as, or similar to, UE 116.

In the example shown in FIG. 15, UE1 1520 and UE2 1525 are out-of-coverage 1530. UE1 1520 uses Mode 2 to transmit D2D control and data. UE1 1520 moves to new location-1 1535, which is in edge-of-coverage 1540 as it is within edge-of-coverage boundary 1515 but beyond in-coverage boundary 1510. UE1 1520 can acquire common information 1545 related to D2D communication, transmitted by eNB1 1505. UE1 1520 further moves to new location-2 1550, which is in-coverage 1555. UE1 1520 performs random access and eNB1 1505 schedules UE1 1520 the resources for D2D control and data communication 1560. UE1 1520 then uses Mode 1 to transmit D2D control and data. Prior to the transmission mode transition, UE1 1520 obtains the scheduled resources for D2D control and data communication. During the of transmission mode, UE1 1520 can use both Mode 2 and Mode 1 to transmit, to enhance robustness.

Figure 16:
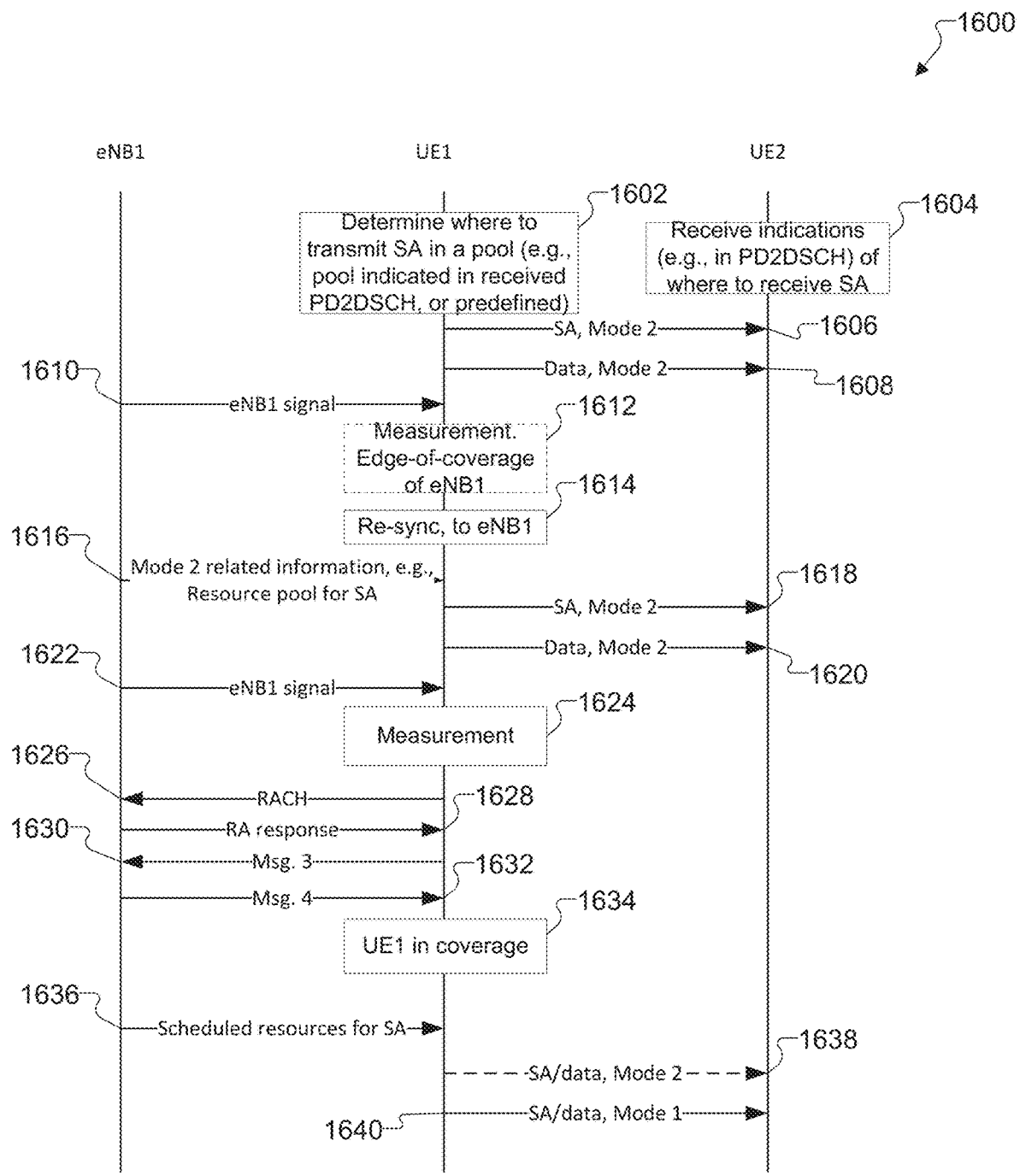
FIG. 16 illustrates operations for D2D communication reconfigurations due to mobility according to embodiments of the present disclosure.

FIG. 16 illustrates operations 1600 for D2D communication reconfigurations due to mobility according to embodiments of the present disclosure. While the signal diagram depicts a series of sequential signals, unless explicitly stated, no inference should be drawn from that sequence regarding specific order of performance, performance of signals or portions thereof serially rather than concurrently or in an overlapping manner, or performance of the signals depicted exclusively without the occurrence of intervening or intermediate signals. The operations 1600 depicted in the example depicted is implemented by transmitter and receiver chains in, for example, a mobile station and a transmitter and receiver chains in, for example, a base station.

In block 1602, UE1, by contention, chooses the resources from a resource pool to transmit SA data in Mode 2. UE2 receives indications of where to receive SA in block 1604. UE1 transmits SA 1606 and data 1608. UE1 detects downlink signal transmitted from eNB1 1610. UE1 performs measurement, and can perform DL channel decoding. UE1 determines it is in edge-of-coverage 1612, for example, after it detects SIB from eNB1. UE1 determines to re-synchronize to eNB1 1614. Before it re-synchronizes to eNB1, UE1 can tell the other nodes about its re-synchronization. UE1 updates information on resource pool for SA from eNB 1616, if there is a different resource pool for edge-of-coverage from a resource pool for out-of-coverage. If the pools are the same, signal 1616 can be skipped. UE1 transmits SA 1618 and data 1620. The transmission of SA and data can be based on the updated resource pool if any. Alternatively, the transmission of SA and data can be, for example, duplicated, and based on both the old pool and new pool. UE1 receives signal from eNB1 1622. UE1 performs measurement 1624 and detects that stronger signal is received from eNB1, such that UE1 can be in-coverage. UE1 performs RACH by sending random access preamble 1626, and eNB1 responses the RACH 1628. UE1 transmits message-3 in RACH 1630, and eNB responses with message-4 1632. UE1 is in-coverage in block 1634, for example, after the RACH is successful. UE1 can request for D2D communication and eNB1 can schedule resources for UE1 to transmit SA/data 1636. UE1 transitions from transmission Mode 2 to transmission Mode 1. During the transition, prior to the eNB1 scheduled resources for SA/data, UE1 uses Mode 2 to transmit SA/data. Alternatively, UE1 can use both Mode 2 1638 and Mode 1 1640 to transmit SA/data at the transition, to enhance robustness.

When a D2D UE has a handover from a first eNB to a second eNB, then the first eNB tells the UE about the resource allocation for D2D control and data in the second eNB beforehand. For example, the eNB tells the UE in handover command or together with information related to dedicated random access to the second eNB, so the D2D service can have continuity.

If before the handover, the D2D communication resource allocation is in Mode 1, then during the handover or after the handover, D2D communication resource allocation can be kept in Mode 1. Once the new parameters regarding the D2D communication resource allocation from the second eNB are ready, the UE can start using the new resource allocation to transmit D2D control or data. The UE also can use the old resource allocation from the first eNB and the new resource allocation from the second eNB to transmit D2D control or data, during the transition period of time.

Figure 17:
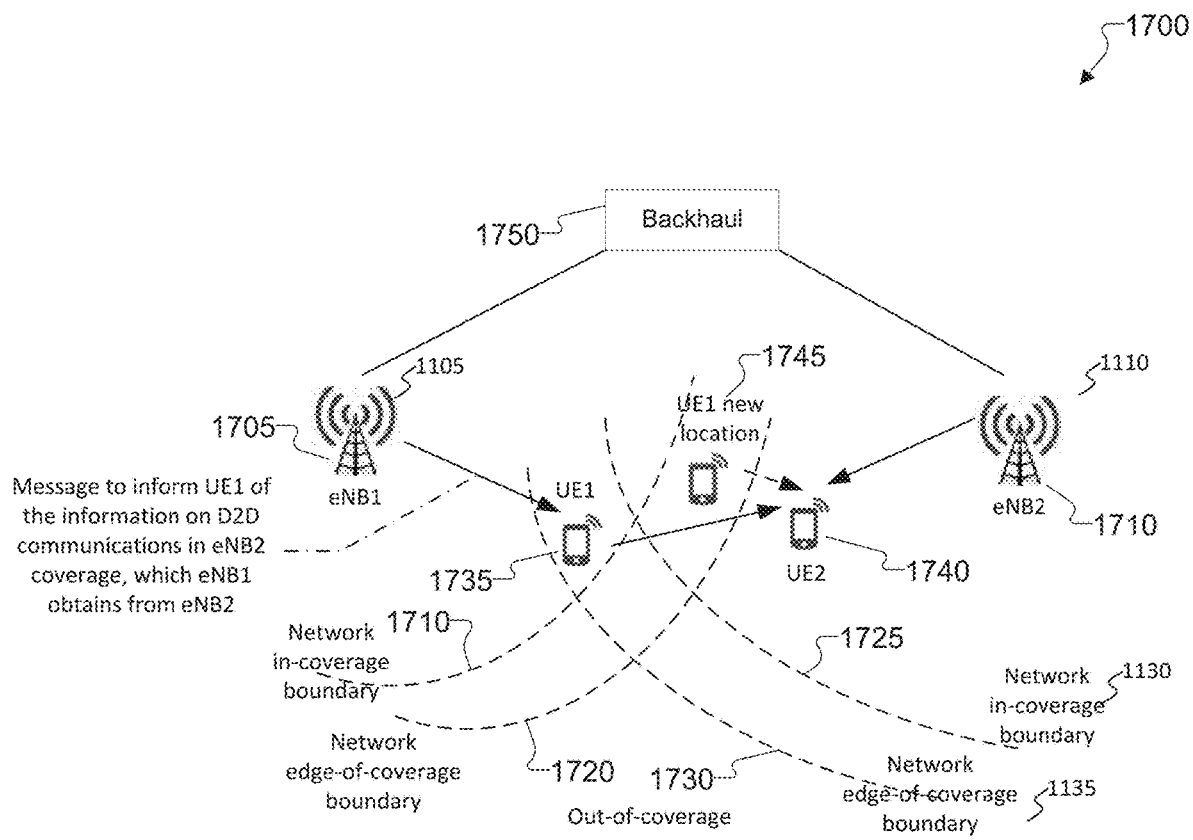
FIG. 17 illustrates a scenarios for D2D communication reconfigurations due to mobility and handover according to embodiments of the present disclosure.

FIG. 17 illustrates a scenarios for D2D communication reconfigurations due to mobility and handover according to embodiments of the present disclosure. The embodiment of the D2D network 1700 shown in FIG. 17 is for illustration only. Other embodiments could be used without departing from the scope of the present disclosure.

The D2D communication network 1700 includes a first eNB, eNB1 1705 and a second eNB2 1710. The eNB1 1705 is able to communicate with a number of UEs within a network in-coverage boundary 1715 and within a network edge-of-coverage boundary 1720. The eNB1 1710 is able to communicate with a number of UEs within a network in-coverage boundary 1725 and within a network edge-of-coverage boundary 1730. The eNB1 1705 and eNB2 1710 can be configured the same as, or similar to, eNB 102. One or more of the UE1 1735 and UE2 1740 shown in FIG. 17 can be configured the same as, or similar to, UE 116.

In the example shown in FIG. 17, eNB1 1705 communicates with UE1 1735 and eNB2 1710 communicates with UE2 1740. UE1 1735 and UE2 1740 have D2D communications. UE1 1735 moves toward new location 1745 and eNB1 1705 needs to handover UE1 1735 to eNB2 1710. Before the handover, eNB2 1710 can inform eNB1 1705 via backhaul 1750, about its D2D resource allocation related parameters, such as the resource allocation for SA or data. Then eNB1 1705 can transmit message to inform UE1 1735 of the information on D2D communications in eNB2 1710 coverage, which eNB1 1705 obtains from eNB2 1710. The UE1 1735 can start to use the new D2D communication resources given by eNB2 1710 via eNB1 1705, to transmit D2D control and data, even during the handover phase, before the handover finishes.

Figure 18:
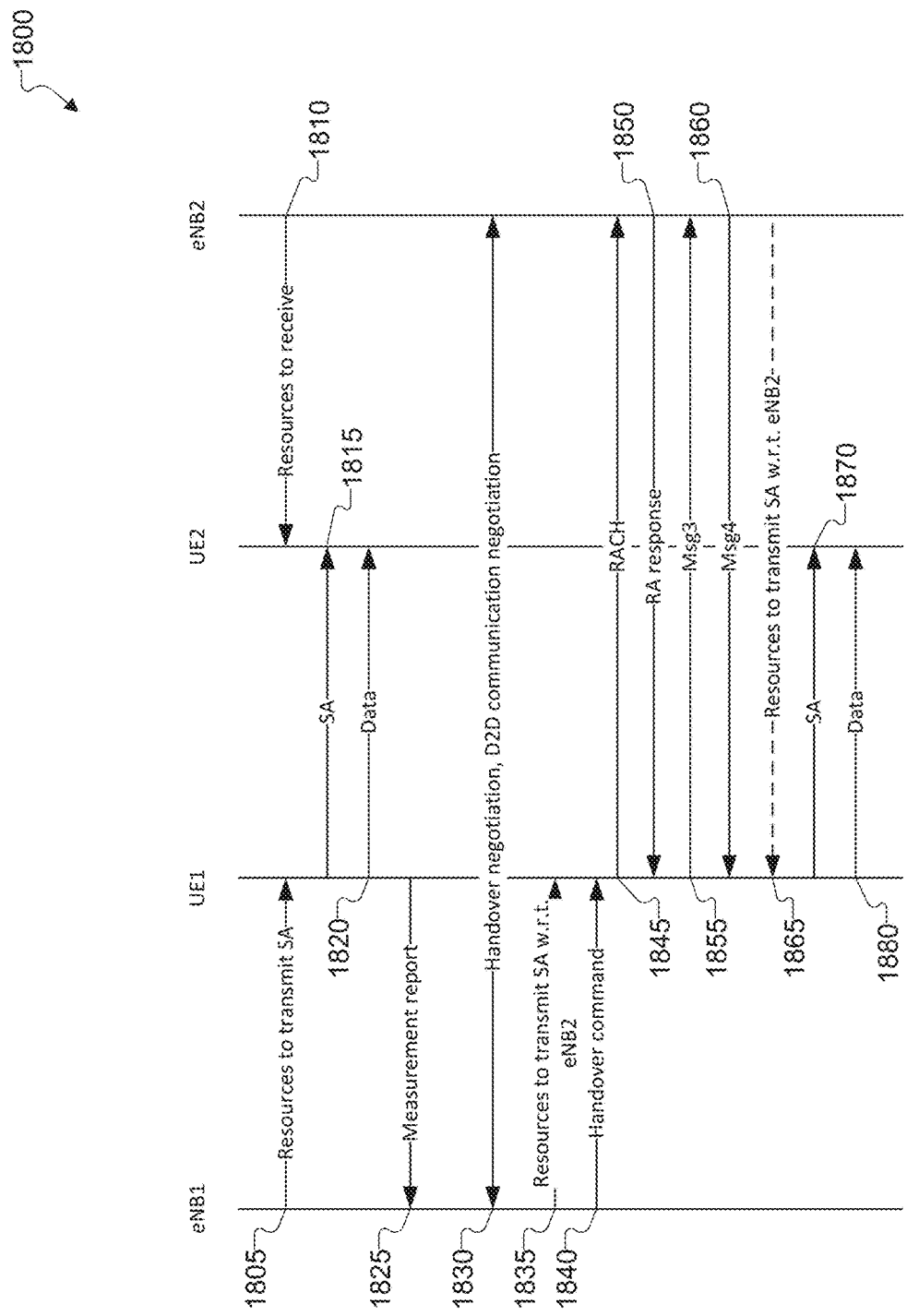
FIG. 18 illustrates exemplary operations for D2D communication reconfigurations due to mobility according to embodiments of the present disclosure.

FIG. 18 illustrates exemplary operations 1800 for D2D communication reconfigurations due to mobility according to embodiments of the present disclosure. While the signal diagram depicts a series of sequential signals, unless explicitly stated, no inference should be drawn from that sequence regarding specific order of performance, performance of signals or portions thereof serially rather than concurrently or in an overlapping manner, or performance of the signals depicted exclusively without the occurrence of intervening or intermediate signals. The operations 1800 depicted in the example depicted is implemented by transmitter and receiver chains in, for example, a mobile station and a transmitter and receiver chains in, for example, a base station.

UE1 gets resources to transmit SA from eNB1 1805. UE2 gets resources to receive D2D SA from eNB2 1810. UE1 transmits SA 1815 and data 1820. UE1 sends measurement report to eNB1 1825. Then eNB1 determines that UE1 should perform handover to eNB2. ENB1 and eNB2 conduct a handover negotiation, as well as D2D communication negotiation 1830. The eNB2 informs eNB1 about the information about the resource allocation that UE1 should use for D2D communication. The eNB1 transmits message to UE1, where the message can include the resources to transmit D2D SA with respect to eNB2 1835. The eNB1 commands UE1 to handover 1840. Message 1835 and message 1840 can be merged or separate. UE1 transmits random access signal to eNB2 1845, eNB2 transmits response 1850. UE1 transmits message-3 to eNB2 1855, and eNB2 transmits message-4 1860. During the handover procedure, UE1 can use the resources allocated by eNB1 to transmit D2D SA, and it can also use the resources allocated by eNB2 (informed to eNB1 and eNB1 sent to UE1) to transmit D2D SA, to enhance reliability. Alternatively, UE1 can start use the new resources allocated by eNB2 when the new resources is ready to be used, for example, after certain time duration, or after certain timer value, or when the new resource allocation is effective. UE1 may also get resources to transmit D2D SA directly from eNB2 1865. After the handover is done, for example, after a certain time of a success of handover, UE1 can use the new resources allocated by eNB2 to send SA 1870 and data 1880.

Figure 19:
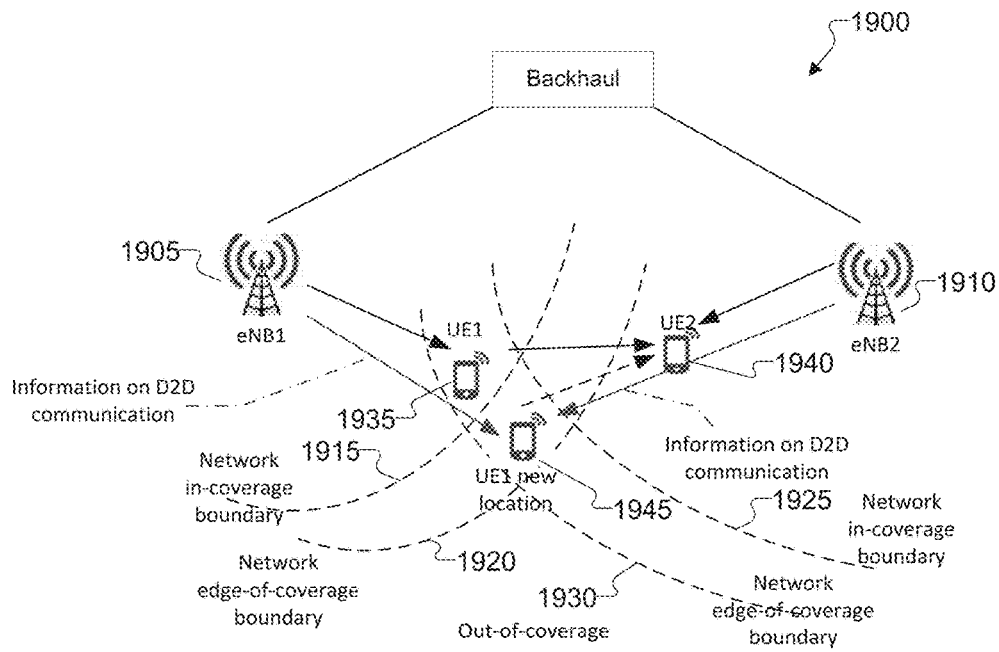
FIG. 19 illustrates exemplary scenarios for D2D communication reconfigurations due to mobility according to embodiments of the present disclosure.

FIG. 19 illustrates exemplary scenarios for D2D communication reconfigurations due to mobility according to embodiments of the present disclosure. The embodiment of the D2D communication network 1900 shown in FIG. 19 is for illustration only. Other embodiments could be used without departing from the scope of the present disclosure.

The D2D communication network 1900 includes a first eNB, eNB1 1905 and a second eNB2 1910. The eNB1 1905 is able to communicate with a number of UEs within a network in-coverage boundary 1915 and within a network edge-of-coverage boundary 1920. The eNB1 1910 is able to communicate with a number of UEs within a network in-coverage boundary 1925 and within a network edge-of-coverage boundary 1930. The eNB1 1905 and eNB2 1910 can be configured the same as, or similar to, eNB 102. One or more of the UE1 1935 and UE2 1940 shown in FIG. 19 can be configured the same as, or similar to, UE 116.

In the example shown in FIG. 19, eNB1 1905 communicates with UE1 1935. The eNB2 1910 communicates with UE2 1940. UE1 1935 and UE2 1940 have D2D communications. The eNB1 1905 moves toward new location 1945, but in this new location it is edge of coverage to both eNB1 1905 and eNB2 1910. UE1 1935 will need to change the resource allocation obtained via Mode 1 to the D2D resource allocation obtained by Mode 2. UE1 1935 can obtain the information on D2D communication 1950 from eNB1 1905 and information on D2D communication 1955 from eNB2 1910, for Mode 2 transmission. Then UE1 1935 can use Mode 2 for D2D control or data.

Figure 20:
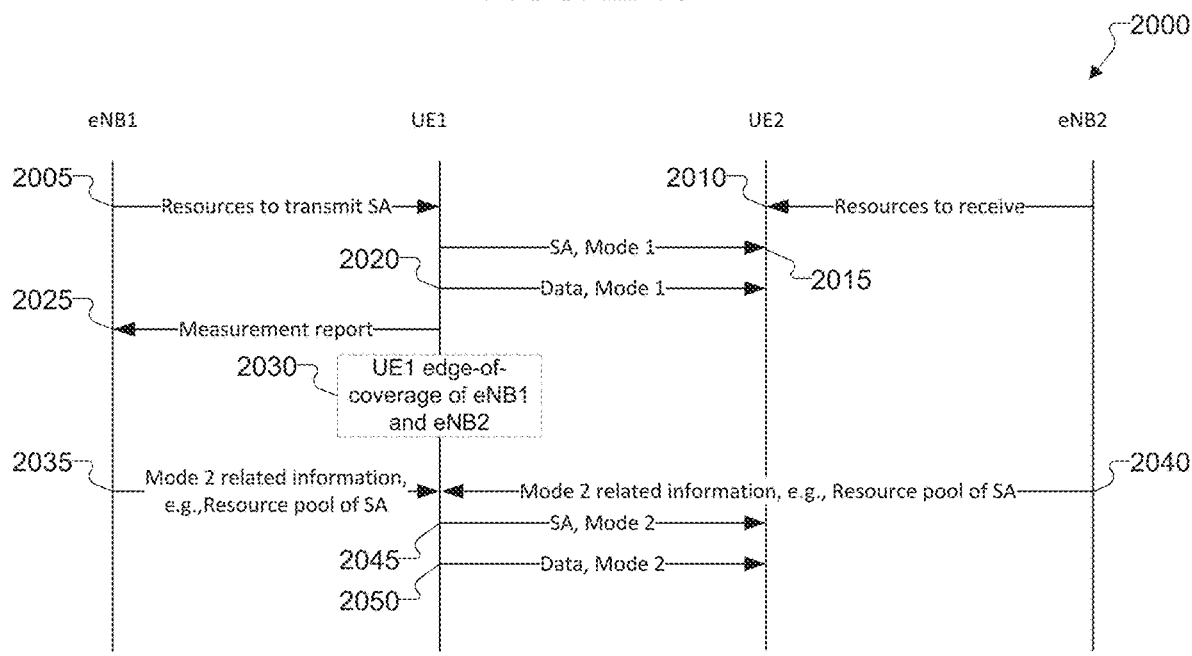
FIG. 20 illustrates exemplary operations for D2D communication reconfigurations due to mobility according to embodiments of the present disclosure.

FIG. 20 illustrates exemplary operations 2000 for D2D communication reconfigurations due to mobility according to embodiments of the present disclosure. While the signal diagram depicts a series of sequential signals, unless explicitly stated, no inference should be drawn from that sequence regarding specific order of performance, performance of signals or portions thereof serially rather than concurrently or in an overlapping manner, or performance of the signals depicted exclusively without the occurrence of intervening or intermediate signals. The operations 2000 depicted in the example depicted is implemented by transmitter and receiver chains in, for example, a mobile station and a transmitter and receiver chains in, for example, a base station.

UE1 obtains resources to transmit SA in Mode 1 from eNB1 2005. UE2 obtains resources to receive D2D SA from eNB2 2010. UE1 transmits SA 2015 and data 2020. UE1 sends measurement report 2025 to eNB1. UE1 becomes edge-of-coverage 2030 of eNB1 and eNB2. UE1 receives resource pool for SA 2035 from eNB1, and resource pool for SA 2040 from eNB2. Information on Mode 2 transmission or resource allocation from eNB1 and eNB2 can be the same and UE1 can combine, to enhance reliability. Alternatively, UE1 receives resource pool for SA transmission from either eNB1 or eNB2. UE1 can send SA 2045 and data 2050 using the resources determined based on information on Mode 2.

A D2D UE can receive and combine information on Mode 2 transmission or resource allocation from a first node and a second node, to enhance reliability. The first node or the second node can be infrastructure node, D2D UE. To allow the combining, if the first node or the second node is D2D UE, the respective node, namely, the D2D UE, needs to define frame number and let the receiving UE know.

In certain embodiments, for a D2D UE in-coverage, Mode 1 communication can be used, and for certain exceptional cases, Mode 2 can be used. The exceptional cases include, for example, when the UE is trying to establish an RRC connection. The exceptional cases also can include, for example, when the UE is in coverage and is not able to establish an RRC connection during a certain period in time. The exceptional cases also can include, for example, when the UE is in coverage and experiences bad radio, such as when a timer, referred to as timer T310, is running for radio link failure process, where the timer T310 starts when a preconfigured number of 'out-of-sync' detections from lower layers, before the detection of radio link failure, where the detection of radio link failure can be that the link cannot be recovered before T310 expires. The exceptional cases also can include, for example, when a UE needs to have RRC re-establishment, where a timer, referred to as timer T311, is running after RRC connection reestablishment is initiated or a timer (referred to as timer 301, is running after the UE transmits RRC connection re-establishment request. The exceptional cases further can include, for example, when there is reconfiguration requested by an infrastructure node for the D2D UE to use Mode 2.

In these cases, Mode 2 can be used for a minimum required time if such time is indicated or configured. For example, a timer can be set with a preconfigured value and the timer starts when Mode 2 is used, and before the timer expires, Mode 2 should be continued to be used. Alternatively, Mode 2 can be used until Mode 1 is instructed to the UE again, or Mode 2 can be used until the UE is instructed by the network infrastructure node to stop using Mode 2, or Mode 2 can be used until the exceptional cases are no longer valid. The UE can hold Mode 1 transmission, that is, temporally stop using Mode 1, but probably not releasing the resources for Mode 1. The UE can release the resources for Mode 1 after a certain period of time where the time duration can be defined by a timer with a value preconfigured. The UE can restart using Mode 1 until it is instructed by the network infrastructure node, or until the exceptional cases are no longer valid. Alternatively, the UE can still use Mode 1 when Mode 2 is used, until the UE receives instruction from the network infrastructure node to stop using Mode 1 and release resources.

Figure 21:
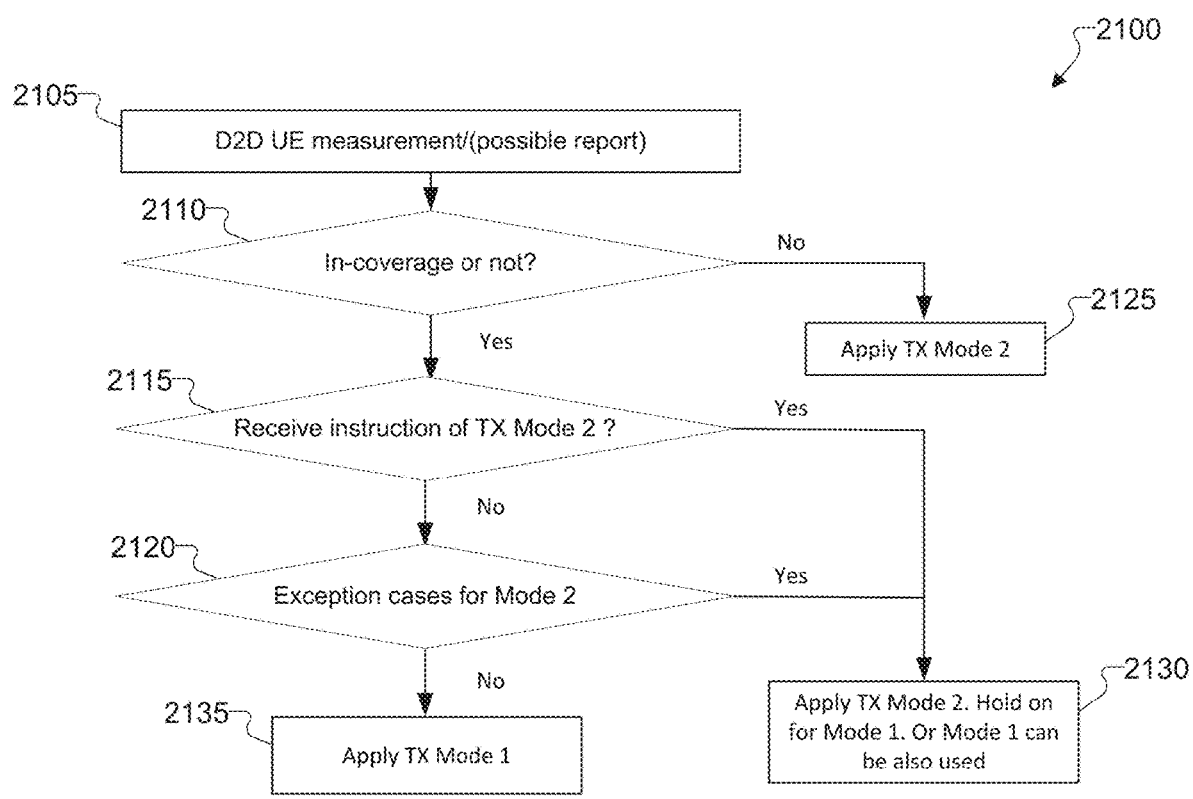
FIG. 21 illustrates a process 2000 for a D2D UE to transmit in Mode 1 or Mode 2, according to different conditions or criteria according to embodiments of the present disclosure.

FIG. 21 illustrates a process 2100 for a D2D UE to transmit in Mode 1 or Mode 2, according to different conditions or criteria according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

In block 2105, a D2D UE performs measurement 2105. The D2D UE also can report the measurement if certain conditions are met or instructed by a network infrastructure node. The UE determines whether its D2D TX is in coverage or not in block 2110. The UE determines whether it receives instruction of TX Mode 2 in block 2115. The UE determines whether it is experiencing exceptional cases for the UE to use Mode 2 in block 2120. These determinations, although illustrated as being successive in the example shown in FIG. 21, can be processed in parallel or in a different order than that illustrated in FIG. 21. If it is not in coverage, the UE applies TX Mode 2 in block 2125. When the UE is in coverage, but receives instruction of TX Mode 2 from infrastructure node, or when the UE enters exceptional cases for the UE to start using TX Mode 2, the UE applies TX Mode 2 in block 2130. The UE can maintain the Mode 1 transmission. Alternatively, the UE can still use Mode 1. when the UE is in coverage, and does not receive instruction of TX Mode 2 usage, or when the UE is not in any of the exceptional cases for the UE to use Mode 2, the UE uses TX Mode 1 in block 2135.

When a D2D UE is trying to establish an RRC connection, the D2D UE can use Mode 2. The D2D UE continues to use Mode 2 until the infrastructure node to which the D2D UE is camping instructs the D2D UE to use Mode 1. Alternatively, the D2D UE continues to use Mode 2 until RRC connection completion. Alternatively, the D2D UE continues to use Mode 2 if RRC connection is rejected. When the D2D UE is not able to establish an RRC connection during a certain period in time, where the period of time can be set by a timer (referred to as T3_RRCConnection_D2D_Mode2) with a preconfigured value, the D2D UE continues to use Mode 2, even after the timer expires. The timer T3_RRCConnection_D2D_Mode2 starts when the D2D UE transmits a random access preamble, and the timer can have a preconfigured value. The timer stops when RRC connection is complete, or when the UE receives instruction to use Mode 1. When the RRC connection is rejected, or when the timer expires but the RRC connection is not yet complete, the D2D UE keeps using Mode 2.

The transmission mode switch for the D2D UE can be related to radio link failure (RLF) process. For example, the transmission mode switch can be a switch from transmission Mode 1 to Mode 2, or vice versa. When the D2D UE is in transmission Mode 1, the RLF starts a timer, referred to as timer T310, when certain condition is satisfied. For example, the D2D UE in RLF starts a time when the lower layer detects a preconfigured number of 'out-of-sync'. A first option can be that UE can start to use Mode 2 when T310 starts running. A second option can be that when the RLF related timer expires, if the link fails, then RLF is detected, the D2D UE can go to D2D transmission Mode 2. That is, another timer, referred to as T311, starts running if RRC reestablishment process is initiated, such as if the UE transmits RRC connection reestablishment request. To allow a faster switch to Mode 2, the D2D UE acquires parameters related to transmission Mode 2 after the timer T310 starts. The parameters can be, for example, resource pool for transmission Mode 2, contention related parameters such as waiting time, contention window size, and so forth. When, before the timer T310 expires, the link becomes good enough to exit the RLF process, the D2D UE maintains operation in transmission Mode 1 if D2D communication is still needed. A third option can be that it can be extended to a new time, referred to as T310_D2D_Mode2, for Mode 1 to Mode 2 switch, where the new timer can be different from the timer T310 for RLF. The new timer T310_D2D_Mode2 starts when T310 starts, and stops if not expired when T310 stops. For example, the timer may not expire due to conditions for T310 to stop after lower layer detecting 'in-sync' for a preconfigured number of times. The UE applies Mode 2 when T310_D2D_Mode2 expires but T310 has not yet expired. The value for timer T310_D2D_Mode2 can be typically smaller than the value for T310. When the value for T310_D2D_Mode2 is zero, the third option becomes the first option, when the value for T310_D2D_Mode2 is the same as the value for T310, the value becomes the second option. Option-3 provides a flexible timing for a D2D UE to start applying Mode 2. Since the new timer introduced is different from legacy timers, D2D UE operation related to Mode 1 or Mode 2 does not need to affect the legacy timer set up.

In the first option aforementioned, Mode 2 can be used for a minimum required time if such time is indicated or configured, or can be continued to be used until T310 stops, due to radio link recovery, such as 'in-sync' is detected by lower layer for a preconfigured number of times, or after a certain period of time that can be set as an expiration time of a timer with a preconfigured value where the timer starts when T310 stops, or until the UE is instructed to use Mode 1. In the aforementioned second option, Mode 2 can be used for a minimum required time if such time is indicated or configured, or can be continued to be used until RRC reestablishment is complete, or after a certain period of time that can be set as an expiration time of a timer with a preconfigured value where the timer starts when RRC reestablishment is complete, or until the UE is instructed to use Mode 1. In the aforementioned third option, Mode 2 can be used for a minimum required time if such time is indicated or configured, or can be continued to be used until T310 stops, due to radio link recovery, such as 'in-sync' is detected by lower layer for a preconfigured number of times, if T310 stops after Mode 2 is used, or after a certain period of time that can be set as an expiration time of a timer with a preconfigured value where the timer starts when T310 stops if T310 stops after Mode 2 is used, or can be continued to be used until RRC reestablishment is complete if in a later time T310 expires after Mode 2 is used, or after a certain period of time which can be set as an expiration time of a timer with a preconfigured value where the timer starts when RRC reestablishment is complete if in a later time T310 expires after Mode 2 is used, or until the UE is instructed to use Mode 1.

FIGS. 22A through 22C illustrate exemplary operations for a D2D UE to use Mode 2, according to different conditions or criteria according to embodiments of the present disclosure. While the flow charts for operations 2201, 2202 and 2203 depict a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

In Option 1 Operation 2201, a D2D UE detects condition for T310 to start running in block 2205, and the D2D UE starts timer T310 in block 2210. The D2D UE acquires information for Mode 2 in block 2215. When information for Mode 2 is already available, such as the information is preconfigured, or has been acquired before, operation in block 2215 can be skipped. The UE applies Mode 2 in block 2220.

In Option 2 Operation 2202, operations in blocks 2225, 2230, 2235 are same as in blocks 2205, 2210, 2215. The UE applies Mode 2 in block 2245 when T310 expires in block 2240, which means radio link failure is detected, and timer T311 will start running if RRC connection reestablishment is initiated.

In Option 3 Operation 2203, a D2D UE detects condition for T310 to start running in block 2250. The D2D UE starts timers T310 and T310_D2D_Mode2 in block 2255. The D2D UE acquires information for Mode 2 in block 2260. When information for Mode 2 is already available, operation in block 2260 can be skipped. The UE stops timer T310_D2D_Mode2 if not expired when T310 stops in block 2265. For example, in block 2265, UE stops timer due to conditions for T310 to stop after lower layer detecting 'in-sync' for a preconfigured number of times. The UE applies Mode 2, when T310_D2D_Mode2 expires, but T310 has not yet expired in block 2270.

For a D2D UE, the transmission mode switch can be related to handover process. For example, the transmission mode switch can be a switch from transmission Mode 1 to Mode 2, or vice versa. When the D2D UE is in transmission Mode 1, a handover starts a timer, referred to as timer T304, when certain conditions are satisfied, for example, when the UE receives RRC connection reconfiguration that includes mobility control information. A first option can be that the D2D UE can start to use Mode 2 when T304 starts running. A second option can be that when T304 expires, then handover failure is detected. Another timer referred to as T311 starts running if RRC reestablishment process is initiated. The D2D UE can proceed to D2D transmission Mode 2. To allow a faster switch to Mode 2, the D2D UE can acquire parameters related to transmission Mode 2 after the timer T304 starts. The parameters can be, for example, resource pool for transmission Mode 2, contention related parameters such as waiting time, contention window size, and so forth. If the handover is successful before the timer T304 expires, the D2D UE maintains operation in transmission Mode 1 if D2D communication is still needed. A third option can be that it can be extended to a new timer, referred to as T304_D2D_Mode2, for Mode 1 to Mode 2 switch, where the new timer can be different from the timer T304. The new timer T304_D2D_Mode2 starts when T304 starts, and stops if not expired when T304 stops, such as, due to conditions for T304 to stop when handover is successful, such as MAC successfully completing random access for handover 1. The UE applies Mode 2 when T304_D2D_Mode2 expires but T304 has not yet expired. The value for timer T304_D2D_Mode2 can be typically smaller than the value for T304. When the value for T304_D2D_Mode2 is zero, the third option becomes the first option, when the value for T304_D2D_Mode2 is the same as the value for T304, the third option becomes the second option. Option 3 provides flexible timing for a D2D UE to start applying Mode 2, and as the new timer introduced is different from legacy timers, D2D UE operation related to Mode 1 or Mode 2 does not need to affect the legacy timer setup.

In the aforementioned first option, Mode 2 can be used for a minimum required time if such time is indicated or configured, or can be continued to be used until T304 stops, such as, due to MAC successfully completing random access for handover. Alternatively, after a certain period of time which can be set as an expiration time of a timer with a preconfigured value where the timer starts when T304 stops, or until the UE is instructed to use Mode 1. In the aforementioned second option, Mode 2 can be used for a minimum required time if such time is indicated or configured, or can be continued to be used until RRC reestablishment is complete, or after a certain period of time which can be set as an expiration time of a timer with a preconfigured value where the timer starts when RRC reestablishment is complete, or until the UE is instructed to use Mode 1. In the aforementioned third option, Mode 2 can be used for a minimum required time if such time is indicated or configured, or can be continued to be used until T304 stops (for example, due to MAC successfully completing random access for handover) if T304 stops after Mode 2 is used, or after a certain period of time which can be set as an expiration time of a timer with a preconfigured value where the timer starts when T304 stops if T304 stops after Mode 2 is used, or can be continued to be used until RRC reestablishment is complete if, in a later time, T304 expires after Mode 2 is used, or after a certain period of time that can be set as an expiration time of a timer with a preconfigured value where the timer starts when RRC reestablishment is complete if in a later time T304 expires after Mode 2 is used, or until the UE is instructed to use Mode 1.

FIGS. 23A through 23C illustrates exemplary operations for a D2D UE to use Mode 2, according to different conditions or criteria according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

In Option 1 Operation 2301, a D2D UE detects conditions for T304 to start running in block 2305. The D2D UE starts timer T304 in block 2310. The D2D UE acquires information for Mode 2 in block 2315. When information for Mode 2 is already available, such as the information is preconfigured, or has been acquired before, operation in block 2315 can be skipped. The UE applies Mode 2 in block 2320.

In Option 2 Operation 2302, operations in blocks 2325, 2330, 2335 are same as in blocks 2305, 2310, 2315. The D2D UE applies Mode 2 in block 2345 when T304 expires in block 2340, which means handover failure is detected, and timer T311 starts running if RRC connection reestablishment is initiated.

In Option 3 Operation 2303, a D2D UE detects condition for T304 to start running in block 2350. The D2D UE starts timers T304 and T304_D2D_Mode2 in block 2355. The D2D UE acquires information for Mode 2 in block 2360. If information for Mode 2 is already available, operation in block 2360 can be skipped. In block 2365, the UE stops timer T304_D2D_Mode2 if not expired when T304 stops, such as due to the handover being successful. The UE applies Mode 2, when T304_D2D_Mode2 expires, but T304 has not yet expired in block 2370.

For a D2D UE, the transmission mode switch can be related to RRC connection reestablishment. For example, the transmission mode switch can be a switch from transmission Mode 1 to Mode 2, or vice versa. The RRC connection reestablishment can be initiated, such as by transmitting RRC connection reestablishment request, in cases such as upon UE detecting radio link failure, or upon handover failure, or upon mobility from E-UTRA failure, or upon integrity check failure indication from lower layers, or upon an RRC connection reconfiguration failure. When the D2D UE is in transmission Mode 1, the RRC connection reestablishment starts a timer, referred to as timer T311, when certain condition is satisfied, for example, if RRC connection reestablishment is initiated. Alternatively, a timer, referred to as timer T301, when the UE transmits RRC connection reestablishment request. A first option can be that the UE can start to use Mode 2 when T311 or T301 starts running. A second option can be that if T311 expires, then the RRC connection reestablishment failure is detected, or if T301 stops due to RRC connection reestablishment being rejected as well as the selected cell becomes unsuitable, the D2D UE proceeds to D2D transmission Mode 2. Alternatively, if RRC connection reestablishment is rejected, the D2D UE can go to D2D transmission Mode 2. To allow a faster switch to Mode 2, the D2D UE acquires parameters related to transmission Mode 2 before or right after the timer T311 or T301 starts. The parameters can be, for example, resource pool for transmission Mode 2, contention related parameters such as waiting time, contention window size, and so forth. The information can be via, for example, a dedicated signal, or via a common signal such as SIB or PD2DSCH. If reestablishment is successful before the timer T311 expires the RRC connection, the D2D UE maintains operation in transmission Mode 1 if D2D communication is still needed. A third option can be that it can be extended to a new timer (referred to as T311_D2D_Mode2) for Mode 1 to Mode 2 switch, where the new timer can be different from the timer T311. The new timer T311_D2D_Mode2 starts when T311 starts, and stops if not expired when T311 stops, such as, due to RRC connection reestablishment being successful. The UE applies Mode 2 if T311_D2D_Mode2 expires but T311 has not yet expired, or if RRC connection reestablishment is rejected. The value for timer T311_D2D_Mode2 can be typically smaller than the value for T311. When the value for T311_D2D_Mode2 is zero, the third option becomes the first option, when the value for T311_D2D_Mode2 is the same as the value for T311, it becomes the second option. Option 3 provides flexible timing for a D2D UE to start applying Mode 2, and as the new timer introduced is different from legacy timers, D2D UE operation related to Mode 1 or Mode 2 does not need to affect the legacy timer setup.

In the aforementioned first option, Mode 2 is used for a minimum required time if such time is indicated or configured, or can be continued to be used until T311 stops, such as due to RRC connection reestablishment being successful, or until T301 stops, or after a certain period of time that can be set as an expiration time of a timer with a preconfigured value where the timer starts when T311 stops, or until the UE is instructed to use Mode 1, or can be continued to be used as the UE can be regarded to be out-of-coverage, or the UE is trying to establish an RRC connection to a new cell. In the aforementioned second option, Mode 2 can be used for a minimum required time if such time is indicated or configured, or until the UE is instructed to use Mode 1, or can be continued to be used as the UE may be regarded to be out-of-coverage, or the UE is trying to establish an RRC connection to a new cell. In the aforementioned third option, Mode 2 is used for a minimum required time if such time is indicated or configured, or can be continued to be used until T311 stops, such as due to RRC connection reestablishment being successful, if T311 stops after Mode 2 is used, or after a certain period of time that can be set as an expiration time of a timer with a preconfigured value where the timer starts when T311 stops if T311 stops after Mode 2 is used, or until the UE is instructed to use Mode 1, or can be continued to be used if RRC connection reestablishment is rejected.

Figures 24A, 24B, 24C:
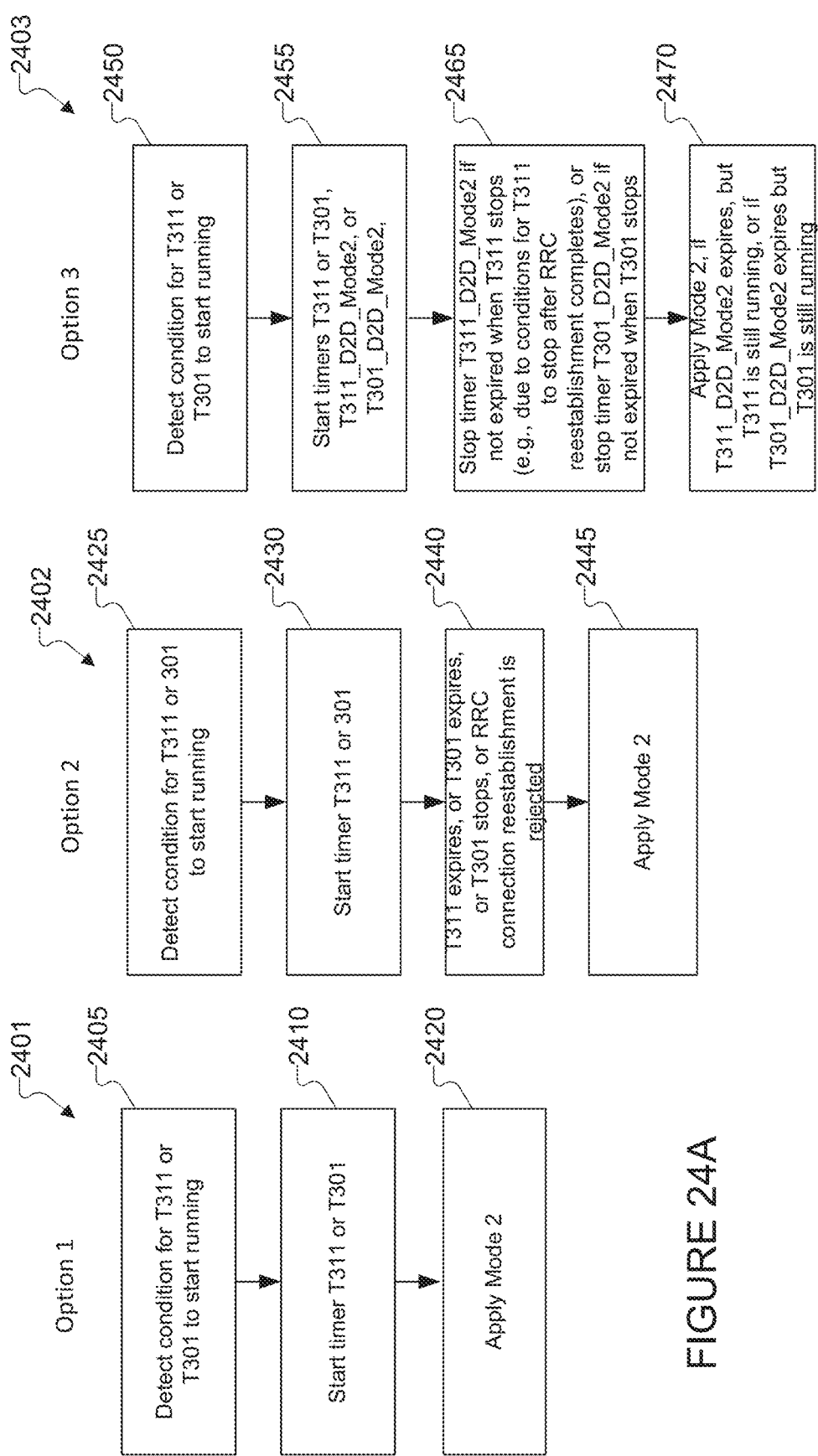
FIGS. 24A, 24B and 24C illustrates exemplary operations for a D2D UE to use Mode 2, according to different conditions or criteria according to embodiments of the present disclosure.

FIGS. 24A through 24C illustrates exemplary operations for a D2D UE to use Mode 2, according to different conditions or criteria according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

In Option 1 Operation 2401, a D2D UE detects condition for T311 or T301 to start running in block 2405. The D2D UE starts timer T311 or T301 in block 2410. The UE applies Mode 2 in block 2415.

In Option 2 Operation 2402, operations in blocks 2420, 2425, are same as in blocks 2405, 2410. The D2D UE applies Mode 2 in block 2435 if T311 expires, or T301 expires, or T301 stops, or if RRC connection reestablishment is rejected in block 2430.

In Option 3 Operation 2403, a D2D UE detects condition for T311 or T301 to start running in block 2440. The D2D UE starts timers T311 or T301 and T311_D2D_Mode2 or _D2D_Mode2 in block 2445. The UE stops timer T311_D2D_Mode2 if not expired when T311 stops, such as, due to the RRC connection reestablishment being successful, in block 2450, or stop timer T301_D2D_Mode2 if not expired when T301 stops. The UE applies Mode 2, if T311_D2D_Mode2 expires, but T311 has not yet expired, or of T301_D2D_Mode2 expires but T301 is still running in block 2455.

For a D2D UE, the transmission mode switch can be related to RRC connection reconfiguration. For example, the transmission mode switch can be a switch from transmission Mode 1 to Mode 2, or vice versa. The RRC connection reconfiguration can be instructed or ordered by a network infrastructure node to a UE. In RRC connection reconfiguration, an eNB includes an instruction to ask the D2D UE to use Mode 2 communication, if needed. For example, when the RRC connection reconfiguration is for certain purposes that may possibly cause some waiting time until the new configuration is effective, where such reconfiguration can include, for example, cell deactivation where the cell is serving the D2D UE for D2D related application and a new cell will be used to serve the UE for D2D Mode 1 communication, or switching eNB, such as in dual connectivity case, that serves the UE for D2D Mode 1 communication, or cell frequency carrier switch if the cell serving the D2D UE for D2D Mode 1 related application needs to be reconfigured to another frequency carrier, handover that can be a special case of RRC connection reconfiguration (for example, as illustrated in case associated with FIG. 23), and so forth. A D2D communication Mode 1 to Mode 2 switch itself also can be regarded to as one of the RRC reconfiguration cases.

A timer, referred to as T3xx_D2D_Mode2 can start, if RRC connection reconfiguration for certain purpose(s) is instructed or commanded by a network infrastructure node. In the RRC connection reconfiguration message, the D2D UE can include the configuration of the timer T3xx_D2D_Mode2, if the RRC connection reconfiguration would need the UE to use D2D communication Mode 2 for D2D application. The timer T3xx_D2D_Mode2 stops if not expired when RRC connection reconfiguration completes. The UE applies Mode 2 if T3xx_D2D_Mode2 expires but RRC connection reconfiguration is not yet complete. The value for T3xx_D2D_Mode2 can be set typically smaller than the value for the timer for RRC connection reconfiguration if any. In the message of RRC connection reconfiguration for certain purpose(s) that is transmitted or commanded by a network infrastructure node, the D2D UE can include an indication of whether Mode 2 should be used by the UE or not. For example, a 1-bit indication can be used, where value '0' can be not to use Mode 2, while '1' can be to use Mode 2. The timer T3xx_D2D_Mode2 can be additionally used, if the indicator indicates that Mode 2 is to be used. Alternatively, the indication of whether Mode 2 should be used by the UE or not can be implicit by whether the timer T3xx_D2D_Mode2 is included or not. In certain embodiments, the timer being included means that Mode 2 is used, otherwise, it means Mode 2 is not used. When the timer value is '0', it means Mode 2 should be used, starting immediately after the UE receives the message.

Mode 2 can be used for a minimum required time if such time is indicated or configured. Mode 2 can be continued to be used until RRC connection reconfiguration completes, or after a certain period of time which can be set as an expiration time of a timer with a preconfigured value where the timer starts when RRC connection reconfiguration completes, or until the UE is instructed to use Mode 1, or it can be continued to be used if RRC connection reconfiguration does not complete but it goes to RRC connection reestablishment.

Figure 25:
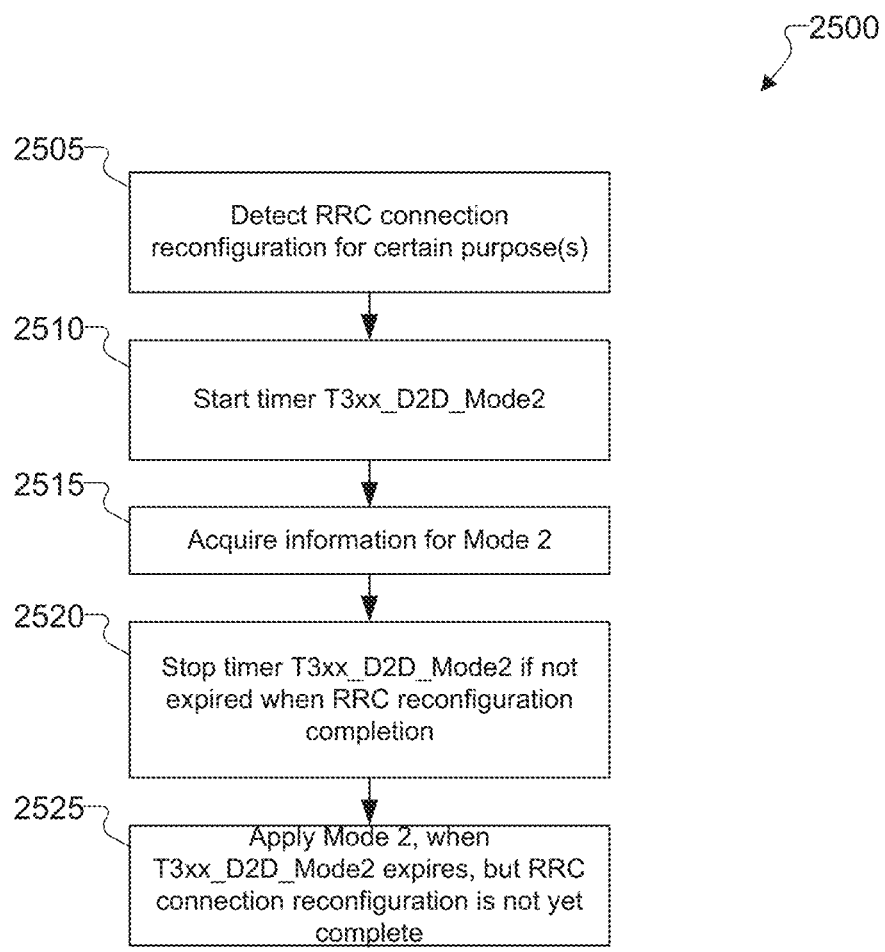
FIG. 25 illustrates exemplary operations for a D2D UE to use Mode 2, according to different conditions or criteria according to embodiments of the present disclosure.

FIG. 25 illustrates exemplary operations for a D2D UE to use Mode 2, according to different conditions or criteria according to embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station.

In block 2505, a D2D UE receives RRC connection reconfiguration for certain purpose(s), which may include information related to D2D Mode 2 communication. The UE starts a timer T3xx_D2D_Mode2 in block 2510. The UE acquires information for Mode 2 in block 2515. If information for Mode 2 is already available, the operation in block 2515 can be skipped. The UE stops timer T3xx_D2D_Mode2 if not expired when RRC connection reconfiguration being complete in block 2520. The UE applies Mode 2, if T3xx_D2D_Mode2 expires, but RRC connection reconfiguration is not yet complete in block 2525.

Timer values for timers such as the new timer for Mode 2 during RRC connection T3_RRCConnection_D2D_Mode2, new timers T310_D2D_Mode2, T304_D2D_Mode2, T311_D2D_Mode2, or T3xx_D2D_Mode2, are set related to D2D applications. For example, for delay stringent D2D application, the timer value is set smaller, to allow earlier usage of Mode 2. For delay astringent D2D application, the timer value is set relatively larger.

It is noted that any of these timers for Mode 2 can stop when the UE receives instruction to use Mode 1, or instruction to stop using Mode 2. In other words, the eNB or network infrastructure node can override any of these timers for Mode 2, such as by sending an instruction to the UE to stop using Mode 2, or resume using Mode 1, or using Mode 1.

In certain embodiments, a D2D UE sends measurement report when the report is for connection request. In certain embodiments, a D2D UE sends measurement report when the report is for connection reestablishment request.

For a switch from transmission Mode 2 to Mode 1, a D2D UE can perform RACH prior to the termination of Mode 2. During the transition in-between Mode 1 and Mode 2, to enhance robustness, Mode 1 and Mode 2 may be both used by the D2D UE.

In certain embodiments, when D2D transmission Mode 1 and Mode 2 are tied to whether a D2D UE is in-coverage, edge-of-coverage, and out-of-coverage, the transition conditions for Mode 1 and Mode 2 also can be related to the conditions for in-coverage, edge-of-coverage, and out-of-coverage. For example, if Mode 1 is used for UE TX in-coverage and Mode 2 is used for edge-of-coverage and out-of-coverage, the transition condition from Mode 1 to Mode 2 can be the same conditions for transition from in-coverage to edge-of-coverage and out-of-coverage. In certain embodiments, conditions for transitions in-between Mode 1 and Mode 2 can be independent of the conditions for being in-coverage, edge-of-coverage, and out-of-coverage.

In certain embodiments, a D2D UE can be in respective transmission Mode 1 and Mode 2. When the D2D UE enters one of the modes, the current mode should last at least for a duration before it can be transitioned to another mode, where the duration can be defined, for example, by certain timer. Different timers, or different timer values, can be defined for different current modes. The durations defined by the timers can be configured, preconfigured, or fixed. These durations are useful to avoid ping-pong effects in-between modes, that is, not to transit back and forth very quickly in-between modes.

For Mode 2, when a current resource pool used by a D2D UE is different from a resource pool indicated by eNB, the D2D UE can change mode 2 resources from current pool to be the pool indicated by eNB while keeping in Mode 2, if certain conditions are satisfied. For example, when a current resource pool used by a D2D UE is out-of-coverage and a resource pool indicated by eNB i, edge-of-coverage, the D2D UE changes mode 2 resources from current pool to be the pool indicated by eNB while maintaining operations in Mode 2, if certain conditions are satisfied. In certain embodiments, the certain conditions include when the D2D UE determines that DL is in coverage, but UL is out of coverage. In certain embodiments, the certain conditions can include when the signaling containing the pool from eNB detected, such as via SIB, or PDCCH, but the signal is not good enough or the eNB does not allow to access, such as when the RSRP or RSPQ is below a certain threshold, or the cell is barred, or D2D transmission Mode 1 is not supported.

In certain embodiments, a network infrastructure node, such as eNB, or relay node, and so forth, indicates whether it supports D2D, or supports transmission Mode 1, transmission Mode 2, or a combination thereof. The network infrastructure node can also indicate whether other infrastructure nodes support D2D, or support transmission Mode 1, transmission Mode 2, or a combination thereof. A D2D UE will not attempt to access if certain mode is not supported. In certain embodiments, the D2D UE can be configured for a certain capability, whether Mode 1 or Mode 2, that can be supported. A D2D UE with certain capability on certain mode, whether Mode 1 or Mode 2, will not attempt to access to the node that does not support the respective mode. There can be also access class bar indication for D2D application, or access class bar indication for D2D application with Mode 1. A D2D UE will not get access to the cell for D2D service if the cell is barred, or access class barred for D2D. A D2D UE will not get access to the cell for D2D service with Mode 1 if the cell is barred, or access class barred for D2D Mode 1, then the D2D UE uses Mode 2 when Mode 2 is supported.

The indication for whether an eNB supports D2D, Mode 1, or Mode 2 can be, for example, in SIB. For example, the indication can be via an explicit indication, such as using certain number of bits. For example, 1-bit can be used to indicate whether the node supports D2D or not. A 1-bit field can be used to indicate whether the node supports Mode 1 or not. The 1-bit field can be used to indicate whether the node supports Mode 2 or not. In another example, the indication of whether D2D is supported is implicit, via whether any D2D related information is carried in SIB or not. A joint indication of whether an eNB supports D2D, Mode 1, of Mode 2 can be also possible. For example, if D2D is supported, by default, Mode 1 can be supported, and whether or not Mode 2 is supported can be implicitly indicated, such as, via whether resource pool for Mode 2 is indicated in SIB or not. In certain embodiments, when SIB does not include resource pool for Mode 2 transmission, then Mode 2 is not supported and when SIB includes resource pool for Mode 2 transmission, Mode 2 is supported. In certain embodiments, when SIB includes resource pool for Mode 2 transmission, a UE in RRC_IDLE needs to get to the RRC_CONNECTED to have D2D communication; otherwise, when SIB include resource pool for Mode 2 transmission, Mode 2 is supported, and UE in RRC_IDLE can use Mode 2 communication.

In certain embodiments, when Mode 2 is not supported, Mode 1 is supported. In certain embodiments, when Mode 2 is not supported, the UE in the coverage cannot be configured to use Mode 2. In certain embodiments, when Mode 2 is not supported, the cell does not support the UE to be in exceptional cases transitioning from Mode 1 to Mode 2. Alternatively, Mode 2 is not supported can mean that Mode 2 is not supported in general but Mode 2 can be supported if configured by dedicated signal and the UE can have Mode 2 as configured or the UE can have exceptional cases for Mode 2 from Mode 1.

In certain embodiments, for a transition from transmission Mode 1 to Mode 2, a D2D UE has a higher priority in contention for SA/data at the beginning of the transmission Mode 2, than a D2D UE that has been in transmission Mode 2 and remains in transmission Mode 2.

The higher priority can be achieved via, for example, a smaller time duration for waiting before the contention window starts, or a smaller contention window size. These parameters for higher priority can be predefined, fixed or configured. In another example, the higher priority can be achieved via having a first set of resources, such as, in frequency or time domain, can be reserved to be contended or selected by UEs with higher priority, while a second set of resources can be contented or selected by UEs with lower priority where more UEs can be with lower priority than the UEs with higher priority. The first set of resources can be orthogonal to the second set of resources, or the first set of resources can be a super set of the second set of resources. The first set of resources can include the second set of resources and some resources which are not in the second set. By having such, the UE with higher priority can have higher probability to select or contend the resources successfully with smaller number of attempts or with shorter time duration for the selection process.

In certain embodiments, a D2D UE that has just transitioned from Mode 1 to Mode 2 has a higher priority in contention or resource allocation for SA/data at the beginning of the transmission Mode 2, than a D2D UE that has been in transmission Mode 2 and remains in transmission Mode 2. A timer can start upon the UE transitions from Mode 1 to Mode 2. Before timer expires, the UE can have higher priority. Upon expiration of the timer, the UE can have normal priority as the UE that has been using Mode 2 for a while. In one variation, a D2D UE that has just transitioned from Mode 1 to Mode 2 via the UE's autonomous conditions check for exceptional cases for a UE to use Mode 2 when the UE is configured to use Mode 1, can have higher priority in transmission in Mode 2. A D2D UE that is configured by eNB to be in Mode 2 can have a normal priority in contention or resource allocation for SA/data in transmission Mode 2. As an alternative, a D2D UE that can use Mode 2 switched from Mode 1, regardless of whether the eNB configures it or the UE autonomously enters Mode 2, the UE can have higher priority than the other UEs which have been in contention state for a while.

For D2D transmission Mode 2, in general, contention related parameters, such as waiting window length, contention window size, can be included in messages such as PD2DSCH transmitted by D2D UE, or SIB or PDCCH with D2D-RNTI from infrastructure node, or higher layer signaling such as RRC.

For contention, if a D2D UE detects all sub-band resources are occupied and no medium is free, the D2D UE can perform random backoff. The D2D UE can randomly choose one of the sub-bands to perform backoff, or the D2D UE can choose one sub-band that the D2D UE has detected and that it has been busy for a long time, such as, longer than certain threshold) to perform backoff. Therefore, when the D2D UE comes back from backoff, the D2D UE will attempt to use the chosen sub-band. The sub-band that has been busy for a long time may have better chance to be free soon.

In certain embodiments, the PD2DSCH transmitted by a D2D UE can carry a total number of nodes that the D2D UE detects synchronization. The information can be used by a UE that receives the PD2DSCH to determine prioritization of a node to which a D2D UE can synchronize. For example, a UE can determine to give priority to a node that has more nodes that the UE can detect synchronization.

Table 14 illustrates exemplary information fields on number of detected synchronization nodes. Alternatively, the number of detected synchronization nodes can be per carrier, instead of a total number across all carriers. Alternatively, each indication can indicate a respective range of the number of nodes, for example, '00' means 1-2 additional nodes, '01' means 3-4 additional nodes. Alternatively, the total number of detected synchronization nodes can be for nodes including eNBs or infrastructure nodes and D2D UEs, or the nodes only including D2D UEs.

TABLE 14

Information fields on number of detected synchronization node in PD2DSCH

| | Size (bits) | Information |
|---|---|---|
| ... | ... | ... |
| Number of nodes that the D2D UE detects synchronization | 2 | 00: 1 additional node<br>01: 2 additional node<br>10: 3 additional node<br>11: more than 3 additional node |
| ... | ... | ... |

In certain embodiments, the PD2DSCH from a UE, or message from eNB, can include parameters for Mode 2. The message can be SIB, or group cast, or unicast message, such as a message to instruct a UE to use Mode 2, and so forth. The parameters can be, for example, resource pool for transmission Mode 2, contention related parameters such as waiting time, contention window size, values for the timers related to Mode 2 communication, such as T3_RRCConnection_D2D_Mode2, T310_D2D_Mode2, T304_D2D_Mode2, T311_D2D_Mode2, or T3xx_D2D_Mode2, and so forth.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for transmitting data by a user equipment (UE) in a communication system, the method comprising:
    receiving an indication of a first resource pool of resources to be used by the UE for transmitting data to other UEs when the UE is in coverage of a base station, a radio link failure between the UE and the base station is detected, and one of first, second or third timers related to the radio link failure is running;
    in response to detecting the radio link failure between the UE and the base station when the UE is in coverage of the base station and one of the first, second or third timers is running, transmitting, to another UE, data based on the first resource pool;
    transmitting, to the other UE, data based on a second resource pool when the UE is out of coverage of the base station, wherein the second resource pool is pre-configured, wherein the first timer runs when a radio resource control (RRC) connection re-establishment request is transmitted by the UE, the second timer runs when out-of-sync is detected from a lower layer, and the third timer runs when RRC connection reestablishment is initiated; and
    transmitting, to the other UE, data based on a third resource pool when the UE is in coverage of the base station and no radio link failure is detected between the UE and the base station.

2. The method of claim 1, wherein the third resource pool is a dedicated resource pool, if the dedicated resource pool is configured.

3. The method of claim 1, further comprising:
    transmitting, to the other UE, data based on a third resource pool when the UE is in-coverage and when no radio link failure is detected.

4. A method for transmitting data by a user equipment (UE) in a communication system, the method comprising:
    receiving an indication of a first resource pool of resources to be used by the UE for transmitting data to other UEs when the UE is in coverage of a base station and a radio link failure between the UE and the base station is detected and a timer related to the radio link failure is running;
    in response to detecting radio link failure between the UE and the base station when the UE is in coverage of the base station and one of first, second or third timers is running, transmitting, to another UE, data based on the first resource pool;
    transmitting, to the other UE, data based on a second resource pool when the UE is out of coverage of the base station, wherein the second resource pool is pre-configured; and
    transmitting, to the other UE, data based on a third resource pool when the UE is in coverage of the base station and no radio link failure is detected between the UE and the base station.

5. The method of claim 4, wherein resources among the first resource pool or the second resource pool other than those used to transmit data based on the first or second resource pools are used by the UE based on a time period when the UE performs handover.

6. The method of claim 4, wherein the first resource pool is configured by a system information block (SIB).

7. A user equipment (UE) for transmitting data in a communication system, the UE comprising:
    a transceiver configured to receive an indication of a first resource pool of resources to be used by the UE for transmitting data to other UEs when the UE is in coverage of a base station, a radio link failure between the UE and the base station is detected, and one of first, second or third timers related to the radio link failure is running; and
    a processor configured to control the transceiver to:
        in response to detecting radio link failure between the UE and the base station when the UE is in coverage of the base station and one of the first, second or third timers is running, transmit, to another UE, data based on the first resource pool, and
        transmit, to the other UE, data based on a second resource pool when the UE is out of coverage of the base station, wherein the second resource pool is preconfigured,
        transmit, to the other UE, data based on a third resource pool when the UE is in coverage of the base station and no radio link failure is detected between the UE and the base station,
    wherein the first timer runs when a radio resource control (RRC) connection re-establishment request is transmitted by the UE, the second timer runs when out-of-sync is detected from a lower layer, and the third timer runs when RRC connection reestablishment is initiated.

8. The UE of claim 7, wherein the third resource pool is a dedicated resource pool, if the dedicated resource pool is configured.

9. The UE of claim 7, wherein resources among the first resource pool or the second resource pool other than those used to transmit data based on the first or second resource pools are used by the UE based on a time period when the UE performs handover.

10. The UE of claim 7, wherein the first resource pool is configured by a system information block (SIB).

11. The UE of claim 10, wherein:
    the first, second and third timers are T301, T310, and T311, the T301 timer starts when a radio resource control (RRC) connection re-establishment request is transmitted by the UE, the T310 timer starts when out-of-sync is detected from a lower layer, and the T311 timer starts when RRC connection reestablishment is initiated.

12. A method for a base station (BS) in a communication system, the method comprising:

identifying resources for device-to-device communication; and transmitting, to a user equipment (UE), information on an allocation of the resources, the information indicating a first resource pool of resources to be used by the UE for transmitting data to other UEs when the UE is in coverage of a base station, a radio link failure between the UE and the base station is detected, and one of first, second or third timers related to the radio link failure is running, wherein, in response to the UE detecting radio link failure between the UE and the base station when the UE is in coverage of the base station and one of the first, second or third timers is running, transmitting, to another UE, data is transmitted by the UE based on the first resource pool, wherein the data is transmitted by the UE based on a second resource pool when the UE is out of coverage of the base station, wherein the data is transmitted by the UE based on a third resource pool when the UE is in coverage of the base station and no radio link failure is detected between the UE and the base station, wherein the first timer runs when a radio resource control (RRC) connection re-establishment request is transmitted by the UE, the second timer runs when out-of-sync is detected from a lower layer, and the third timer runs when RRC connection reestablishment is initiated, and wherein the second resource pool is preconfigured.

13. The method of claim 12, wherein the third resource pool is a dedicated resource pool, if the dedicated resource pool is configured.

14. The method of claim 12, wherein resources among the first resource pool or the second resource pool other than those used to transmit data based on the first or second resource pools are used by the UE based on a time period when the UE performs handover.

15. The method of claim 12, wherein:

the first resource pool is configured by a system information block (SIB), and the first resource pool is exceptional for the radio link failure.

16. A base station (BS) in a communication system, the BS comprising:

a transceiver; and a processor operably connected to the transceiver, the processor configured to:

identify resources for device-to-device communication, and control the transceiver to transmit, to a user equipment (UE) information on allocation of the resources, the information indicating a first resource pool of resources to be used by the UE for transmitting data to other UEs when the UE is in coverage of a base station, a radio link failure between the UE and the base station is detected, and one of first, second or third timers related to the radio link failure is running, wherein, in response to the UE detecting radio link failure between the UE and the base station when the UE is in coverage of the base station and one of the first, second or third timers is running, transmitting, to another UE, data is transmitted by the UE based on the first resource pool, wherein the data is transmitted by the UE based on a second resource pool when the UE is out of coverage of the base station, wherein the data is transmitted by the UE based on a third resource pool when the UE is in coverage of the base station and no radio link failure is detected between the UE and the base station, wherein the first timer runs when a radio resource control (RRC) connection re-establishment request is transmitted by the UE, the second timer runs when out-of-sync is detected from a lower layer, and the third timer runs when RRC connection reestablishment is initiated, and wherein the second resource pool is preconfigured.

17. The BS of claim 16, wherein the third resource pool is a dedicated resource pool, if the dedicated resource pool is configured.

18. The BS of claim 16, wherein resources among the first resource pool or the second resource pool other than those used to transmit data based on the first or second resource pools are used by the UE based on a time period when the UE performs handover.

19. The BS of claim 16, wherein:

the first resource pool is configured by a system information block (SIB), and the first resource pool is exceptional for the radio link failure.

* * * * *